(12) United States Patent
Ho

(10) Patent No.: US 7,555,724 B2
(45) Date of Patent: *Jun. 30, 2009

(54) COMPUTER BASED BROWSING COMPUTER PROGRAM PRODUCT, SYSTEM AND METHOD

(75) Inventor: Seng Beng Ho, Singapore (SG)

(73) Assignee: E-Book Systems Pte Ltd., Singapore (SG)

( * ) Notice: Subject to any disclaimer, the term of this patent is extended or adjusted under 35 U.S.C. 154(b) by 1086 days.

This patent is subject to a terminal disclaimer.

(21) Appl. No.: 10/765,199

(22) Filed: Jan. 28, 2004

(65) Prior Publication Data

US 2004/0183776 A1 Sep. 23, 2004

Related U.S. Application Data

(62) Division of application No. 10/052,387, filed on Jan. 23, 2002, now Pat. No. 6,762,775, which is a division of application No. 08/992,793, filed on Dec. 18, 1997, now Pat. No. 6,407,757.

(51) Int. Cl.
G06F 3/00 (2006.01)
(52) U.S. Cl. .................. 715/776; 715/701; 715/839
(58) Field of Classification Search ................. 715/776, 715/701, 839
See application file for complete search history.

(56) References Cited

U.S. PATENT DOCUMENTS

| 5,237,651 A | 8/1993 | Randall |
| 5,283,864 A | 2/1994 | Knowlton |
| 5,333,255 A | 7/1994 | Damouth |
| 5,392,387 A | 2/1995 | Fitzpatrick et al. |
| 5,417,575 A | 5/1995 | McTaggart |
| 5,438,662 A | 8/1995 | Randall |
| 5,463,725 A | 10/1995 | Henckel et al. |

(Continued)

FOREIGN PATENT DOCUMENTS

EP 0 246 971 11/1987

(Continued)

OTHER PUBLICATIONS

U.S. Appl. No. 10/262,960, filed Oct. 3, 2002, Ho.

(Continued)

*Primary Examiner*—Sy D Luu
(74) *Attorney, Agent, or Firm*—Oblon, Spivak, McClelland, Maier & Neustadt, P.C.

(57) ABSTRACT

A computer based browsing computer program product, system and method arranges a set of information hosted on a computer into a book or a set of books, where each book includes a subset of the set of information, labels each book with a respective portion of the subset of the set of information, and selects a book from the set of books. Selecting the book from the set of books includes steps of displaying the respective portions of the books as a book document image that includes pages which correspond to the respective portions of the books, generating a command for moving through the pages, displaying an animated image of the pages of the book document being at least one of flipped, scrolled, slid and flashed images, and selecting the book when a selected one of the pages containing a selection portion of the book is earlier displayed.

31 Claims, 63 Drawing Sheets

U.S. PATENT DOCUMENTS

| | | | |
|---|---|---|---|
| 5,467,102 A | 11/1995 | Kuno et al. |
| 5,592,605 A | 1/1997 | Asuma et al. |
| 5,632,022 A | 5/1997 | Warren et al. |
| 5,668,964 A | 9/1997 | Helsel et al. |
| 5,673,406 A | 9/1997 | Hirayama |
| 5,696,982 A | 12/1997 | Tanigawa et al. |
| 5,801,713 A | 9/1998 | Endo et al. |
| 5,870,092 A | 2/1999 | Bedford-Roberts |
| 5,900,876 A | 5/1999 | Yagita et al. |
| 5,909,207 A | 6/1999 | Ho |
| 5,909,690 A | 6/1999 | Tanigawa et al. |
| 5,937,419 A | 8/1999 | Oshiro et al. |
| 6,064,384 A | 5/2000 | Ho |
| 6,229,502 B1 | 5/2001 | Schwab |
| 6,340,980 B1 | 1/2002 | Ho |
| 6,407,757 B1 | 6/2002 | Ho |
| 6,486,895 B1 | 11/2002 | Robertson et al. |

FOREIGN PATENT DOCUMENTS

| | | |
|---|---|---|
| EP | 0 635 780 | 1/1995 |
| WO | WO 91/11769 | 8/1991 |
| WO | WO 92/08182 | 5/1992 |

OTHER PUBLICATIONS

U.S. Appl. No. 10/765,199, filed Jan. 28, 2004, Ho.
U.S. Appl. No. 11/432,401, filed May 12, 2006, Ho.

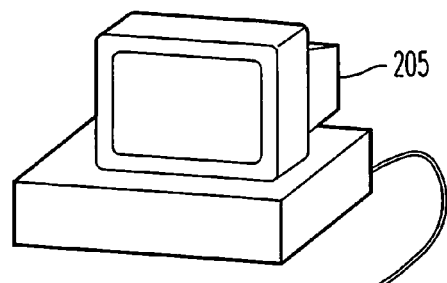
*FIG. 2A*
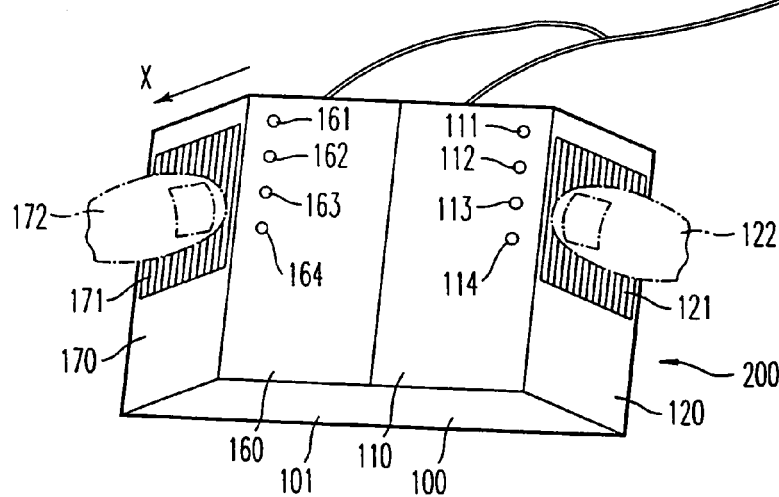
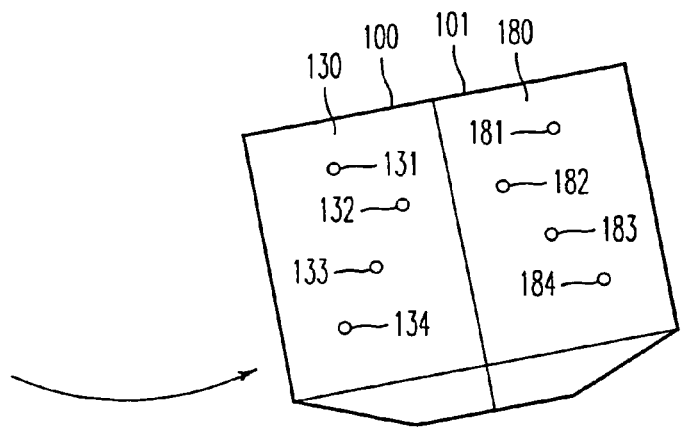
*FIG. 2B*

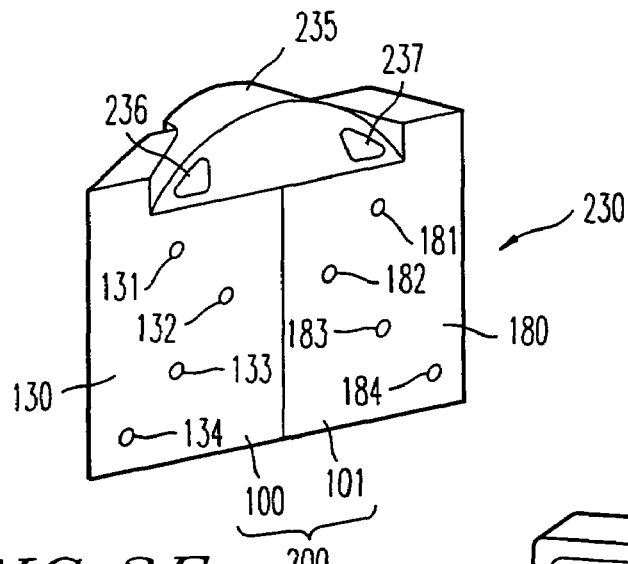
*FIG.2E*
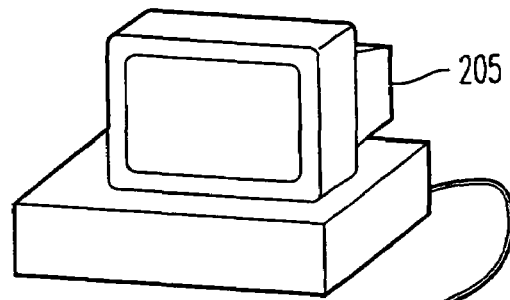
*FIG.2F*
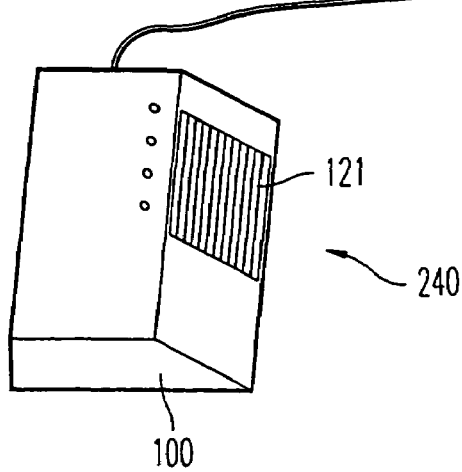
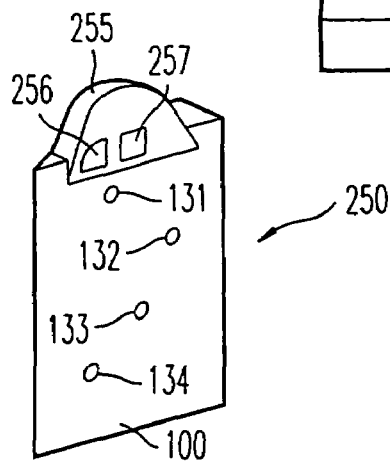
*FIG.2G*

SIDE-PERSPECTIVE VIEW

BOTTOM VIEW

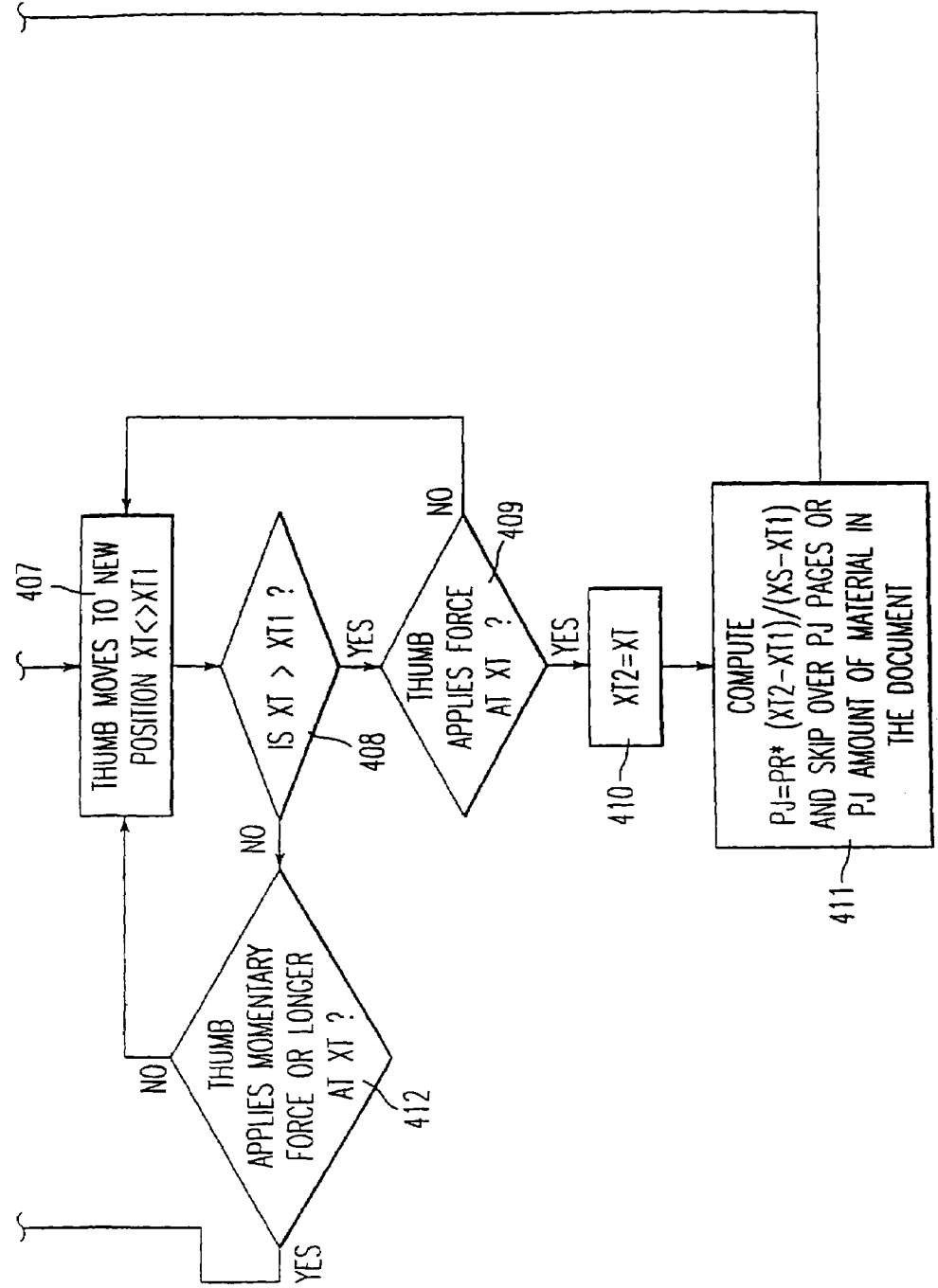

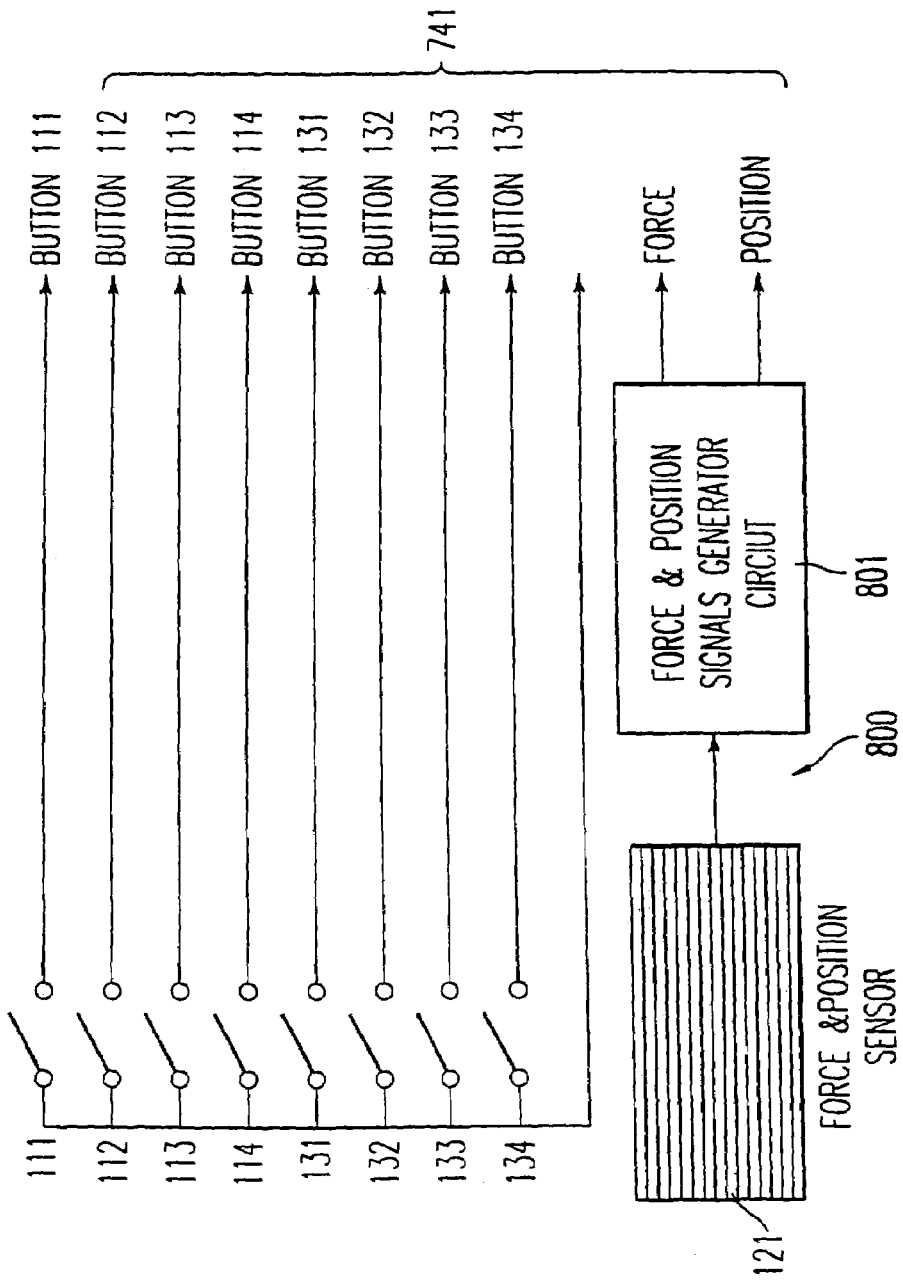

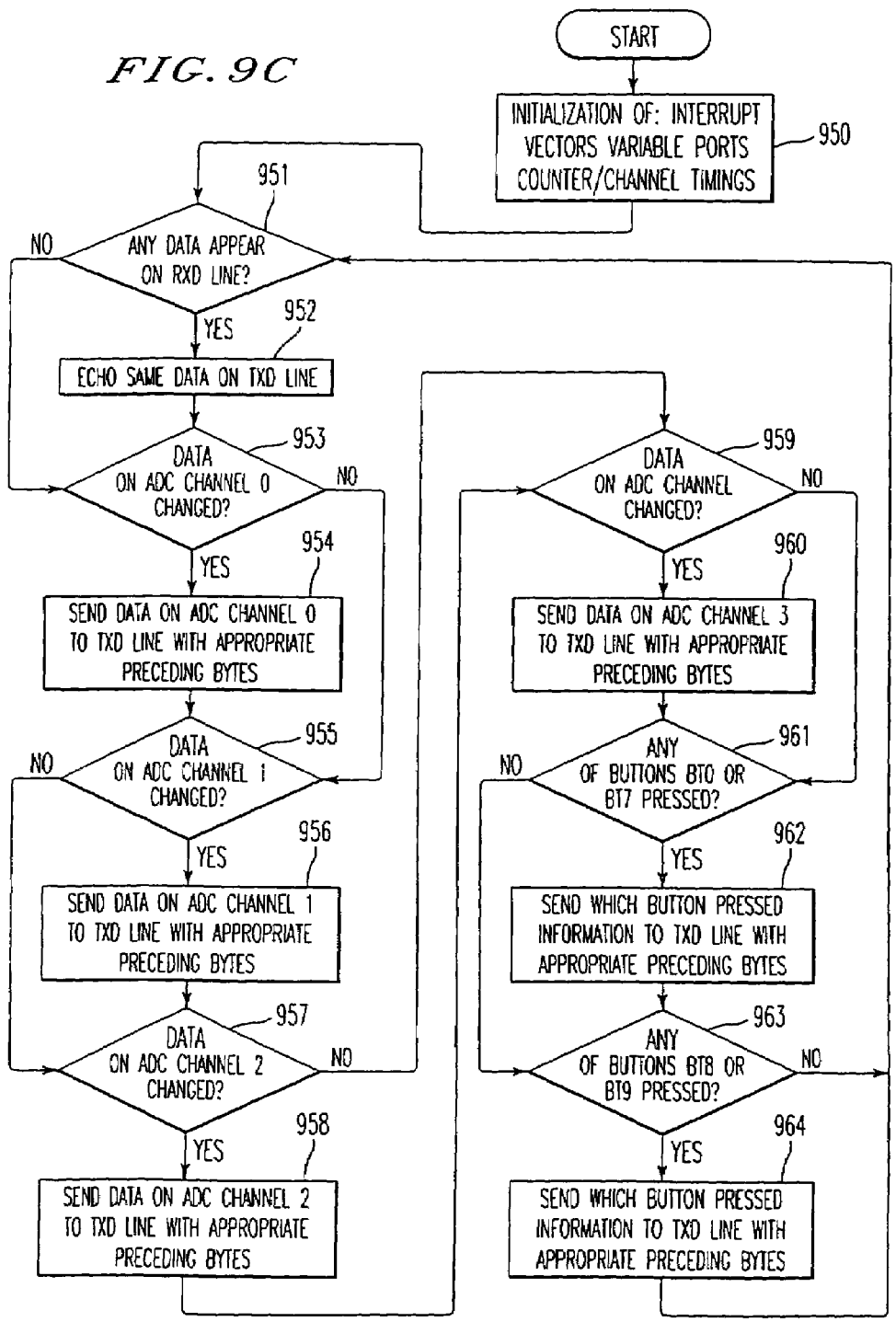

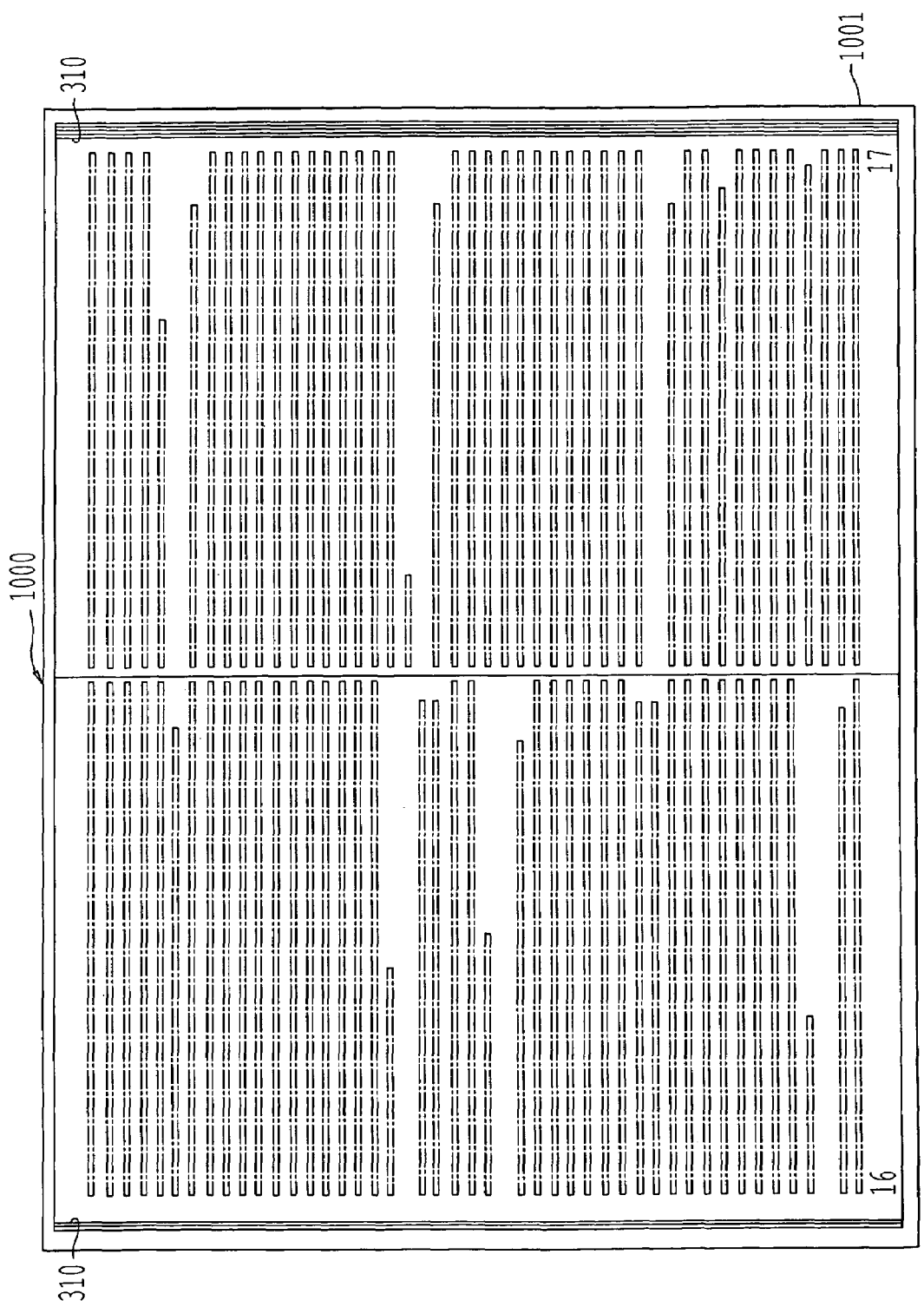

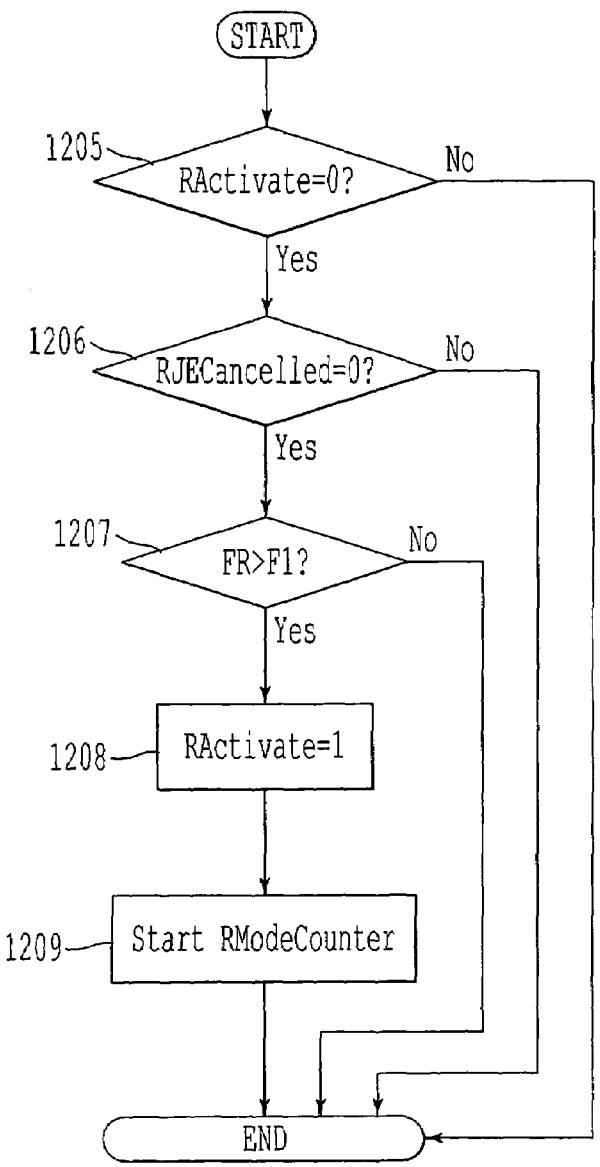
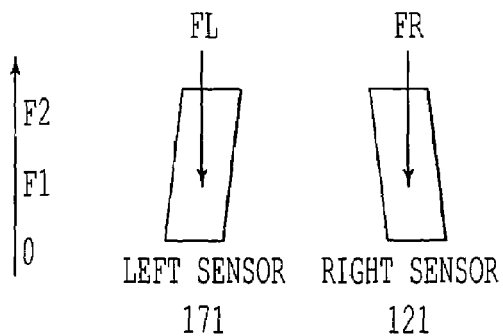
FIG. 12B

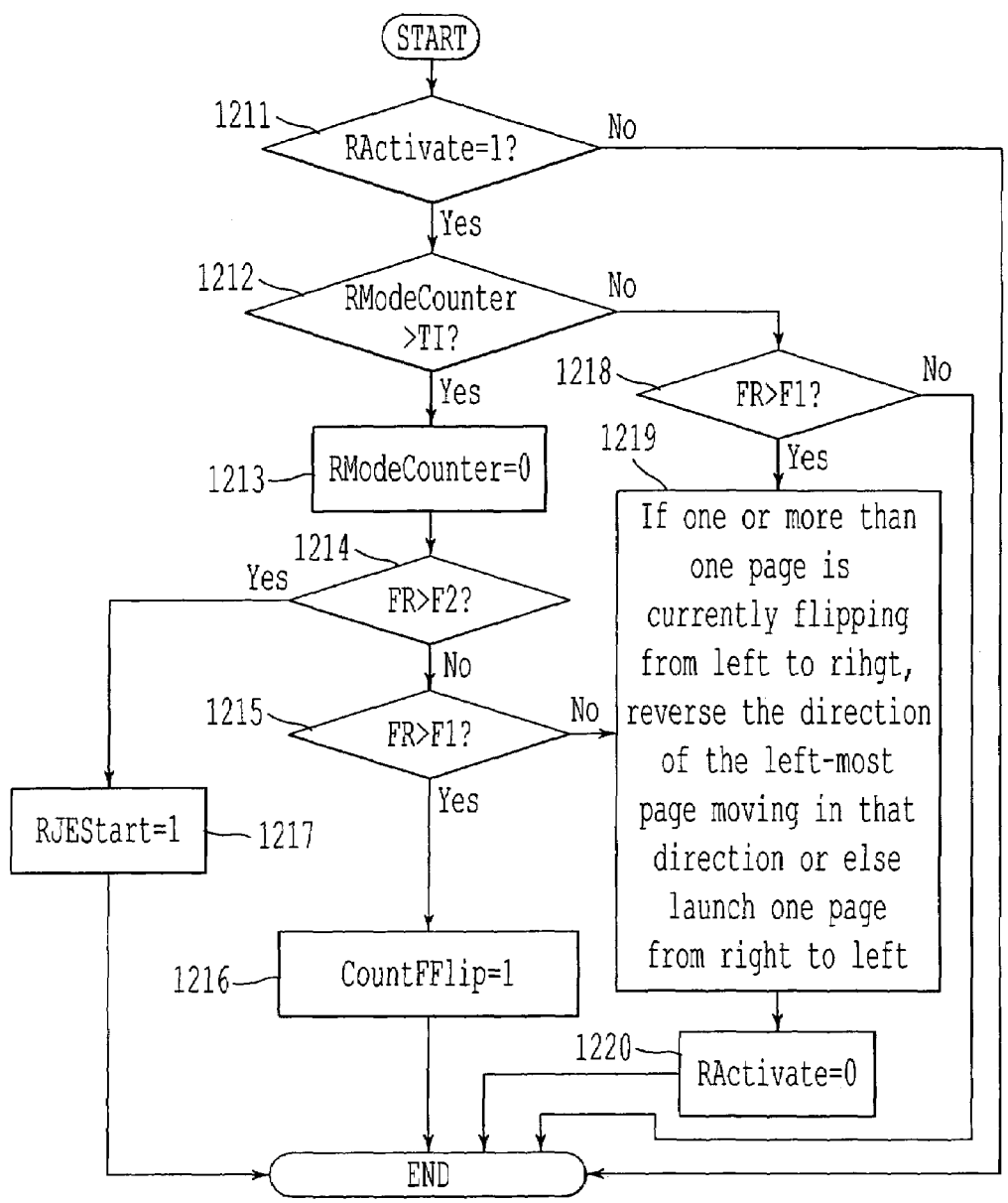
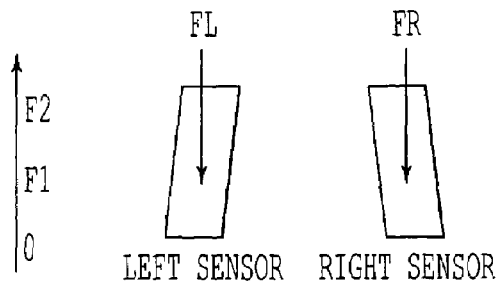
FIG. 12C

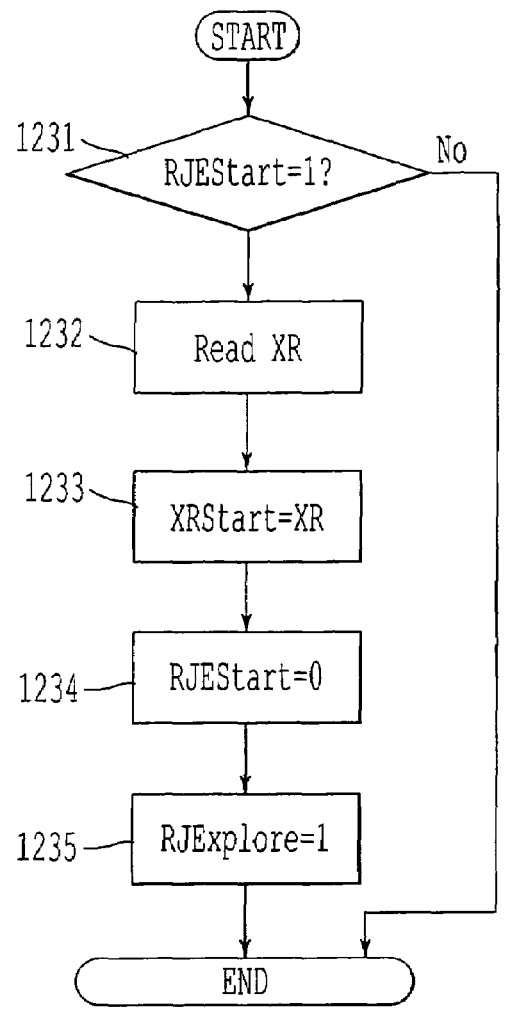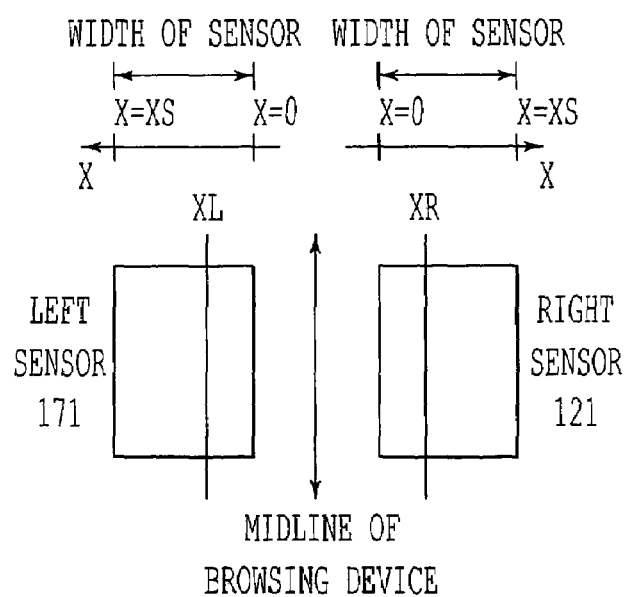
FIG. 12E

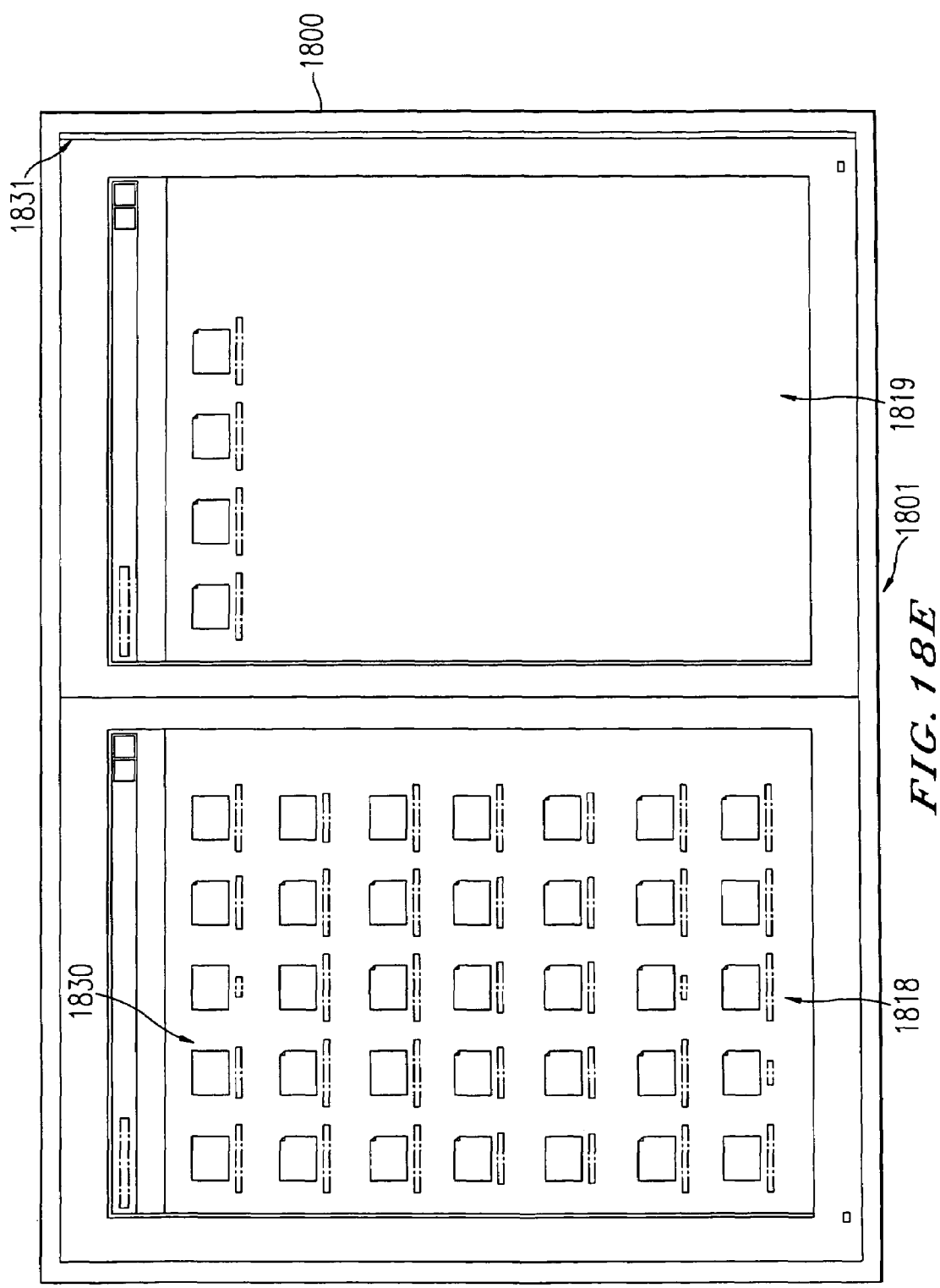

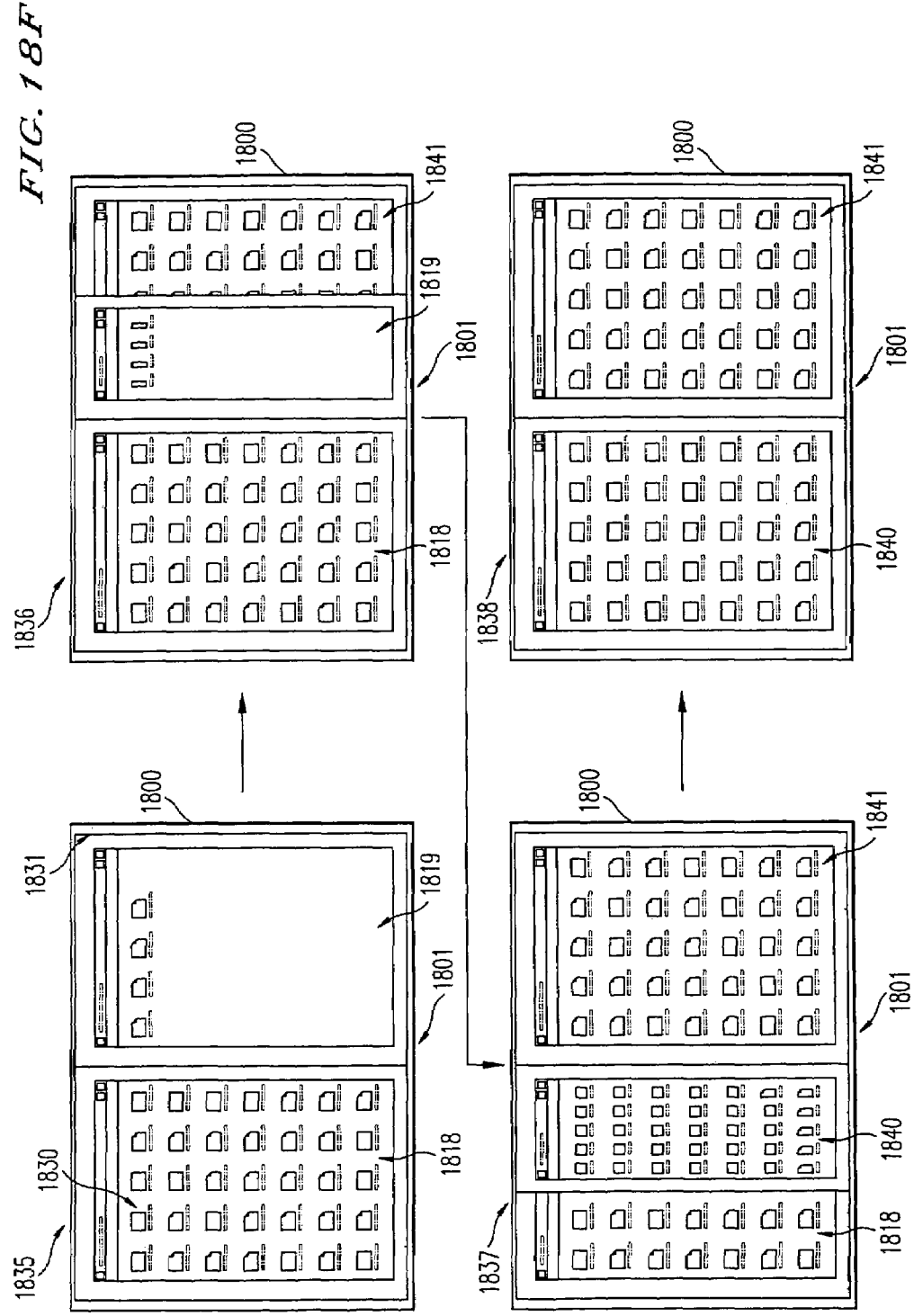

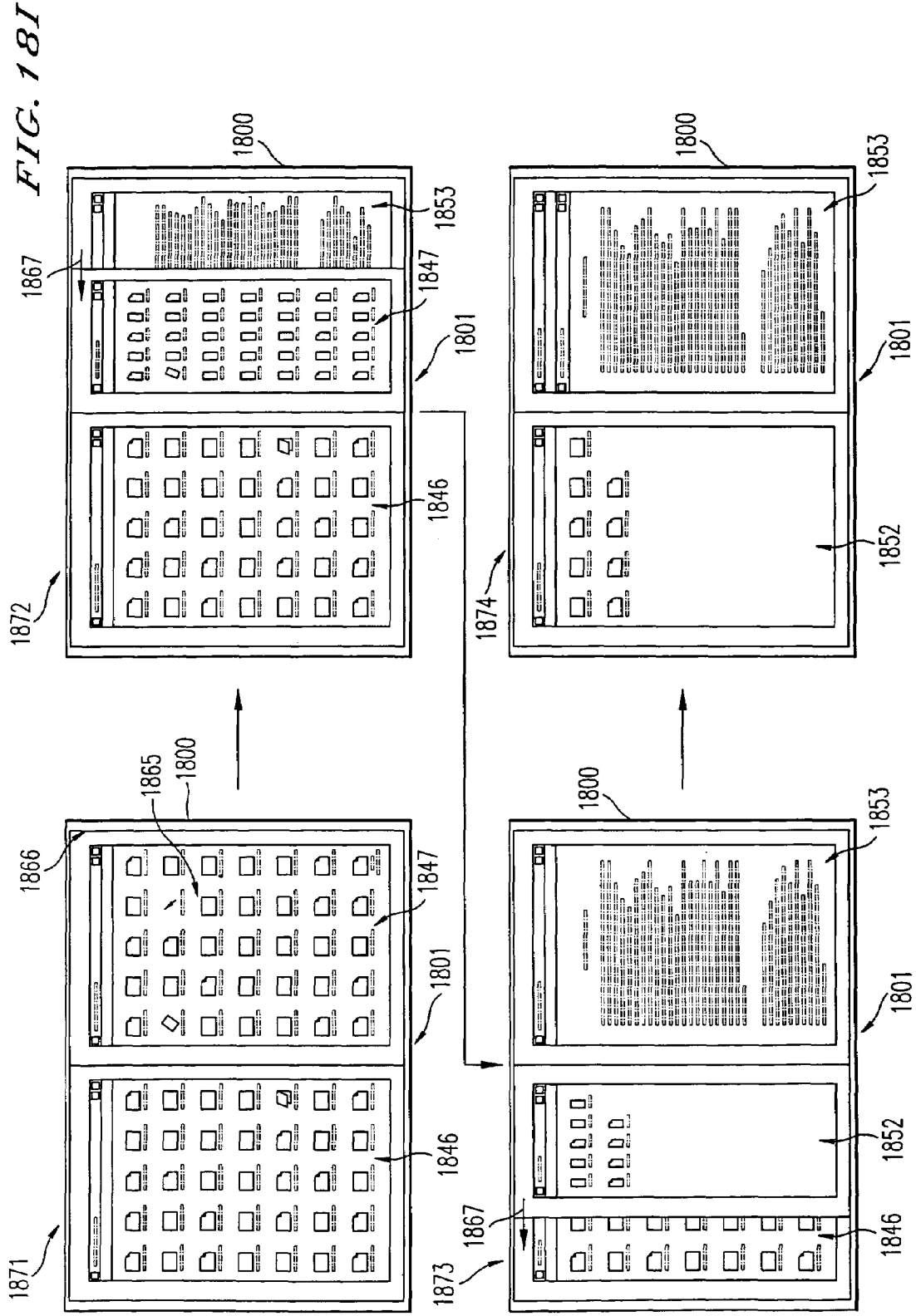

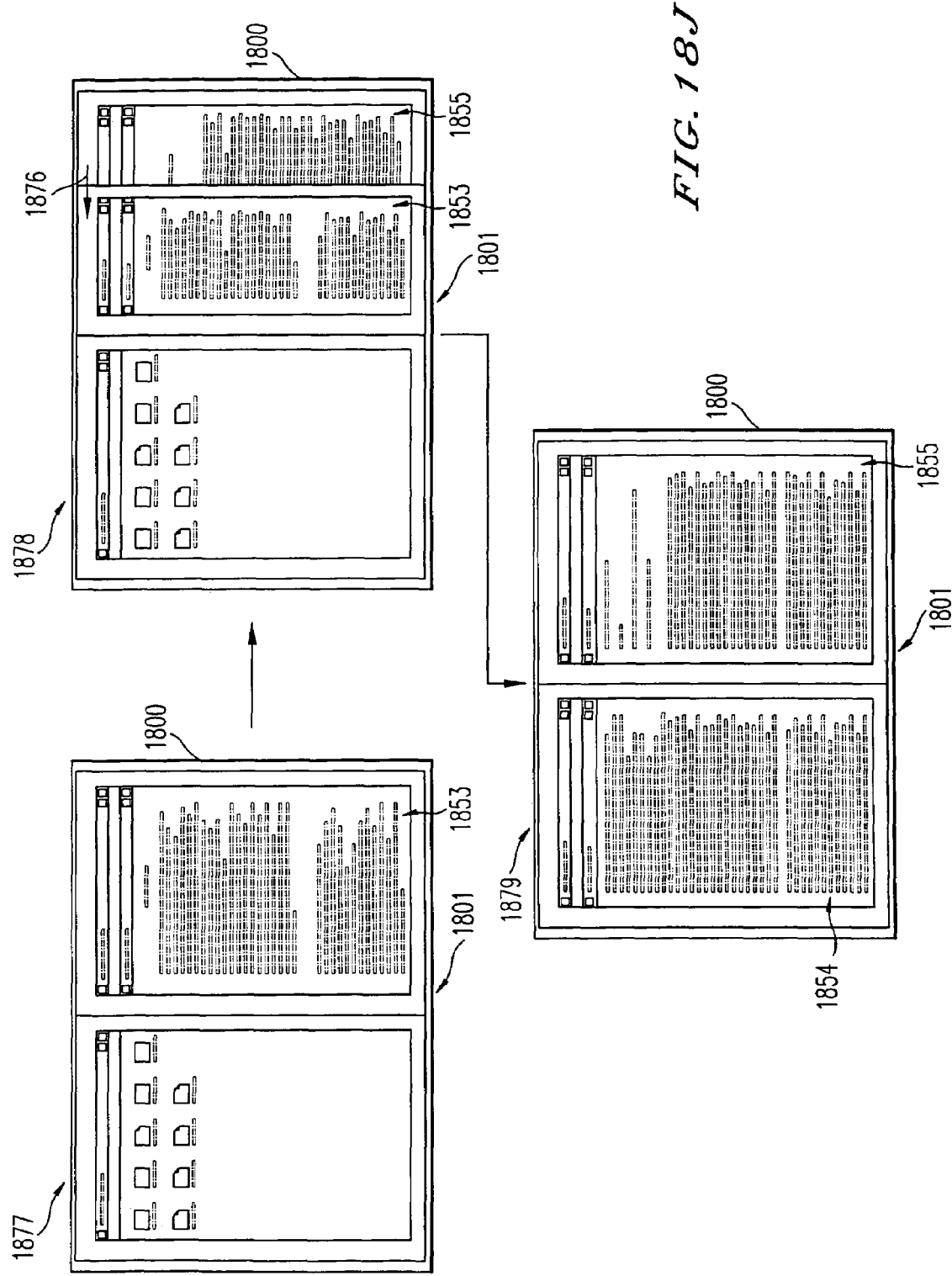

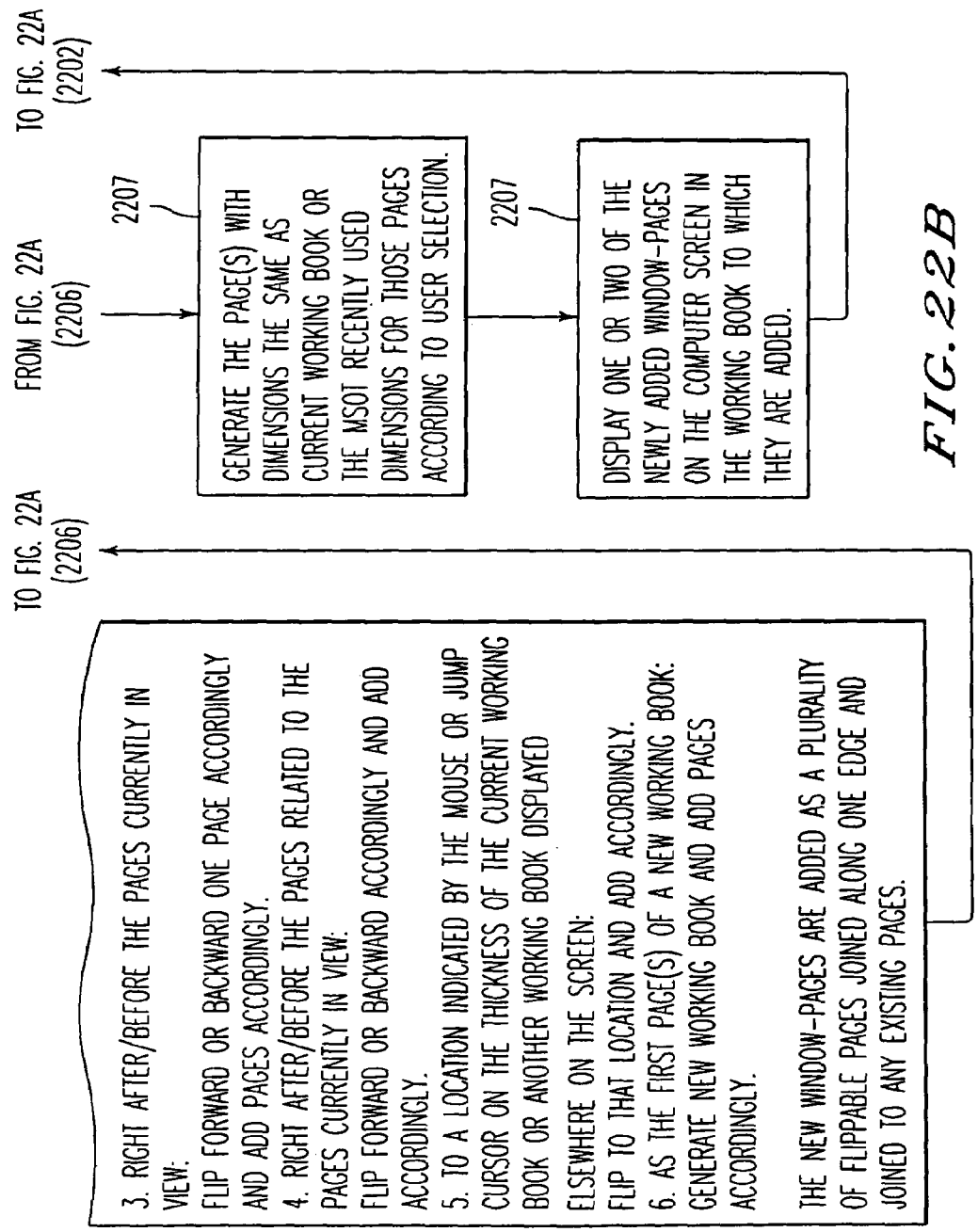

COMPUTER BASED BROWSING COMPUTER PROGRAM PRODUCT, SYSTEM AND METHOD

CROSS REFERENCE TO RELATED APPLICATIONS

This application contains subject matter related to application Ser No. 08/703,407 filed on Aug. 26, 1996 (now U.S. Pat. No. 6,064,384, issued on Jun. 1, 1999), and application Ser. No. 08/703,404 filed on Aug. 26, 1996 (now U.S. Pat. No. 6,340,980, issued on May 16, 2000), both of which are incorporated herein by reference.

BACKGROUND OF THE INVENTION

1. Field of the Invention

The present invention relates to a computer based browsing computer program product, system and method for browsing through documents stored in a computer. Specifically, the present invention facilitates the browsing of a document stored in a computer in such a way that it allows a rapid and holistic view of what contents are present and the organization of the material in the document, as well as rapid access to the items in the document involved. The document-browsing system in the present invention is also generalized to provide a novel human-computer interface, not just for browsing documents but also for interacting with and operating a computer to achieve the various functionalities normally carried out on the computer.

2. Description of the Related Art

Currently, the method for viewing documents stored in a computer is through a computer monitor screen. For documents that are longer/larger than can be contained within one screen, a way is provided to scroll the document up and down or to jump to a particular point in the document (through the use of, for example, a "mouse" coupled with scroll bars at the edges of the document displayed on the screen or through the use of hypertext links).

However, most people do not find this a particularly convenient way to view a document, as compared with a book. That this is true is evidenced in the fact that despite the trend of increased computer usage, there is not only no corresponding reduction in paper use, but an increase in paper quantity is required to print what is conveniently stored in a computer that can be seemingly easily and flexibly manipulated for viewing. Sometimes the printed version of the information involved is necessary, like in the case of printing a picture on a sheet of paper to be pasted on some surface (e.g., a wall), or in the case of the convenience of having a relatively light, hardy paperback book for reading in almost any possible situation and location. Reading textual material on the computer screen for a prolonged period of time also leads to visual fatigue. But there are times when a reader does not need to read for a prolonged period of time and is quite happy to sit at a desk in front of a desktop computer or handle a notebook computer away from the desk, and yet the reader would still prefer a printed version of the document in a hand-held format. This is especially true in the case of looking through manuals, including software manuals, to understand how to operate a device or software application. The irony is that computer software packages (included in computer readable media, such as optical disks, magnetic disks, semiconductor memory, etc.) usually come with thick and heavy manuals containing information which can easily be stored on a lightweight CD-ROM, and even if the manuals are sometimes dispensed in the form of a CD-ROM, more often than not people would print them out into a hard-copy format in order to facilitate reading.

What is involved when one interacts with the printed material in a book is a subtle and complicated process. To start with, material in a book is presented in a sequential order, with a continuity of material from page to page, and there is also a hierarchical structure in the material presented (as the material is organized into chapters, sections, subsections, etc.) because ideas in the material are related to each other in some kind of conceptual hierarchy. The human perceptual system inputs data in a sequential manner, and after a book is read from the beginning to the end in a sequential fashion, the brain then recreates the conceptual hierarchy after viewing the material involved. However, very often one does not read a book (or input the material involved) from the beginning to the end because (a) one wants to have an overview of the material present; (b) one is searching for something of interest to him/her; or (c) one is interested in reading only portions of the book (in the case of, say, reading the manual to understand how to operate something). In these cases, one browses through the subject book to find the material of unique interest to that reader.

Two basic things are achieved in the browsing process. First, the browser has a glimpse of what are the contents of the book document. Second, the browser has an idea of approximately where the items of interest are so that the browser can (a) return to look for them later when needed, and (b) have an understanding of the relationships between the material currently being viewed and other material (i.e., an understanding of the hierarchical structure involved). When browsing a book document, many finger-operations are required of the browser in order to flip through the pages and, together with the inherent sequential order imposed by the pages, very quickly allow the browser to have an understanding of the nature, location and organization of the material involved.

In the process of browsing through a book, one can perform the following operations:
 (a) flip through the pages at varying speeds depending on the level of detail at which one wishes to view the material in the book;
 (b) jump to the approximate location of the item of interest;
 (c) change the direction of flipping (forward or backward) very rapidly because
  (i) one would like to compare and contrast material on different pages,
  (ii) after jumping to an approximate location of some items of interest one would like to find their exact locations, or
  (iii) one is unsure of where the item of interest is and is in the process of searching for it; and
 (d) mark the locations of some pages of interest that one may want to later return.

All these operations are performed very rapidly with the fingers interacting with the flipping pages and with minimal unnecessary movements of the fingers and hands. Interestingly, a book/magazine with soft and flexible pages is harder to handle because more finger and hand movements are needed to browse through it, while books with stiff pages can be browsed with almost no movement of the hand.

In currently available methods of browsing through documents stored in a computer, e.g., the use of a mouse combined with scroll bars and buttons on the computer screen, more movements of the hands are necessary to effect the various operations described above. Also, fine control of the hand or fingers (depending on whether the mouse uses hand movement to move the cursor on the screen or finger movement like in the case of a track ball) is necessary to position the cursor on the screen at the required places. The process is both lengthy and clumsy. The lengthiness of the process taxes the human short term memory's ability to remember items encountered in the recent past for the purpose of establishing the relationships between items and the clumsiness of the process creates distraction and interferes with the short term memory process, a well known effect in perceptual psychology. These destroy the ability of the reader to form an idea of the contents and structure—i.e., a holistic view—of the document involved.

Because material in a book is organized into pages, it allows the reader to quantify approximately the amount of coverage given to each topic—e.g., three-quarters of a page, three-and-a-half pages, etc. In addition, page-oriented organization together with the fact that the pages are joined together in a sequential order with a continuity of material from page to page enhance the ability of the reader to better remember the location of various portions of the material involved (e.g., roughly how many pages from the pages currently in view). Also, unlike the process of scrolling through a document on a screen like what is normally done in a word-processor, wherein the contents become a blur and reading is impossible, when one moves through the material in a book through flipping, one is still able to read at least the approximate contents, if not the details. This, together with the page-oriented organization that enhances the user's impression of the location of material viewed, allow the user to form an impression of the organization of the material in the document.

Another method used for presenting information on the computer screen is flashing one page of information after another. This method eliminates the problem of blurred images but it also eliminates the continuity between different portions of the document. In turn, the lack of continuity eliminates the reader's ability to form impressions of the approximate absolute locations of these portions of the material involved and hence the impressions of the relationships between these portions of the material. As recognized by the present inventor, only the flipping method normally present in a book (e.g., a hardcover book) is able to provide both continuity and readable pages in view. It is due to these features that a person browsing through a book can acquire a good understanding of its contents, the location of specific items and organization of the material, and hence a holistic view of the book involved.

As recognized by the present inventor, it is because of the reasons set forth above that people still prefer to read a book in their hands rather than a document image displayed on a computer screen using currently available methods.

U.S. Pat. No. 5,467,102 (Kuno et al.) discloses a device for document viewing that consists of two display screens. One of the purposes of using two display screens is to allow the user to display two different pages from the document so that they can be read side-by-side (e.g., a diagram and its textual explanation). Another purpose is to allow a large picture to be displayed simultaneously on both pages. The Kuno et al. device allows users to change the speed of movement through the document through a pressure sensor—the more pressure applied, the faster the pages in the document are moved through. The Kuno et al. device also allows the document to be viewed in the forward or backward direction by pressing on a forward sensor area or a reverse sensor area respectively. One can also select a page to jump to by pressing on an icon displayed on the screen. However the Kuno et al. device still does not provide the same convenience as browsing through a book, primarily because when switching between the operations for different controls—the speed of movement through the document, the change of direction of viewing, and the jumping to different parts of the document—there are a lot more hand and finger movements than is the case in manipulating a physical book. Moreover, the Kuno et al. device is a specialized, relatively costly device with sensors and hardware built onto two display screens, whereas the present inventor recognizes that a lower cost and more practical device would be one that adds modularly to the existing computer system.

Currently, there are also computer mice that can eliminate the above-mentioned problem of positioning cursor on the computer screen with a conventional mouse (i.e., fine control of the hand or fingers is needed). These mice allow the user to specify "hot locations" on the screen on which the cursor "homes onto" with less fine control than conventional mice. Furthermore, a subset of these mice can generate "vertical only" or "horizontal only" movement of the cursor so that the scrolling process requires less fine control of the muscle than is required with a conventional mouse. These mice eliminate some, but not all, of the problems associated with the conventional methods of computer input as far as computer-based document browsing is concerned.

In U.S. Pat. No. 5,417,575 (1995) McTaggart discloses an electronic book that comprises laminated sheets bound together in the form of a book. On each of these sheets, printed material is arranged on the top layer and below that layer is an electronic backdrop containing thin light-emitting diodes (LED's) and pressure sensitive switches affixed onto a backing sheet. The LED's generate visual signals that can be seen through the top layer for the purpose of highlighting parts of the printed material. The pressure switches, positioned under certain items in the printed material, are for the purpose of sensing the user's selection of those items. A speaker is also provided on the book to generate audio signals for explaining the text or giving the user audio feedback. Contact or photo-sensitive switches are also embedded in the pages to allow the electronic circuits to know which pages are currently being viewed, so that the appropriate audio and visual signals can be generated. Even though this apparatus is in a form that allows a person to handle it like handling a typical book, with visual and audio enhancements of the printed material as well as facilities that accept the user's feedback, it is basically a hard-wired device that is not reprogrammable and different hardware has to be configured for books with different contents. No provision is available for downloading document files from a computer for display on the electronic book nor is the electronic book able to display any arbitrary document file. This device is hence not suitable for browsing through documents stored in a computer.

Therefore, the present inventor has identified there exists a need for a low-cost, modular device that can be connected to existing computer systems and that, through the computer executing a set of operations stored on a computer-readable medium, can effect rapidly the necessary browsing operations and together with a preferred mode of moving through a document—e.g., the flipping mode—that permits easy, effective computer-based document browsing that approaches that of browsing through a book. A feature of such a system is that it would exhibit functional attributes like those of a paper-book (i.e., a physical book such as a paperback book).

The method of browsing a physical book can also benefit another aspect of human-computer interaction. In 1997, the most popular type of human-computer interface—the WINDOWS interface (e.g., MICROSOFT Corporation's WINDOWS 95® or APPLE Computer's MAC operating system, OS) —also suffers from many of the problems associated with reading documents on a computer. Basically, there are two situations when "windows" are created on the computer screen. The first is when the user needs to look into the contents of "directories" containing either other directories or computer programs and data files. In this situation, what are displayed in a window when it is opened are the contents of a directory. This way, a user can navigate among the directories organized in a tree structure and resident on the computer hard-disks to locate programs (often called "applications") and data. The other is when a user activates a program, and the program either generates some output to be displayed on the computer screen or is waiting to accept some user input (usually either a command to the program or data to be fed into the program). In the WINDOWS interface, these output and input are presented and accepted through a "window", referred to as the working window of a program.

In the case of the use of multiple windows to display the contents of directories in the process of searching for a certain item (either a directory, a program or a data file), if one knows exactly under which directory an item of interest is placed, the tree-oriented structure present in this kind of system can greatly facilitate the search for the item. However, if one does not know where the item is placed, one would need to carry out a large number of operations opening/entering and closing/exiting directories, often across and up and down many levels of the directory structure, and this is carried out with a large number of, and often tiring, operations involving clicking and dragging the mouse (or other pointing device).

The situation is compounded by the fact that often the contents of a directory cannot fit entirely within a window. When that happens, a mouse-cum-scroll-bar method, much like that used for browsing through documents on a computer, is available for use to reveal the hidden parts of the directory involved. The situation is similar to viewing documents on computers, where the process of entering, exiting and scrolling up and down directory windows to search for items of interest demands a large number of finger and hand operations and movement. Also, the flashing in and out of view of these directory windows results in a discrete, non-continuous, and random sequence of images. This results in a poor idea of items' location in the entire directory structure as well as the inability to form a holistic view of the entire collection of program and data files resident on the computer's hard-disk.

In the case of computer programs using multiple windows to interact with a user, because each opened window tends to occlude other windows already present, it is often the case that in the process of accomplishing a certain task (e.g., creating a multimedia document), a large and often confusing sequence of windows has to be opened, closed or moved aside, each window representing an activation of a program to accomplish some subtasks (e.g., extracting some text from a text file, extracting a sub-part of an image from an image file, carrying out some processing on the images thus obtained, "pasting" all these items together in yet another program, etc.) Again a large number of finger and hand operations and movement is required to carry out these operations through the use of a mouse. Furthermore, because the various windows thus opened in this process do not have any fixed locations, and their relative locations keep changing, an excessive amount of mouse operations is often needed just to locate these opened windows or put them away for later use.

The WINDOWS interface derives from the desktop metaphor, in which the computer screen is likened to the desktop, and the windows are thus analogous to items that one normally handles on a desktop. While the desktop interface is a large improvement over the previous kind of command line interface (e.g., MICROSOFT's DOS®), primarily because of its user-friendly graphical interface and menu driven input, it suffers from the same problem of the desktop: when the items to be handled are many, the desktop tends to become very messy, and one often has to keep pushing aside many items to look for other items.

As a practical matter, when a large number of sheets of papers are handled by a person, either to collect information on various things or to scribble down ideas, one often joins (perhaps by a staple or binder clip) these sheets of paper into a temporary "book", or one uses a scrap book with blank pages on which the user may scribble-down ideas. However, the working items, once bound together, are not necessarily related to one another, and thus, are different than a paper book in which the various portions of material are often related to one another. This organization of these sheets of paper allows one to obtain the usual advantages associated with a book, namely, the items of interest acquire absolute locations, and together with the finger/hand operations one can normally apply to a book to search for information, the items of interest can easily be located. Because the pages thus organized in a book can be quickly and easily located and viewed, the effect is tantamount to having multiple pages in view almost simultaneously, and hence it will alleviate the problems associated with the occlusion of pages by other pages or windows by other windows.

Thus, the present inventor has identified that there is a need for a higher level of organization built onto the currently available WINDOWS interface—a "Books" interface—that can be used in conjunction with the above-mentioned low-cost, modular device that can alleviate many of the problems associated with the WINDOWS interface in order to facilitate human-computer interaction.

SUMMARY OF THE INVENTION

In view of the aforementioned short-comings of presently available schemes for browsing through documents stored in a computer, one objective of the present invention is to overcome these short-comings of conventional systems, computer-readable media, and methods.

Another object is to provide a browsing device that exploits the use of finger operations normally involved in browsing through a book, namely, the change of speed of movement through the document involved, the change of direction of movement through the document, the jumping to other portions of the document and the bookmarking of pages (e.g., when a page is bookmarked, it can be returned/jumped to later very quickly by using the controls operated by the fingers).

Another object of the invention is that the positioning, arrangement, and operability of the controls for the above-mentioned operations performed by the fingers are such that they allow almost no movement of the hand and minimal movements of the fingers, thus maximizing the ease of browsing through the stored document by capitalizing on the dexterity of the human fingers to operate these controls.

A further object of the invention is to provide a low cost, modular browsing device that can be easily attached to existing computer systems much like how a mouse attaches to a computer system.

Still a further objective is to provide a reconfigurable construct for the browsing device so that it can be (a) configured into a hand-held controller; (b) attached to the sides of existing computer screens; (c) configured to cooperate with a mouse so that there is no need to move the user's hand(s) when switching between browser-related operations and mouse-related operations; and (d) configured to cooperate with a gyro-mouse so that the entire assembly can be used in the absence of a table top, where the particular construct is selected by the user depending on the user's preference.

Another object of the invention is to provide a computer-readable medium that holds software that when executed by a computer displays, on the computer screen, the document to be browsed by way of browsing commands generated by the user actuating the browsing device. The display is in the form of a book format image that shows the thicknesses of material in the document before and after the currently viewed material, showing of the bookmarks, and showing, on the thicknesses, of the location of the pages that would be jumped to at any given time if jumping were to be effected.

Another object of the invention is to provide a system, computer-based process, and method that permit different organizations of material in the document and corresponding display formats, including: (a) organized into pages that can be flipped through page by page from right to left or vice versa, much like what happens when one flips through a book; (b) organized into pages that can be flipped through page by page from bottom to top or vice versa, much like what happens when one flips through a notepad; (c) organized into pages that can be slid through page by page from right to left or vice versa, much like what happens when one views a microfilm; (d) organized into pages that can be flashed one after another; and (e) organized into pages that can be scrolled through, with no distinct page boundaries, much like what is normally done in a computer implemented word-processor application stored on a computer-readable medium. The first three methods when used together with the aforementioned browsing device result in a browsing process that most resembles that of browsing through a book, a notepad, or a micro-film. The last two methods do not precisely emulate the book-browsing process but can still benefit from the rapidity of finger control effected on the browsing device.

Another object of the invention is to provide a computer based mechanism that implements simultaneous multiple indexing in conjunction with the inventive browsing system. When a keyword of interest is encountered during the reading of the document, the user selects the keyword using a cursor on the screen in conjunction with a pointing device such as a mouse, like what is normally done in current computer systems, or using his/her finger in conjunction with a touch or pressure sensing screen, or other methods. In response, the pages on which explanations or other issues related to this keyword reside are bookmarked by the inventive system, after which the user can quickly flip to one of these pages using the mechanisms provided in the browsing system.

Another object of the invention is to use the above-described browsing facility in conjunction with other software, storable on computer readable media, that is configured to reorganize the material in the document involved to facilitate browsing/viewing—for example, the positioning of material for comparison side by side on the pages currently being viewed.

Another object of the invention is to use the above-mentioned browsing facility in conjunction with software, storable on computer readable media, that can highlight selected portions of the material or annotate on the pages in the document involved to facilitate browsing/viewing/reading.

Yet another object of the invention is to provide the above-mentioned browsing facility to a computer configured to execute word processing software so as to facilitate the entering, processing, and viewing/browsing of material in conjunction with the word processing software.

Another object of the invention is to provide the above-mentioned browsing facility to any software, storable in a computer-readable medium, in which information cannot be fitted within one computer screen for viewing or manipulating.

Yet another object of the invention is to add a new metaphor mechanism—the "library metaphor"—to the computer operating system's human interface in which information on the computer screen which is traditionally presented in the form of windows is now be presented in the form of "books".

These and other objects are achieved by providing a processor-based browsing device, system, computer-readable media, and method for browsing through a document that includes, a top surface, a sensor surface and a bottom surface. A sensor area on the sensor surface detects the position of a finger along one direction and the force of the finger on the sensor area. The browsing device also includes four buttons/on-off switches on the bottom surface, and four additional buttons/on-off switches on the said top surface, each of which is operated by the fingers. An electrical circuit converts the force and position of the finger on the sensor area as detected by the force and position sensors on that area into electrical forms and outputs them. The electrical circuit also outputs the on/off states of the four buttons/on-off switches on the bottom surface, and four additional buttons/on-off switches on the said top surface. The device connects to a computer configured to implement in software the control, sense, and display mechanisms consistent with the users activity with the browsing device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A and 2B are top/bottom perspective views of the browsing device configured into a mini-book configuration used in conjunction with a computer;

FIG. 2E is a front perspective view of the browsing device configured into a gyro-mouse configuration used in conjunction with a computer;

FIG. 2F is a front perspective view of the browsing device configured into a one-hand configuration used in conjunction with a computer;

FIG. 2G is a front perspective view of the browsing device configured into a one-hand-gyro-mouse configuration used in conjunction with a computer;

FIGS. 4A and 4B are a flowchart that details the mechanisms for jumping to other parts of the document being viewed/browsed through and movement through a document under the control of the thumb on the browsing device of present invention;

FIG. 8 is a schematic electrical block diagram of the buttons and sensor portions of the browsing device of FIGS. 1B and 1C;

FIG. 9C is a flowchart of a control program retrievable by the micro-controller chip 900 in the circuit of FIG. 9A so as to generate signals in the format of FIG. 9B for the RS232 port of the computer;

FIG. 10A illustrates a computer book displayed on a screen that is to be browsed by using the flipping method and the browsing device of the present invention;

FIG. 10F illustrates the creation of a finger-bookmark;

FIGS. 12A-12I show the flowchart of one embodiment of a computer-based process that generates the necessary operations for the purpose of browsing through a document as controlled from a browsing device;

FIGS. 18A-18M illustrate the various implementation processes of a "Books" interface according to the present invention;

FIGS. 22A and 22B are a flowchart of a method for implementing the processes of the Books interface;

DESCRIPTION OF THE PREFERRED EMBODIMENTS

Figure 1A:
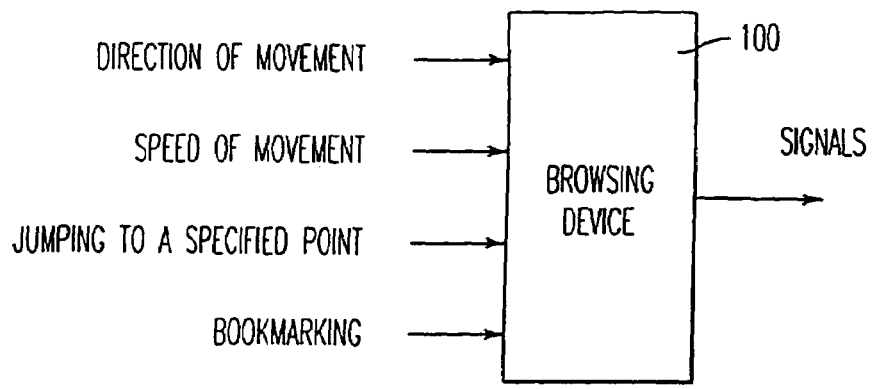
FIG. 1A is the block diagram of the browsing device according to the present invention, detailing input commands and output signals.

Referring now to the drawings, wherein like reference numerals designate identical or corresponding parts throughout the several views, and more particularly to FIG. 1A thereof which depicts the browsing device 100 according to the present invention that can be used in conjunction with existing computer systems for the purpose of browsing through documents or any information stored in the computer. While certain embodiments of the browsing device (e.g., device 100) are shown herein, other data input devices, such as keyboards, keypads, a computer mouse used with pull-down menus, etc., may be used as well to accomplish the browsing functions, albeit in a less convenient format. Nevertheless, in reference to the browsing device 100, four commands are input and detected by the browsing device 100. These commands include the following: (a) specifying whether a movement in a forward direction or in a backward direction through the document is to be performed; (b) specifying a speed of the movement described in (a); (c) jumping to a specified location in the document or information involved; and (d) specifying that certain portions of the document or the information involved is to be bookmarked. Based on these commands, signals are generated and output to effect the necessary operations in a computer system (e.g., computer 205 in FIG. 2A) attached to the browsing device 100.

Figure 1B:
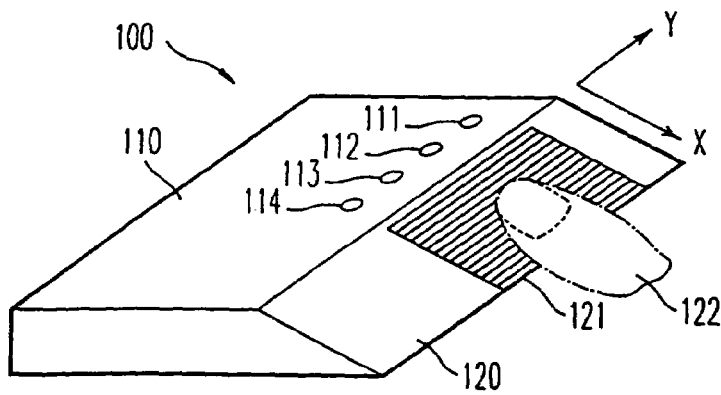
FIGS. 1B and 1C are a schematic perspective upper and lower views of a first embodiment of the browsing device.
Figure 1C:
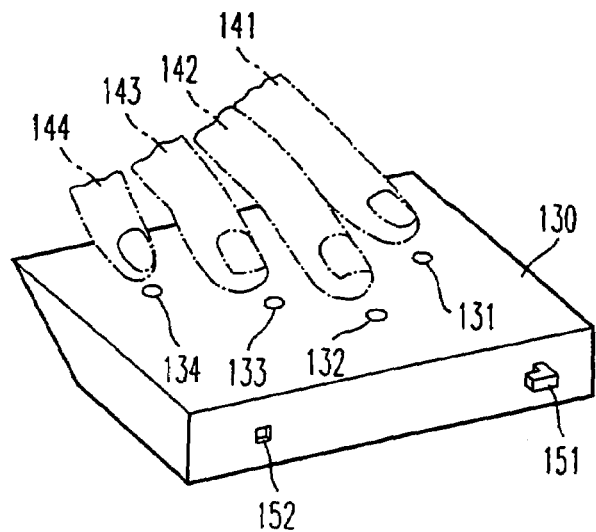

FIGS. 1B and 1C depict a top and bottom view of one embodiment of the primary browsing device 100 according to the present invention. The browsing device 100 includes a slanted surface 120, extending from a top surface 110 of the browsing device 100. The slanted surface 120 supports a user's thumb 122 on which to rest, although the user may use another instrument or finger as well. During operation, four other fingers 141-144 are placed on a bottom surface 130 of the device (as shown in FIG. 1C), opposed to the thumb 122. On the slanted surface 120 a set of force and position sensors disposed in a sensor area 121 (sensors such as an appropriately customized version of Interlink Electronics Thin-film Linear Potentiometer Part Number 360) detect (a) a force of the thumb 122 on the slanted surface 120 within the sensor area 121 and (b) the position of the thumb 122 (or one of the other fingers) in the sensor area 121 in the direction of the slant. Henceforth the direction of the slant is referred to as an x-direction, as shown in FIG. 1B, where the positive x-direction points away from the edge that adjoins the top surface 110 and the slanted surface 120. The position of the thumb 122 (or one of the other fingers) in the y-direction (a direction perpendicular to the x-direction on the slanted surface 120) gauges whether the thumb 122 remains on the sensor area 121.

As shown in FIG. 1C, four buttons/switches 131-134 are placed on the bottom surface 130, within easy reach of the four fingers (141-144) during those operations when these fingers (141-144) are placed on the bottom surface 130. On the top surface 110 of the device 100, another four buttons/switches (111-114) are placed, preferably parallel to the edge adjoining the top surface 110 and the slanted surface 120, as shown in FIG. 1B.

The force of the thumb 122 (or one of the other fingers) on the sensor area 121 dictates how fast to move through the document, and the position of the thumb 122 (or one of the other fingers) along the x-direction dictates the point to which the document is jumped. More particularly, the buttons (131-134, and 111-114) on the bottom and top surfaces (130 and 110 respectively) are for the purposes of bookmarking. The use of these buttons (131-134, 111-114) depends on the particular configuration in which the browsing device 100 is used and will be described below.

Figure 2C:
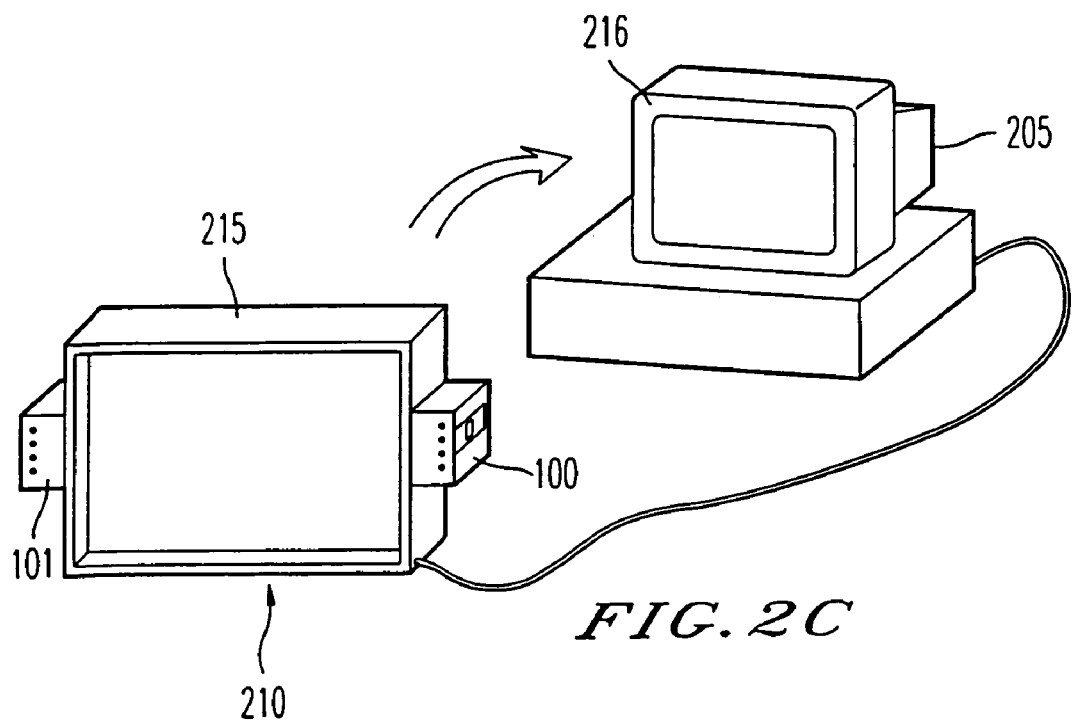
FIG. 2C is front perspective view of the browsing device configured into a screen configuration used in conjunction with a computer.

FIGS. 2A-2F depict alternative configurations to employ the browsing device 100 for producing the browsing input. The browsing device 100 depicted in FIGS. 1B and 1C is preferably used with an operator's right hand. A left-hand version of the browsing device 101 as depicted in FIGS. 2A and 2B is employed in some of the alternative embodiments depicted in FIGS. 2A-2F.

FIGS. 2A and 2B depict top and bottom views of one embodiment of the mini-book configuration 200 in which a left-hand version 101 and a right-hand version 100 of the browsing device 100 are joined back-to-back through latching mechanisms 151 and 152 as shown in FIG. 1C and the resulting assembly 200 is electrically operatively connected to the computer 205 (such as an IBM Aptiva A92, Part Number 42H0333). In operation, the left and the right hands operate the devices on the left and right respectively, hence the left thumb 172 and right thumb 122 rest on the left and right sensor areas (171 and 121) respectively. The other four fingers of both hands are placed near the buttons (131-134, 181-184) on the bottom surfaces 130 and 180 of both the left and right devices. In this configuration, the buttons (111-114, 161-164) on top surfaces 110, 160 are available for auxiliary functions.

In this configuration, the direction of movement (i.e., forward or backward) through the document (using flipping or other methods, all to be described in detail later) is effected through the force applied by the right and left thumbs (122 and 172) on the sensor areas 121 and 171 respectively. The right thumb 122 force activates a forward movement through the document and the left thumb 172 force activates a backward movement. The speed of movement is preferably proportional to the force applied, although other force/speed relationships may be employed successfully. The right thumb 122 operating the right sensor area 121 activates jumping to points in the document involved that lie between the currently viewed material in the document and the end of the document and the left thumb 171 operating the left sensor area 172 activates jumping to points in the document involved that lie between the currently viewed material in the document and the beginning of the document. As shown in FIG. 2B, the right fingers other than the thumb 122 operating the buttons 131-134 on the bottom surface 130 create bookmarks for points in the document involved that lie between the currently viewed material in the document and the end of the document and the left fingers other than the thumb 172 operating the corresponding buttons 181-184 on the corresponding bottom surface 180 create bookmarks for points in the document involved that lie between the currently viewed material in the document and the beginning of the document.

An x-direction is defined along the slanted surface for the left-hand device 101 that is perpendicular to the edge adjoining the top surface 160 and the slanted surface 170 of the left-hand device 101 and the positive x-direction is taken to be the direction away from that edge as illustrated in FIG. 2A. The operations to be described below for the sensor areas 121 or 171 and for the buttons on the bottom surfaces 131-134 or 181-184 are similar for both the right-hand device 100 and the left-hand device 101 and unless necessary, only the operations for the right-hand device 100 will be described.

The position of the thumb 122 in the x-direction on the sensor area 121 (refer to FIG. 1B) as detected by the position sensors on the slanted surface 120 determines the page in the document to jump to (for the cases in which the material in the document is organized into pages to be flipped, slid or flashed on the computer screen, the details of which will be described later) or the point in the document to jump to (for the case in which material in the document is not organized into pages like in the case of the use of scrolling to move through the document). Let x=0 (the origin) be the point at which the slanted surface 120 meets the top surface 110. The thumb 122 will be referred to as being "at" position x1 when it covers the point x1 and some contiguous points to the "right" of x1, i.e., some of the contiguous points x such that x>x1, and "right" refers to the conventional positive axial direction. This is because the intersection of the thumb 122 and the slanted surface 120 (in the sensor area 121) on the browsing device 100 has a small spatial extent and hence it will have some dimension in the x-direction.

Figure 3:
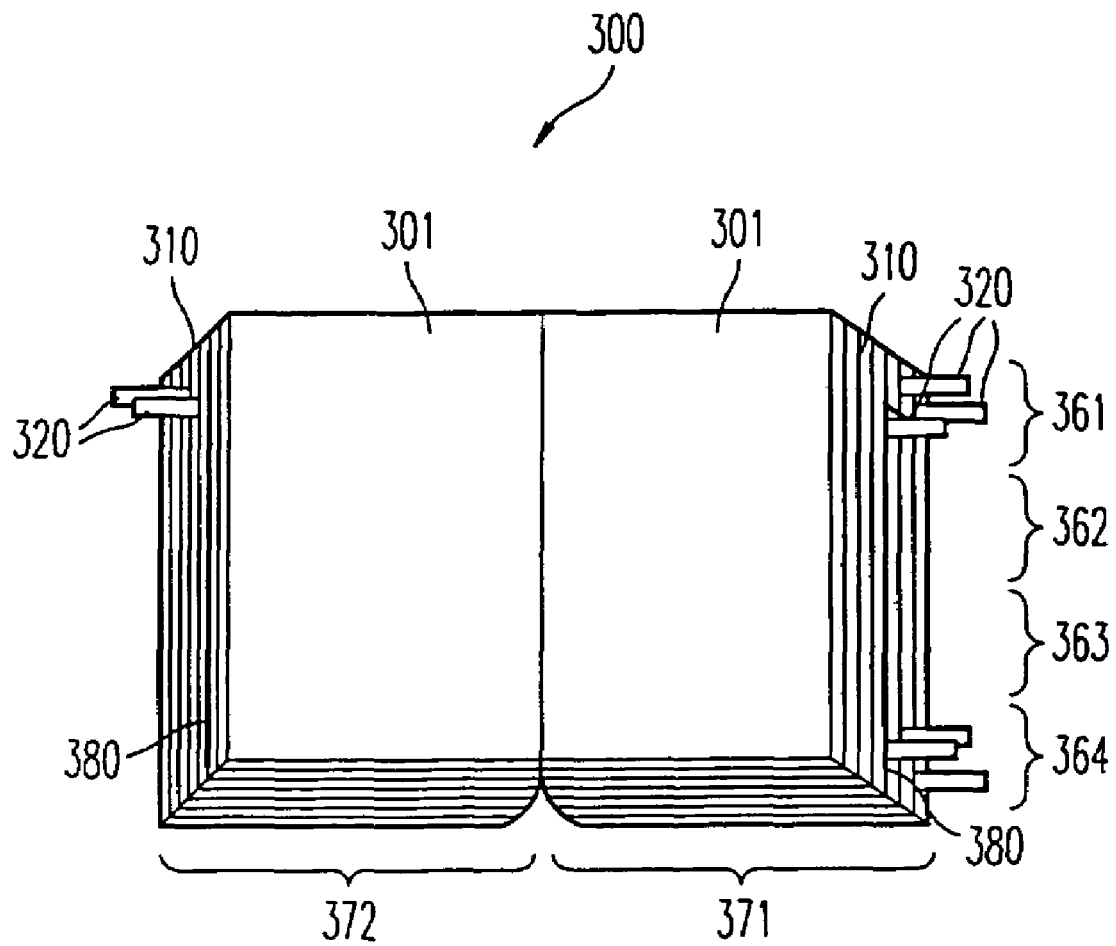
FIG. 3 is a top perspective view of a computer book displayed on a screen that is to be browsed through using browsing device of the present invention.

FIG. 3 shows the "book" 300 displayed on the computer screen, henceforth referred to as the computer book. When using the current embodiment of the browsing device 100, in order to allow the user to have an idea of the thickness of the computer book 300 on both sides, so that the user can have a good idea of the approximate location of the currently viewed pages in the document involved, the thickness 310 of the computer book 300 on both sides is shown on the computer screen next to the displayed pages 301 as shown in FIG. 3.

In the browsing of a real book, the thumb selects the page to jump to by sliding along the side until it reaches that page. In the process of accomplishing this, the thumb slides along the side of the book in a direction perpendicular to the edge of the book the thumb is touching (similar to the x-direction in FIG. 1B) by an amount proportional to how far along in the document the page to be jump to is from the current page. Because in the browsing device 100 depicted in FIG. 1B, the width of the slanted surface felt by the thumb does not change, even as the amount of material/number of pages present on that "side" of the "book" changes, the translation of the x-position of the thumb to a page in the document to jump to is slightly more complicated.

Consider initially no force is applied onto the sensor area 121 by the thumb 122 and a certain page of the document involved is being displayed. When the thumb 122 is placed at any position x=XT1 on the sensor area 121 and when a force is applied for a time longer than a user-specified pre-defined, short period, preferably, but not limited to, a range of 100 milliseconds to 1 second, the document is moved through forward (or backward if the left sensor area 171 is activated by the thumb 172). The speed of movement is proportional to the force applied. If the force is applied only momentarily, (e.g., less than preferred 100 millisecond) no movement through the document takes place, but a starting position for any subsequent jumping process is taken to be XT1. When the thumb 122 is moved from x=XT1 to a position XT2 (XT2>XT1) and the thumb 122 is pressed momentarily, a jump is made to a page in the document that is further along. Let XS be the width of the sensor area 121 and let PR be the number of pages remaining from the current page to the end of the document (or to the beginning of the document, if the left device 101 is activated). PJ, the number of pages to skip over is equal to PR*(XT2−XT1)/(XS−XT1). That is, at any given time, the distance along the slanted surface from the current thumb position XT1 to the edge, XS, is treated as being proportional to the number of pages remaining from that point to the end or beginning of the document. In the case of using the method of scrolling to display the document in which the material is not organized into pages, then PR becomes the amount of material, say the number of lines of material, remaining and PJ becomes the amount of material to be skipped over.

After the thumb 122 moves from the starting position XT1 in the positive x-direction, before it applies any force to effect a jump, it is at liberty to move between XT1 and XS in the positive or negative x-directions to search for a page it wishes to jump to. If in this process the thumb 122 moves in the negative x-direction beyond the starting position XT1, whatever new position the thumb 122 finds itself in and after having applied a momentary force in that position, that position will become a new starting position XT1 for the computation of any subsequent jump. If the thumb 122 did not apply any momentary force after having moved in the negative x-direction beyond the starting position XT1, and then it moves back past XT1 in the positive x-direction, the starting position for any subsequent jump will be XT1.

When one continues to apply force for longer than the user-defined pre-defined, short time period on the sensor area 121 using the thumb 122 after a jump is made while holding the thumb 122 at the same position, the movement through the document begins from that page/point onwards, and the speed of movement is proportional to the force applied as before.

The starting position of the thumb 122 for the jumping process can be at x=0 or any position XT1 in the x-direction. But starting at x=0 allows the use of a larger width (from x=0 to XS) to correspond to the remaining material and thus a better resolution of control in terms of jumping/skipping. At any given time, no matter how much remaining material there is, while one is moving through the document by having the thumb 122 at a given position, one can always move the thumb 122 back to a position of smaller x (that does NOT trigger a movement through the document in the opposite direction—one has to use the other device operated by the other hand to change direction) or x=0, and apply some force momentarily to signify that the user has now repositioned the thumb 122. The user may then continue the process of moving through the document by applying the force longer than a pre-defined, short moment, or use this current position as a new reference/starting point (XT1) and slide the thumb 122 to a new position (XT2) to skip through some material. The movement of the thumb 122 back to a smaller x or x=0 to define a starting position XT1 before the jumping process gives the user a better resolution for the jumping/skipping control.

The mechanisms for jumping to some other parts of the document and movement through the document under the control of the thumb 122 as described above are described in the flowchart in FIG. 4.

Consider initially a certain page of the document is being displayed. In step 401, the thumb 122 is placed at position XT on the sensor area 121. The process flows to step 402, where a check is made to determine if a force has been applied momentarily or longer (than a predefined, short time). If not, nothing happens; the thumb 122 may move to a new position XT (step 403) or stay in the same position XT. If an affirmative response is received in step 402, a check is made to see if the thumb has applied the force longer than momentarily. If so, the process flows to step 405 where movement through the document is initiated (with a speed proportional to the force applied and a direction depending on whether the left-hand device 101 or the right-hand device 100 in the mini-book configuration 200 is activated). If a negative response is received in step 404, the process flows to step 406. Similarly, after initiation of movement through the document in step 405, the process also flows to step 406. In step 406, the starting position XT1 is assigned the value of the current thumb 122 position XT. The process then flows to step 407 where the thumb 122 either stays in the current position or moves to a new position XT (<>XT1). The process then flows to step 408, where a check is made to find out whether XT is greater than XT1. If so, a check is made in step 409 to find out whether a force is applied at XT; if not, nothing happens and the thumb may move to a new position XT (<>XT1) in step 407. If the response to step 409 is affirmative, the process flows to step 410, where XT2 is assigned the value of the current XT. The process then flows to step 411 where a value PJ=PR*(XT2−XT1)/(XS−XT1) is computed. (PR is the number of pages or amount of material remaining from the current page to the end of the document if the right-hand device 100 in the mini-book configuration 200 is now being activated or from the current page to the beginning of the document if the left-hand device 110 in the mini-book configuration 200 is being activated. XS is the width of the sensor area 121.) A jump is effected that skips over PJ pages or PJ amount of material in the document. The process then flows back to step 401 where the process repeats.

If in step 408, XT is found to be smaller than XT1, then the process flows to step 412 which checks if a force has been applied at XT momentarily or longer. If not, nothing happens, the process flows to step 407 where the thumb can move to a new position XT. If so, step 413 checks to see if the force applied is longer than a pre-defined, short period. If the force applied is longer than a pre-defined, short period, the process flows to step 414 where movement through the document is initiated (with a speed proportional to the force applied and a direction depending on whether the left-hand device 101 or the right-hand device 100 in the mini-book configuration 200 is activated). If a negative response is received in step 413, the process flows to step 406 where the starting position XT1 is assigned the current value of XT. After the initiation of movement through the document in step 414, the process also flows to step 406.

The above described method of jumping/skipping through the pages through the use of the sliding of the thumb 122 over a certain distance (in the x-direction) is referred to as the relative distance method whereas the jumping/skipping in the process of browsing through a physical book uses absolute distance (in the direction perpendicular to the edge of the book). Another embodiment of the browsing device 1600 that uses absolute distance will be described later in reference to FIG. 16.

To provide the user with feedback of his/her thumb movement on the sensor area 121 along the x-direction (FIG. 1B) before he/she effects the jump to a different part of the document involved, an indication 380 of the position of the thumb 122 is provided on the thickness 310 area of the book 300 displayed on the screen next to the pages 301 currently being viewed (FIG. 3). This indication 380 is referred to as the jump cursor. Recall that the thumb 122 starts from one point on the sensor area 121 and slides on the sensor area 121 in the x-direction before a force is applied to effect the jump. In this process, the thumb 122 slides over many points on the x-position sensor 121 on the slanted surface 120. An indication is made on the computer screen of the location of the page that would be jumped to had the thumb 122 applied a force at any given point along the x-direction. As the thumb 122 slides on the sensor area 121 before the application of the force, the whole width of the thickness 310 displayed on the screen next to the currently viewed pages 301 is preferably divided into two parts. One part corresponds to all the pages that will be skipped if a force were applied at that point in the x-direction on the sensor area 121. The other part corresponds to the pages that remain from the page jumped to if a force were applied to the end of the document (if one is moving forward through the document and the right hand device 100 in the mini-book configuration 200 is being activated) or to the beginning of the document (if one is moving backward through the document and the left-hand device 101 in the mini-book configuration 200 is being activated). There are two ways to display the boundary 380 (a thin line) between these two parts that corresponds to the point or page in the document jumped to if a jump were to take place. Preferably within the thickness area 310 on the computer screen is shown by the boundary, a thin line, as being different in darkness, texture, or color (preferably darkness) from the rest of the thickness 310—hence one would see a line oriented perpendicular to the x-direction (parallel to the y-direction, FIG. 1B) and whose length is confined to the thickness 310 region moving in the positive or negative x-direction depending on the direction of movement of the thumb 122 on the sensor area 121. Alternatively, one part, say the left part, is shown as being different in darkness, texture or color (preferably darkness) from the other part, say the right part—hence one would see one part expanding and the other contracting, or vice versa, depending on the direction of movement of the thumb 122 on the sensor area 121.

The use of the four buttons 131 to 134 on the bottom surface 130 of the browsing device 100 will be described for bookmarking. During operation, each of the other four fingers 141 to 144 except the thumb 122 is placed near each of the four buttons 131 to 134 and each of these buttons is meant to be operated by the finger nearest to it. At any moment when one is viewing a page of the document and decides that it might be of interest to return to later, one presses one of the buttons 131 to 134 momentarily and then lets go, either once or twice, depending on whether one wishes to create a finger-bookmark or a permanent-bookmark respectively as will be described below. The page will then be bookmarked and a bookmark 320 is displayed on the screen as shown in FIG. 3—sticking out from the position of the page/point that it marks on the side of the book 300. One can use the same button (one of the buttons 131 to 134) to bookmark more than one point/page. All the bookmarks 320 that are created by the same button (i.e., one of buttons 131 to 134) are clustered together (e.g., one of clusters 361 to 364) and displayed as such as shown in FIG. 3.

After one has bookmarked a certain page/point on a certain side (right, 371, or left, 372, FIG. 3) of the book, if one moves through the document past that page/point (forward or backward respectively), the bookmark will either disappear or be transferred to the other side, depending on whether the bookmark is a finger-bookmark or a permanent-bookmark respectively. The finger-bookmarks are more like the bookmarks created by the use of the fingers when browsing through a physical book—they are more temporary and they "disappear" after the bookmarked page/point has been passed. In the case of a page/point marked by a permanent-bookmark, when the page/point is passed the bookmark will be transferred to the other side and be grouped in the cluster that corresponds to the same cluster in the other side from which it originates. (The preferred method by which this transfer is to be effected and shown on the computer screen depends on the method of movement through the document which will be described later together with the description of those methods). To remove a permanent-bookmark, one presses the corresponding button twice in quick succession (e.g., "double click") when the bookmarked page/point is currently in view. (The permanent bookmarks are more like the bookmarks created by inserting, say, a slip of paper when one is browsing through a physical book.) The finger-bookmarks and the permanent-bookmarks are displayed differently on the computer screen. (They are differentiated either by shape, size, color, marking, or lettering.)

For the finger-bookmark, if one wishes that the bookmark not be removed after one has moved through the document past the corresponding page/point, one can transfer it to the other side by creating another bookmark using the fingers on the other hand, much like what one does when browsing through a physical book. The permanent-bookmarking process tends to create many bookmarks and they should be used only if necessary.

To return to a bookmarked page/point (whether it be finger-bookmarked or permanent-bookmarked), one presses the button (one of 131-134 or one of 181-184) that corresponds to the cluster to which the page/point belongs and uses the corresponding thumb 122 or 172 to apply force to the corresponding sensor area 121 or 171 while continuing to press the button. If there is more than one bookmarked page in each cluster, the page that is nearest the current page will be jumped to. (Note that this can obliterate some finger-bookmarks in the other clusters if in this process the document is moved through past those corresponding pages.) After having jumped to a bookmarked page, if one wishes to take some time to read that page, one has to stop applying force using the thumb 122 or 172 on the corresponding sensor area 121 or 171 or else the process of moving through the document will begin. One should also stop pressing the corresponding button (one of 131-134 or one of 181-184). (This is to relieve the finger of unnecessary tension). If this page was a finger-bookmarked page and one wishes to bookmark this page again, one has to press the button (one of 131-134 or one of 181-184) again (once or twice depending on whether now one wishes to finger-bookmark or permanent-bookmark it respectively).

To avoid confusion and speed up the browsing process, even though the facility of using one button to bookmark more than one page is provided, hence creating the cluster of bookmarks associated with that button, it is to be avoided if possible. Hence, one should try to use as many of the buttons (131-134 and 181-184) provided as possible. That is, if there are four pages to be bookmarked on one side, one should use all four buttons (131-134 or 181-184, depending on whether it is the right side 371 or left side 372 respectively that is involved), creating only one bookmark in each cluster. This way, a speedier jump to a desired bookmarked page is possible because one does not have to jump through those unwanted pages bookmarked in the same cluster before one arrives at the intended page.

At any given time, only one of the hands is supposed to perform operations (i.e., only one of the two browsing devices 100 and 101 is supposed to be activated). If both hands try to perform operations at exactly the same time, there will be no operation performed. If one hand performs an operation before the other hand, then that hand takes priority. One exception to this is when the device is used in conjunction with a flipping method 500 or 540 of moving through the document involved to be described in detail later (with reference to FIG. 5A and FIG. 5E), whereby the operation of both hands is used to create a "fan display" 600 or 610 (with reference to FIG. 6A and FIG. 6B).

FIG. 2C depicts one embodiment of the screen configuration 210. In this configuration 210, the operations are identical to that described above for the mini-book configuration 200 depicted in FIG. 2A, except now, in this configuration 210, the two browsing devices 100 and 101 are separated and attached to the sides of a screen 216 (such as an IBM Color Monitor G50, Part Number 96G1593). This is achieved by first attaching these devices to a frame 215, and then attaching the frame 215 to the screen 216. This is done because the browsing devices 100 and 101 need to be firmly attached and we would like to use existing computer screens 216 and hardware with no necessity of any physical modifications to them.

Figure 2D:
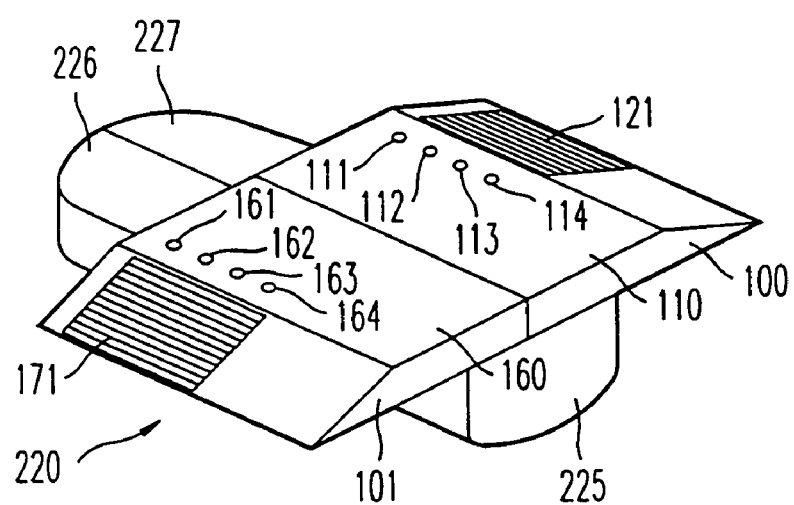
FIG. 2D is a front perspective view of the browsing device configured into a mouse configuration used in conjunction with a computer.

FIG. 2D depicts one embodiment of the mouse configuration 220. In this configuration 220, two browsing devices 100 and 101 are joined together in the same manner as in FIG. 2A and also mounted onto a mouse 225 (e.g., a mouse adapted from the IBM Enhanced Mouse II, Part Number 13H6714). This allows the use of one hand for operating the browsing devices 100 and 101 as well as the mouse 225. The operation of the browsing devices 100 and 101 is largely the same as that described for the mini-book configuration 200 except for the following observations. The mouse-browser configuration 220 is preferably placed on a flat surface like the top of a table, but not typically held in the hands. The four buttons 131-134 on the bottom surface 130 (FIG. 2A) of the right-hand device 100 are now not primarily used, but instead the four buttons 111-114 on the top surface 110 replace the functions of the four bottom buttons 131-134. Similarly, for the left-hand device 101, the four buttons 161-164 on the top surface 160 replace the functions of the four buttons 181-184 on the bottom surface 180 (FIG. 2A). The eight top buttons 111-114 and 161-164 are now operated only by the index finger which also operates the mouse buttons 226 and 227. For the operation of the left sensor area 171, the thumb of the same hand is preferably used. For the operation of the right sensor area 121, one of the other three fingers, normally the middle finger, is used. (For a left-handed, "southpaw", this is reversed).

FIG. 2E depicts one embodiment of the gyro-mouse configuration 230 (which includes an adapted gyro-mouse such as a GyroPoint® Desk from Gyration, Inc. of Saratoga, Calif., Part Number PA00038-001). Currently, there is a type of mouse called the gyro-mouse that can be held in the hand and used away from the table top. This gyro-mouse 235 can be attached to the mini-book configuration 200 of FIG. 2A which consists of a right-hand browsing device 100 and a left-hand browsing device 101, and the whole assembly—the gyro-mouse configuration 230—can be used in the hand away from the table top. Because in the mini-book configuration 200, both hands are used and the bottom buttons 131-134 and 181-184 are operated by all the fingers except the thumbs, the gyro-mouse 230 must be attached to the mini-book configuration 200 in such a way that the index fingers can also be used to operate the gyro-mouse buttons 236 and 237, as shown in FIG. 2E. The gyro-mouse buttons 236 and 237 must be near enough to the buttons 131 and 181 operated by the index fingers so that the index fingers can reach them (buttons 236 and 237) easily. While preferably a specially made gyro-mouse 235 will be constructed to join with the mini-book configuration 200 as shown in FIG. 2E, the mini-book 200, screen 210, and mouse 220 configurations of the browsing devices 100 and 101 preferably add modularly to existing computer hardware.

FIG. 2F depicts the one-hand configuration 240 of the browsing device. In this configuration, only one browsing device 100 is used, freeing one hand to do something else. During operation, the device 100 is held in one hand in much the same way as that in the mini-book configuration 200—the thumb is placed on the sensor area 121 while the other fingers operate the buttons 131-134 on the bottom surface 130. The operation is largely the same as that for the mini-book configuration 200 except now the browsing device 100 functions as the left device 101 as well as the right device 100 in the mini-book configuration 200. A triple click of the button 131 (refer to FIG. 1B—the button nearest the index finger) toggles between these two states. This configuration 240 may not handle as well as the mini-book configuration 200 but it frees one hand for other operations. (Instead of triple-clicking an existing button such as button 131, an alternative is to add another button to the existing buttons and allow a single click of that button to effect the same operation.)

FIG. 2G depicts the one-hand-gyro-mouse configuration 250 of the browsing device. In this configuration, a gyro-mouse 255 is attached to one browsing device 100. The operation is largely the same as in the one-hand configuration 240 in FIG. 2F except now the one index finger also operates the mouse buttons 256 and 257. Again, like in the case of the gyro-mouse configuration 230 depicted in FIG. 2E, in this configuration the buttons 256 and 257 of the gyro-mouse 255 must be positioned near the button 131 on the bottom surface 130 of the browsing device 100 that is nearest the index finger during normal operations of the device 100 so that the index finger can operate all three buttons 256, 257 and 131 easily. If no such gyro-mouse 255 exists, then a specially made one has to be used.

Figure 2H:
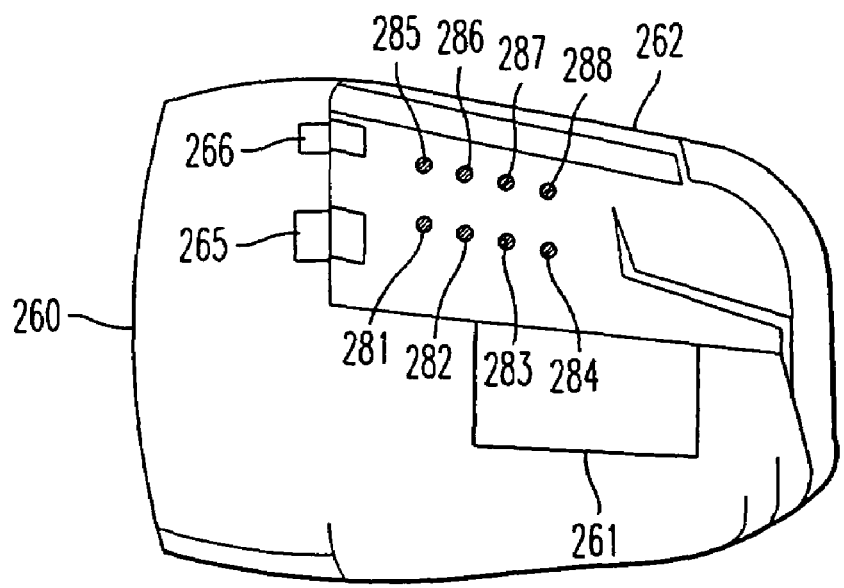
FIGS. 2H and 2I are side perspective and bottom views respectively of another embodiment of the mini-book configuration of FIG. 2A.
Figure 2I:
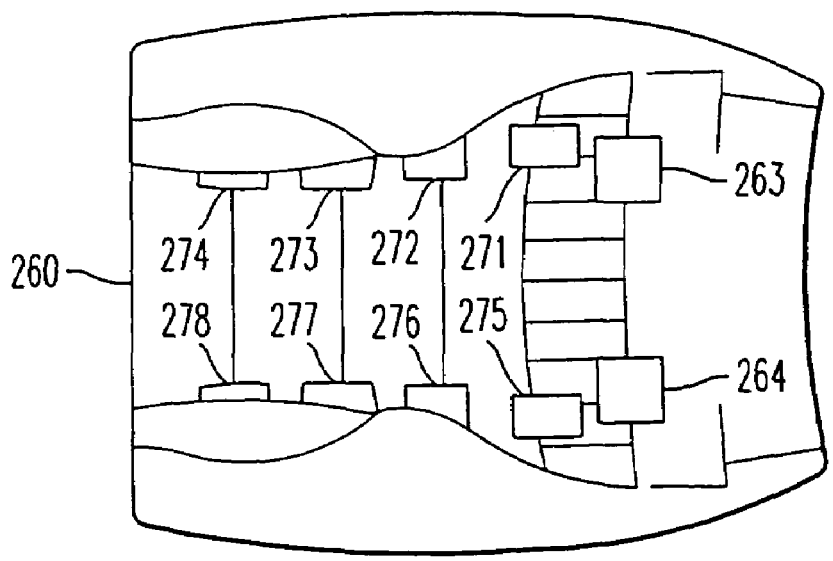

FIGS. 2H and 2I depict side and bottom views of a browsing device 260 that is another embodiment of the mini-book configuration 200 that provides good ergonomy for the human hands and fingers and that also incorporates mouse buttons 263, 264, 265, and 266 so that the device 260 can also function as a usual computer mouse. The sensor areas 261 and 262 incorporates X-Y position sensors so that in the mouse mode they can accept X-Y coordinates input through a finger to control the usual mouse cursor on the computer screen. For browsing-related operations, the operations of sensor areas 261 and 262 are similar to the operations of sensor areas 121 and 171 respectively on the browsing device 200 and the buttons 271-278 function like the buttons 131-134, 181-184 respectively. The buttons 281-288 function like the buttons 161-164, 111-114 respectively. One mode of operation of the browsing device 260 is that it is held by both hands, with the left thumb placed on the sensor area 262 and the right thumb on the sensor area 261. All the other fingers curl around the side of the browsing device 260 to reach the bottom to operate the buttons 271-278 for browsing-related operations such as bookmarking and the buttons 263 and 264 for the usual two-button mouse operations in, say, MICROSOFT's WINDOWS operating system. In another mode of operation, the browsing device 260 is placed on a flat surface such as the table-top with the sensor areas 261 and 262 facing up, and only one hand is used to operate the device. In this mode, if the right hand is used, the thumb and the middle finger, say, would operate the sensor areas 261 and 262 respectively while the index fingers would operate the buttons 281-288 for browsing-related operations such as bookmarking and operate the buttons 265 and 266 for the usual two-button mouse operations.

The browsing device 100 employed in the configurations 200, 210, 220, 230, 240, and 250, among others, and the browsing device 260 can be used in conjunction with a number of different methods for displaying the movement through the document involved on the computer screen in a computer book. Among others, there are five methods which will be described here.

Figure 5A:
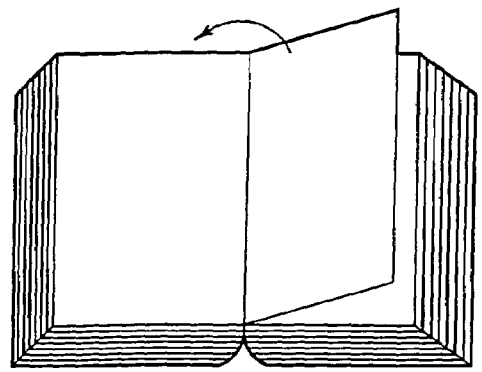
FIG. 5A is a top view of the computer book of the present invention that uses a flipping method of moving through a document.

FIG. 5A depicts one preferred embodiment of the flipping method 500. In this method, the material in the document is organized into pages and as one moves through the document, the pages are shown to flip across from right to left or vice versa, depending on the direction of movement, much like what happens when one flips through a physical book. In this method, when a permanent-bookmark is being transferred from one side to the other, it will be shown to be attached to the page, sticking out from the page, and flipped together with the page. Also, to be consonant with the flipping of successive pages, in the process of jumping to a different page in the document, the pages skipped are shown to flip across together as a thick page (the thickness being proportional to the number of pages involved) like in the case of a physical book. The display of the thicknesses of the material in the document on both sides of the displayed pages, the use and display of bookmarks (finger-bookmarks or permanent-bookmarks), the operations of bookmarking, and the display of the location, on the thicknesses, of the page/point in the document that would be jumped to were jumping to be effected at any given moment based on, say, the thumb's x-position on the sensor area 121 at that moment are like what is described above for the computer book 300 in FIG. 3.

One method of generating flipping pages from a document stored in semiconductor, magnetic, optical, or other media on a personal (e.g. laptop) computer in the form of a text file, such as a text file in the WINDOWS 95 operating system involves several steps, as discussed below. First, the contents of the text file is displayed on the computer screen (such as an IBM Color Monitor G50, part Number 96G1593) using, say a word processing software such as MICROSOFT WORD Version 7.0 from MICROSOFT Corporation, running on the computer. The image on the computer screen which is stored in the screen dump can then be put into the clipboard using the "Print Screen" key on the keyboard (such as an IBM Keyboard, Part Number 06H9742). The clipboard can be imported as an image file into a graphics software such as VISONEER PAPERPORT from Visioneer Communications, Inc. of Palo Alto, Calif., Part Number C1132-90000 running on the computer using the "Paste" command provided by the software, and then exported and stored as an image file in, say, the TIFF format. Each page in the document can be captured in this way in one TIFF file. Then, using a video editing/movie making software such as Adobe PREMIER 4.0 from Adobe Systems Incorporated of Mountain View, Calif., part Number 02970103 running on the computer, the TIFF files, each containing one page of the document, can be imported into the software and using the "Motion" command and superimposition facilities provided by the software a "movie" of flipping pages can be generated and if necessary, exported and stored in a motion picture format such as a .AVI file.

For the purpose of the present invention, the various components/operations described above for generating flipping pages from an existing document file are preferably integrated into a single software process that may be conveniently ported from one computer to the next in a computer readable medium, such as an optical disc (e.g., CD ROM, or digital versatile disc, DVD), magnetic media (e.g., floppy diskette), or semiconductor memory (ROM, PROM, application specific integrated circuit, ASIC, or Field Programmable Gate Array, FPGA). An alternative method reads from the existing document file directly, generates the necessary images for all the pages, and then creates a "motion picture" of flipping pages from these images. To move through the document forward or backward at any selected speed, mechanisms similar to forwarding or reversing at any selected speed when viewing a motion picture file (such as one in the .AVI format) using a software video player (such as Video for WINDOWS from MICROSOFT Corporation) are used. The other features such as the thicknesses 310 (FIG. 3), the bookmarks 320 (FIG. 3) and the operations of bookmarking etc. are also incorporated.

Figure 6A:
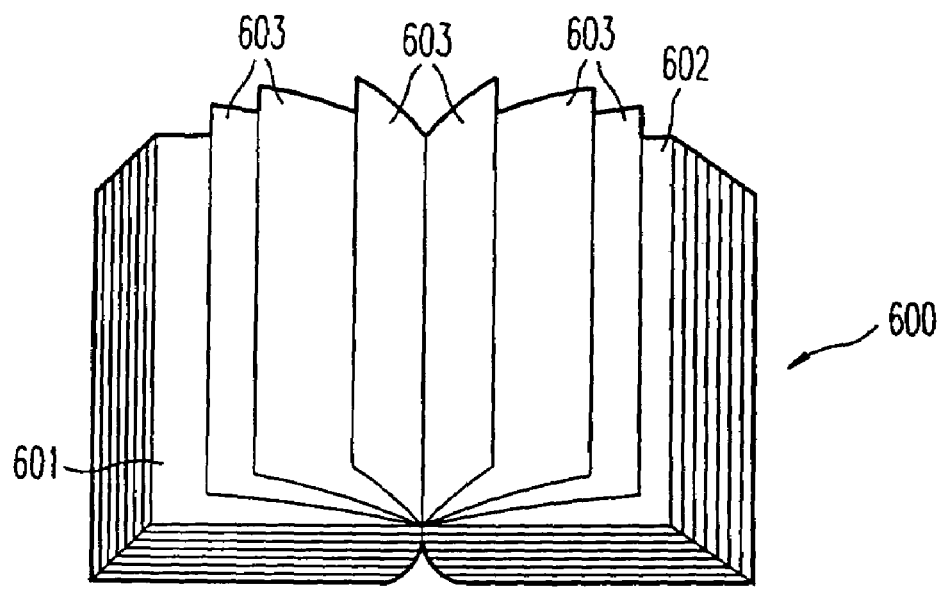
FIG. 6A is a top perspective view of an open fan display for displaying pages and that is used in conjunction with the flipping method of moving through the document illustrated in FIG. 5A.
Figure 6B:
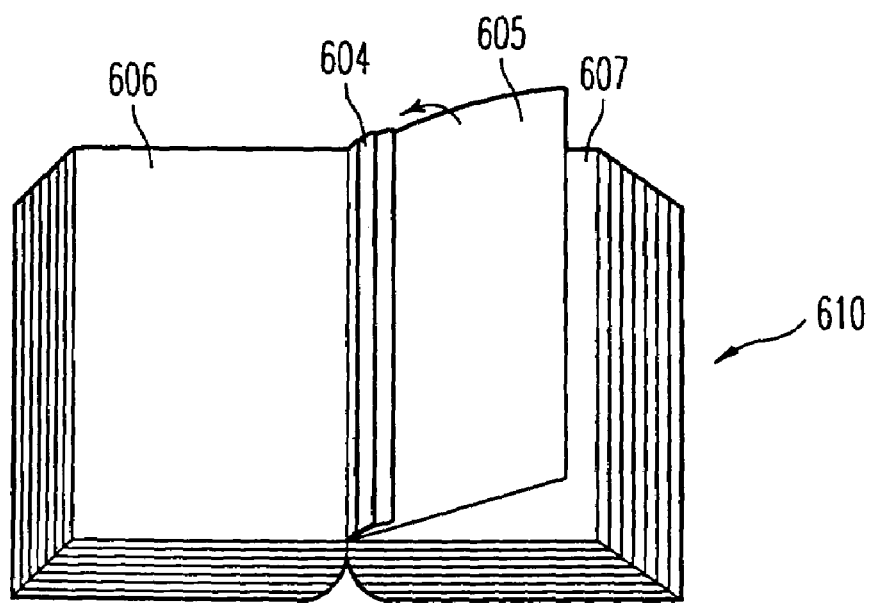
FIG. 6B is a top perspective view of a collapsed fan display for displaying pages and that is used in conjunction with the flipping method of moving through the document illustrated in FIG. 5A.

FIG. 6A depicts one embodiment of a open fan display 600 and FIG. 6B depicts one embodiment of a collapsed fan display 610 that can be created in conjunction with the flipping method 500. In the process of effecting the flipping of the pages using one thumb (say, the right thumb 122, which operates the sensor area 121 in the configuration 200), one can stop the pages from being completely flipped to the other side by the use of the other thumb (say, the left thumb 172) by applying a force on its associated sensor area (171 in the configuration 200, say) after the page has begun flipping. This force will be referred to as the opposing force. The force applied by the other thumb (in this case, the right thumb 122) will be referred to as the flipping force.

There are two kinds of fan display that can be created—the open fan display 600 or the collapsed fan display 610—depending on the magnitude of the opposing force. If the opposing force is of a magnitude roughly the same as or smaller than the flipping force, the pages 603 that have been flipped since the beginning of the process (i.e., since the opposing force has been applied) form equal angles between themselves as well as the two "flat" pages 601 and 602 on the left and right sides of the book as depicted in FIG. 6A. This creates the open fan display 600. If the opposing force is greater than the other force, a collapsed fan display 610 is created as shown in FIG. 6B. In this display 610, all the pages 605 that have been flipped since the beginning of the process (i.e., since the opposing force has been applied) are collected in a thick page 604 that forms an equal angle with the two "flat" pages 606 and 607 on the left and right sides of the book as depicted in FIG. 6B.

The open fan display 600 or the collapsed fan display 610 can also be created in conjunction with the process of jumping to another page. Earlier it was described that in order to be consonant with the flipping of successive pages, in the process of jumping to a different page in the document, the pages skipped are shown to flip across together as a thick page (the thickness being proportional to the number of pages involved) like in the case of a physical book. This thick, flipping page will be treated like any of those flipping pages 603 in the process of creating the open fan display 600 or the flipping pages 605 in the process of creating the collapsed fan display 610. Hence after a jumping process has been initiated and after the skipped pages have begun flipping across together as a thick page, if one were to now apply an opposing force, the process of creating a open fan display 600 or a collapsed fan display 610 will begin as described above.

If the thumb that initiated the flipping now stops applying force—i.e., the flipping force—to the sensor area (121 or 171 in the configuration 200, say), the pages will freeze in the open fan display 600 or the collapsed fan display 610, depending on which type of display is being created. For the collapsed fan display 610, at the moment when the flipping force stops, there could be one page 605 that is still in the process of being flipped as depicted in FIG. 6B. This page will immediately collapse onto the center, thick page 604 that has collected in it all those pages flipped earlier.

The open fan display 600 facilitates the viewing of many pages simultaneously, even though only the rough contents of each page can be properly viewed. The collapsed fan display 610 facilitates the viewing and comparison of the two flat pages 606 and 607 that are currently in view since all the flipped pages 605 have been collected in the center, thick page 604 that does not block the view of the two flat pages 606 and 607.

If now the thumb that applied the opposing force—the thumb that prevented the complete flipping of the pages—removes its force, and then that is followed by the normal initiation of the flipping action by either thumb, the fanned out pages 603 (in the case of the open fan display 600) or the center thick page 604 (in the case of the collapsed fan display 610) will collapse and flip over to the appropriate side and normal flipping begins.

Figure 5B:
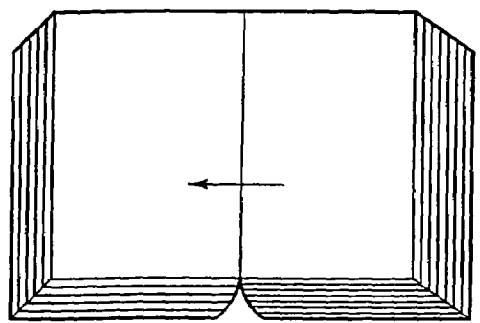
FIG. 5B is a top view of the computer book of the present invention that uses a sliding method of moving through a document.

FIG. 5B depicts one embodiment of the sliding method 510. In this method 510, the material in the document is organized into pages and the pages are shown to slide across the screen, much like what happens when one views a microfilm. However, unlike the case of the conventional microfilm viewer, more than one page can be displayed here, depending on the choice of the user. In this method 510, when moving through the document, the pages are seen to move horizontally within a fixed frame—as a page slides leftward, as it appears on the right side of the frame, its left side appears first and as it reaches the left side of the frame, the left side of the page would disappear first and vice versa for rightward movement. FIG. 5B shows two pages being displayed at the same time but in this method 510 any number of pages can be displayed at the same time, depending on the user's preference and the selection made.

In the sliding method 510, when a permanent-bookmark is being transferred from one side to the other, it will be shown to disappear from the side from which it originates and appear on the other side when the page involved reaches the other side. To be consonant with the sliding of successive pages, in the process of jumping to some other parts of the document, the page(s) jumped to is shown to slide into view much like what happens when one operates a physical microfilm. The display of the thicknesses of the material in the document on both sides of the displayed pages, the use and display of bookmarks (finger-bookmarks or permanent-bookmarks), the operations of bookmarking, and the display of the location, on the thicknesses, of the page/point in the document that would be jumped to were jumping to be effected at any given moment based on, say, the thumb's x-position on the sensor area 121 at that moment are like what is described above for the computer book 300 in FIG. 3.

To generate sliding pages, a method similar to that described for the flipping pages for FIG. 5A can be used.

Figure 5C:
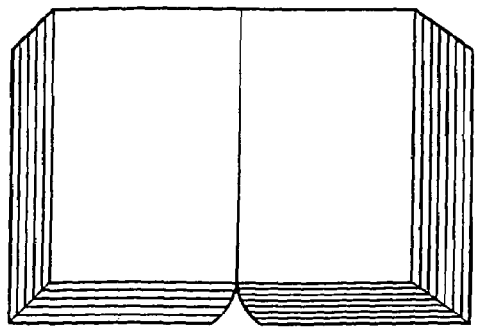
FIG. 5C is a top view of the computer book of the present invention that uses a flashing method of moving through a document.

FIG. 5C depicts the flashing method 520, where the material in the document is organized into pages and one or more than one page at a time (as specified by the user) is flashed onto the screen as one moves through the document—that is, the current page(s) disappears and the next page(s) before or after the current page(s) appears. FIG. 5C depicts, in particular, the case in which two pages are displayed at a time. When more than one page is displayed on the screen and flashing is effected, it can be effected in two modes—the exclusive mode or the overlapping mode. Consider the case of displaying two pages at one time on the screen as shown in FIG. 5C. In the exclusive mode, the next two pages that appear are the two pages that follow the righthand page of the previously displayed pages. In the overlapping mode, the next two pages that appear are the righthand page from the previously displayed pages and the page that follows that page. Similarly, when more than two pages are displayed at any given time, the exclusive mode dictates that the next pages displayed will not be the same as the currently displayed pages and the overlapping mode dictates that the next pages displayed can have some but not all of the pages that are the same as the currently displayed pages. Hence the overlap refers to the same pages that are displayed in the current display as well as the very next display of the pages. For more than two pages, the user can specify the amount of overlap for the overlapping mode.

In the flashing method 520, when a permanent bookmark is being transferred from one side to the other, it will be shown to disappear from the side from which it originates and appear on the other side when the page involved reaches the other side. The display of the thicknesses of the material in the document on both sides of the displayed pages, the use and display of bookmarks (finger bookmarks or permanent bookmarks), the operations of bookmarking, and the display of the location, on the thicknesses, of the page/point in the document that would be jumped to were jumping to be effected at any given moment based on, say, the thumb's x-position on the sensor area 121 at that moment are like what is described above for the computer book 300 in FIG. 3.

To generate sliding pages, a method similar to that described for the flipping pages for FIG. 5A can be used.

Figure 5D:
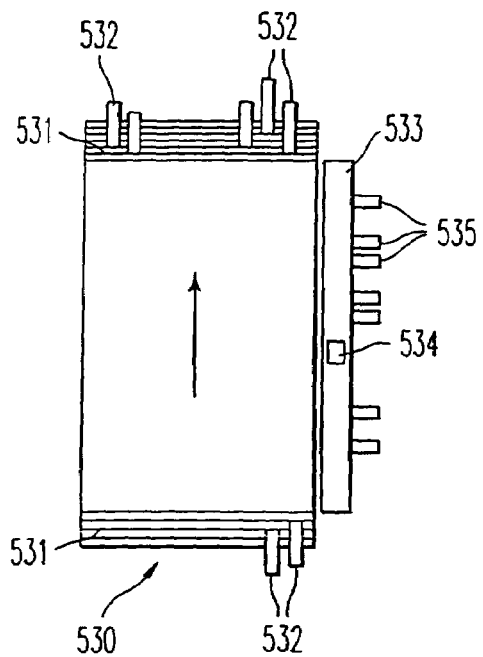
FIG. 5D is a top view of the computer book of the present invention that uses a scrolling method of moving through a document.

FIG. 5D depicts the scrolling method 530. Even though scrolling usually results in a blur, this method can still benefit from the ease of control using the browsing device 100. In this method 530, the material in the document is not organized into distinct pages. Instead, lines of text or portions of graphics disappear from the top of the display and appear at the bottom of the display or vice versa as the document is moved through forward or backward respectively. The thicknesses 531 of material present before or after the currently viewed material are shown on the top and bottom of the display as shown in FIG. 5D. The bookmarks 532 (finger-bookmarks or permanent bookmarks) can likewise be displayed on these thicknesses 531. The operations of bookmarking and the display of the location, on the thicknesses 531, of the page/point in the document that would be jumped to were jumping to be effected at any given moment based on the thumb's x-position on the sensor area 121 at that moment are like what is described above for the computer book 300 in FIG. 3.

To generate scrolling pages, a method similar to what is used in MICROSOFT WORD Version 7.0, Part Number 62306 can be used, with appropriate enhancements for the display of the thicknesses 310 (FIG. 3), the bookmarks 320 (FIG. 3) and the operations of bookmarking, etc.

If the mini-book configuration 200, say, is used in conjunction with the scrolling method 530 of moving through the document, the user can rotate the mini-book configuration 200 held in his/her hand which is normally used "horizontally"—with the left-hand device 101 held to the left and the right-hand device 100 held to the right (FIG. 2A)—by, say, 90 degrees clockwise, so that the left-handed device 101 is now on the top and the right-handed device 100 is now on the bottom (to achieve this, the left and right wrists will have to bend a fair bit). The controls will now be more natural because they correspond better to what is seen on the screen—i.e., the left-hand/top device 101 and the right-hand/bottom device 100 will now operate the bookmarks on the top and bottom respectively of the material shown on the screen in the scrolling method 530.

In the scrolling method 530, depending on the user's preference, a scroll bar 533 and a marker 534 on it, similar to what is normally used in a word processor, can be added to one side, say the right side, of the displayed material, as shown in FIG. 5D, to indicate the position of the currently viewed material in the document involved, but the marker 534 here is not used in conjunction with the browsing device 100 for effecting the scrolling of the document. (In current word processors, normally the marker 534 is used in conjunction with the mouse for effecting the scrolling of the document.) Alternatively, bookmarks 535 are added to the scroll bar 533 to indicate the pages bookmarked. However, the display of the bookmarks 532 on the top and bottom of the currently viewed material is still necessary because their positions along the top and bottom edges give an indication of the fingers and buttons on the browsing devices 100 and/or 101 (depending on whether one or two devices are being used) that are to be used to jump to the pages that they mark. In this method 530, when a bookmark is inserted, it is associated with the material that is currently in view. For permanent-bookmarks, they disappear from one side (top or bottom) of the display and appear on the other side (bottom or top respectively) when the associated material has gone completely out of view.

In the flashing method 520 and scrolling method 530, in the process of jumping to some other parts of the document, the page(s) or parts of the document jumped to are flashed onto the screen, much like what happens when one uses the scroll bar in conjunction with the mouse to jump to some other parts of the document in a typical word processor.

Figure 5E:
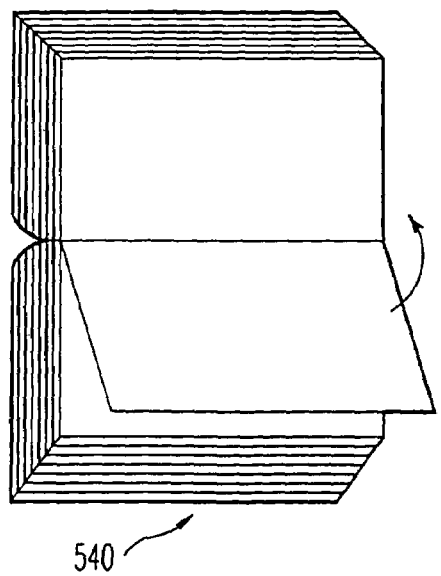
FIG. 5E is a top perspective view of the computer book of the present invention that uses a vertical flipping method of moving through a document.

FIG. 5E depicts the vertical flipping method 540 of the browsing device. This method is similar to the flipping method 500 depicted in FIG. 5A, and except for the flipping action that is effected vertically instead of horizontally, all other operations are the same as that described for the flipping method 500, including the vertical equivalents of the open and collapsed fan displays depicted in FIGS. 6A and 6B. Similar to the case described above for the scrolling method 530, if the mini-book configuration 200, say, is used in conjunction with the vertical flipping method 540 of moving through the document, the user can rotate the mini-book configuration 200 held in his/her hand which is normally used "horizontally"—with the left-hand device 101 held to the left and the right-hand device 100 held to the right (FIG. 2A)—by, say, 90 degrees clockwise, so that the left-handed device 101 is now on the top and the right-handed device 100 is now on the bottom (to achieve this, the left and right wrists will have to bend a fair bit). The controls will now be more natural because they correspond better to what is seen on the screen—i.e., the left-hand/top device 101 and the right-hand/bottom device 100 will now operate the bookmarks on the top and bottom respectively of the material shown on the screen in the vertical flipping method 540.

The simultaneous multiple indexing facility is now described. In the process of viewing a document, if there is a keyword or phrase that is of interest to the user, one can select it using one of the usual methods—the mouse cum cursor method, the finger cum pressure-sensing computer display screen method, etc.—and then all those pages that contain the explanations or related topics of the selected item will become permanently-bookmarked—i.e., all the corresponding bookmarks 320 will appear on the displayed computer book 300 like that described above (FIG. 3). On the bookmarks 320, markings, letters or otherwise, will appear to indicate the kind of information these pages contain about the selected item (e.g., basic definition, detailed elaboration, related concepts, etc.). The name of the selected item will also appear on the corresponding bookmark 320 (in case more than one item has been selected). The user can then quickly jump to these pages. This facility allows the user to bypass the need of having to move through the document first to an index (usually at the end of the document) to locate the various references to the item of interest and then jump to those corresponding pages. Many returns to the index would also have to be carried out if there is more than one reference to the item involved.

Figure 7:
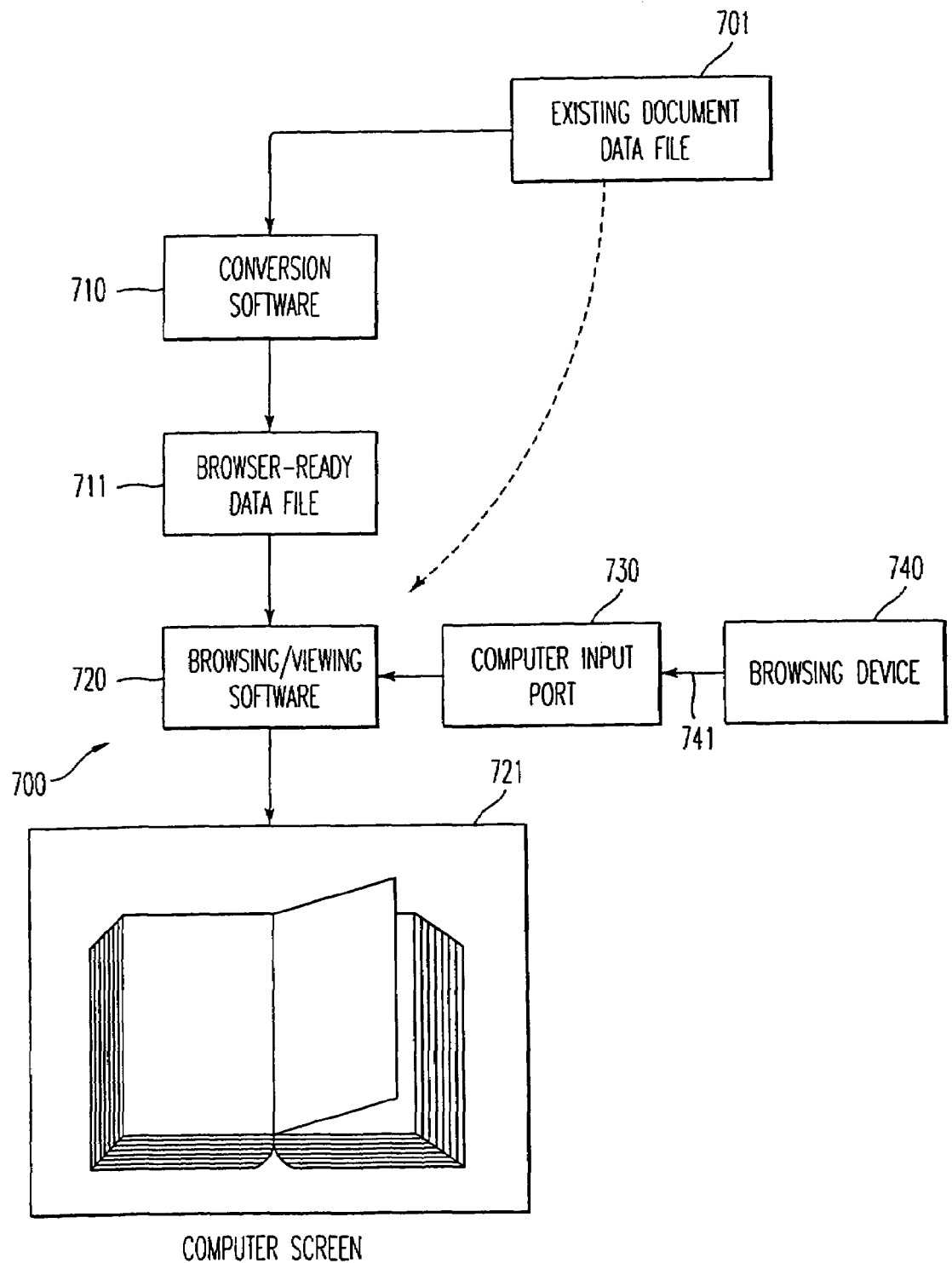
FIG. 7 is a schematic block diagram of the browsing system that incorporates the inventive browsing device of FIG. 1B.

FIG. 7 depicts an embodiment of a complete browsing system 700. In this system 700, a conversion software 710 (a computer program coded in a "C++ programming language") is provided to pre-convert the document 701 to be viewed that is stored in the computer in whatever existing form (e.g., such as in the form of a text file, stored on the hard disk in the WINDOWS 95 operating environment) to a form 711 that allows one of the five methods (500, 510, 520, 530 and 540) of moving through the document as described above or other methods to be implemented and to be used in conjunction with the browsing device 740 (in one of the configurations 200, 210, 220, 230, 240, and 250 described above or other configurations). The document 701 in its existing form on the computer can also be converted on the fly during the browsing process. During operation, a browsing/viewing software 720 is also needed to convert the signals from the browsing device to effect all the operations on the document as described above. The browsing/viewing software 720 (a computer program preferably coded in a "C++ programming language") takes as its data input either the pre-converted data file 711 or the document in its existing form 701 (to be converted on the fly during the browsing process). The browsing device 740 sends the necessary signals through a bus 741 (such as a 25 pin parallel port ribbon cable, although a serial bus, mouse line, Universal Serial Bus, USB, and IEEE 1394 FireWire, are example alternatives) and to a computer input port 730 (preferably a 25 pin parallel port, or alternatively a mouse port, a RS-232 port, USB port, or FireWire port) to the browsing/viewing software 720 to effect the necessary operations on the screen 721 of the computer.

FIG. 8 depicts one embodiment of the browsing device's 100 electrical block diagram 800. The sensor area 121 on the browsing device 100 (e.g., FIG. 1B) is made up of a force and position sensor that is used to sense the force and position of the thumb 122 (or one of the other fingers) on that area, and signals representing these two parameters are made available through a Force and Position Signals Generator Circuit 801 (preferably the separated Force and Position Analog LP Interface circuit described in the Interlink Electronics, Inc. document "FSR® Integration Guide and Evaluation Part Catalog with Suggested Electrical Interfaces"). Respective Force and Position signals are presented to the computer through one of the input ports 730 (FIG. 7), to the software 720 responsible to effect the necessary operations on the screen of the computer. The signals from the buttons 111-114, 131-134 (of which are preferably on/off push-button toggle switches) on the top surface 110 and bottom surface 130 respectively of the browsing device 100 (FIG. 1B) are also transmitted to the computer via the bus 741. A common voltage line is available to send a corresponding common voltage through individual ones of the buttons 111-114 and 131-134 when the respective buttons are closed.

Figures 1, 9A:
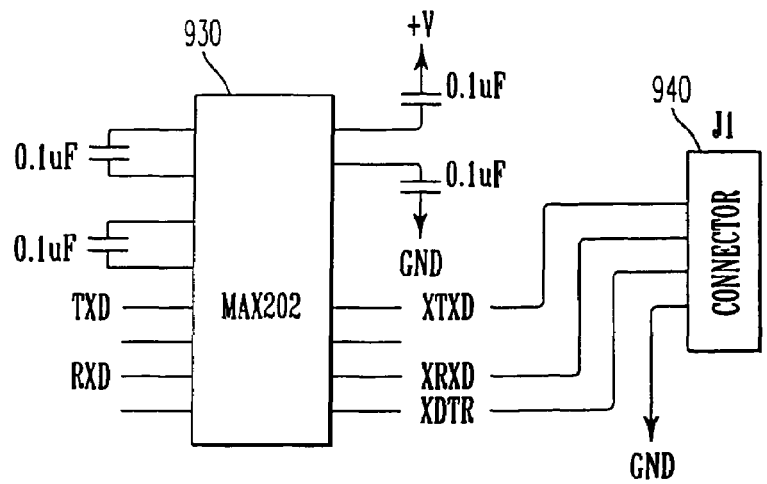
FIG. 9A is a schematic diagram of the signal-generating circuit used with any of the devices depicted in FIGS. 2A-2I to generate the necessary output signals to the computer's RS232 port based on the various input commands as depicted in the block diagram in FIG. 1A.
Figures 2, 9A:
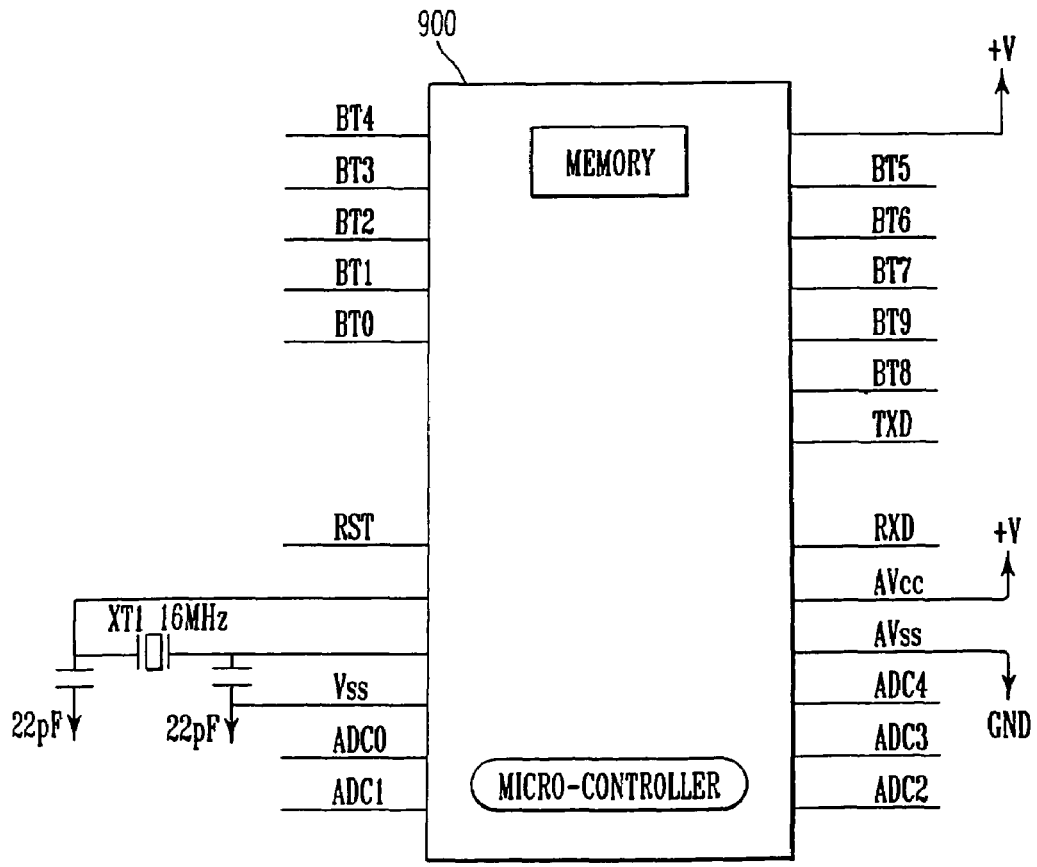
Figures 3, 9A:
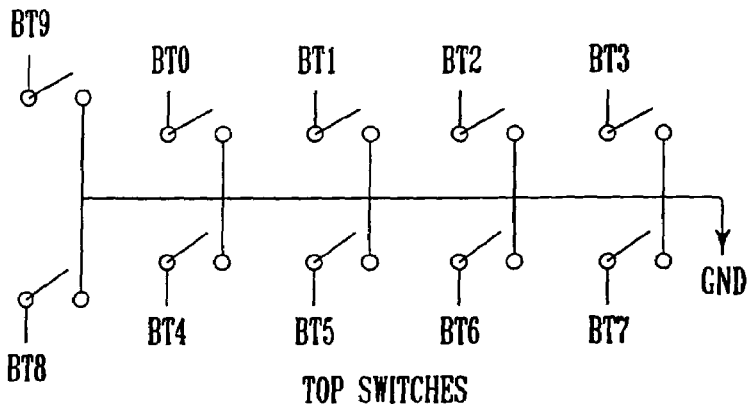
Figures 4, 9A:
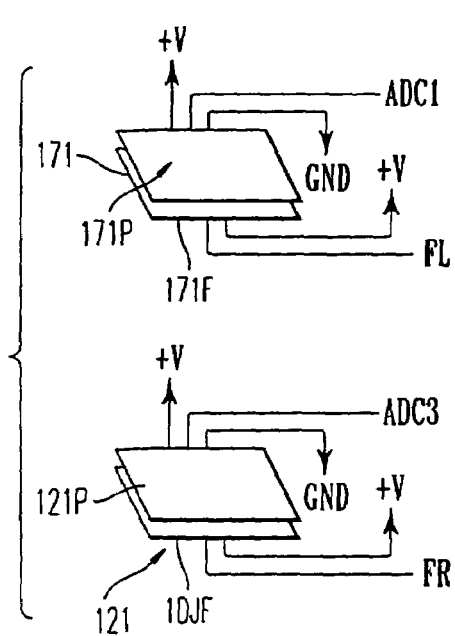
Figures 5, 9A:
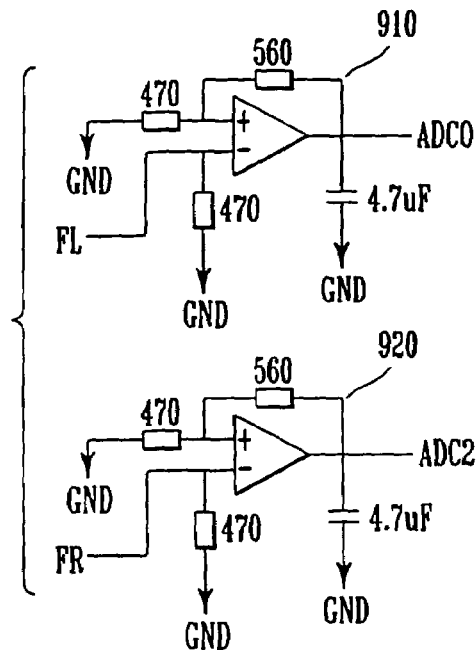
Figures 6, 9A:
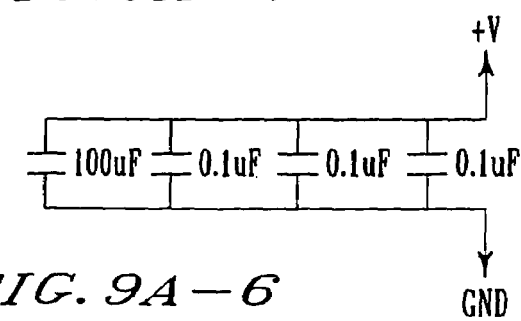

FIG. 9A depicts one embodiment of the browsing device's 200 or browsing device's 260 electrical schematic. A 87C752 micro-controller 900, having memory contained therein, although accessible external memory is an alternative, incorporated with a 5 channel analog-to-digital converter (ADC), accepts various inputs, e.g. from the sensors, and produces output signals to be sent to the computer. The force and position sensor area 121 or 171 on the browsing device 200 or area 261 or 262 on the browsing device 260 is made up of a position sensor (available from Kanto Bussan Co. Ltd of Japan part designation KBH) stacked on top of a force sensor (available from Interlink Electronics of U.S.A. force sensor part number 406). The force signals FL and FR from the force sensors are amplified and buffered by the LM324 operational amplifiers 910 and 920 respectively, appropriately biased with resistors 560 and 470, for the purpose of isolation and voltage level adjustment, to pins ADC0 and ADC2 respectively on the micro-controller 900. The position signals ADC1 and ADC3 from the position sensors are sent directly to pins ADC1 and ADC3 respectively on the micro-controller 900. ADC0—3 are the input of analog-to-digital converters which convert the analog signals into digital signals for further processing by the micro-controller 900. The signals from the 10 buttons, BT0-BT9 are sent to the data input pins BT0-BT9 on the micro-controller 900. The signals on pins RXD and TXD on the micro-controller 900 receive and transmit signals respectively through the MAX202 RS232 Interface chip 930, which in turn interfaces with the computer through an RS232 connector 940. The microcontroller 900 receives a clock input from a crystal oscillator XT1, as shown.

Figure 9B:
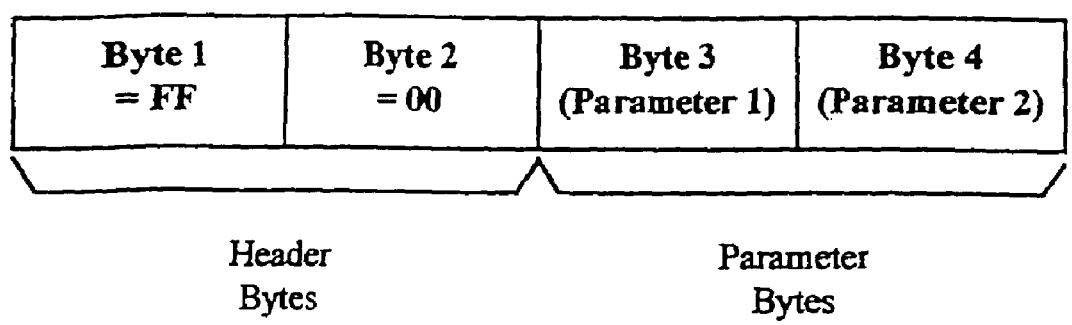
FIG. 9B is a data structure of a communication signal format stored in memory and generated by the circuit of FIG. 9A to communicate with the computer through the RS232 port.

FIG. 9B illustrates a communication format between the browsing device 200 or 260 and the computer sent through the RS232 interface, where each message packet, having 4 bytes, is formed in the micro-controller 900, later saved in a memory register in the interface chip 930, and eventually saved in RAM in the computer to which the browsing device communicates. The first two bytes are the Header Bytes, holding a hexadecimal value FF00 in hexadecimal number, specifying to the computer that it is a message from the browsing device 200 or 260. The last two bytes, the Parameter Bytes, contain the body of the message. Byte 3 holds a Parameter 1, specifying the type of information contained in Byte 4. Byte 4 holds a Parameter 2 that specifies a particular user-actuated browsing device setting. RS-232 (or EIA-232) specific information is found in Stallings, W., Data and Computer Communications, Fifth Edition, Prentice Hall, Chapter 5, pages, 140-156, the contents of which is incorporated herein by reference.

Parameter 1 specifies whether any one of the first set of buttons (BT0-BT7 in FIG. 9A) or second set of buttons (BT8 and BT9 in FIG. 9A) is pressed, or whether there is a change in the position of a finger or force on the left and right sensors. The first set of buttons are the 8 buttons on the left and right of the browsing device 200 or 260 and the second set of buttons are the buttons that can function as mouse buttons on browsing device 260. Depending on Parameter 1, Parameter 2 specifies which particular button is pressed or the position of a finger on a particular sensor or the magnitude of the force on a particular sensor.

Particular codes used to represent the Parameter 1 settings are shown below:

| Parameter 1 (Byte 3) Setting | Byte Value (hex) |
| --- | --- |
| BrowserButtonDownSet1 | 01 |
| BrowserButtonDownSet2 | 02 |
| BrowserFingerPositionChangeLeft | 82 |
| BrowserFingerPositionChangeRight | 84 |
| BrowserFingerForceChangeLeft | 81 |
| BrowserFingerForceChangeRight | 83 |

Particular codes used to represent the Parameter 2 settings are shown below:

| Information in Parameter 2 (Byte 4) | Byte Value (hex) |
| --- | --- |
| If Byte 3 is 01, then closed/open state of buttons BT7-BT0 are respectively represented by value of Byte 4 | 00-FF |
| If Byte 3 is 02, then closed/open state of buttons BT9 and BT8 are respectively represented by third and fourth most significant bits of value of Byte 4 | 0x, 1x, 2x or 3x. |
| If Byte 3 is 82, then change in position is represented by value of Byte 4 | 00-FF |
| If Byte 3 is 84, then change in position is represented by value of Byte 4 | 00-FF |
| If Byte 3 is 81, then force is represented by value of Byte 4 | 00-FF |
| If Byte 3 is 82, then force is represented by value of Byte 4 | 00-FF |

FIG. 9C is the flowchart of the assembly language program—the Browsing Device Monitor Program—resident in the micro-controller 900 memory (or resident in memory accessible by the microcontroller 900) for the purpose of processing the input signals from the various sensors and buttons of the browsing device 200 or 260 and sending them to the computer through the RS232 interface using the format described in FIG. 9B. In step 950, initialization of interrupt vectors, variables, ports and counter/channel timings are carried out. The process then flows to step 951, where a check is made to see if any data is sent from the computer to the RXD line (through the RS232 connector, as shown in FIG. 9A). If not, the process flows to step 953. If so, the same data is echoed through the TXD line in step 952. The process then flows to step 953, where a check is made to see if the data on the ADC channel 0 has been changed. If not, the process flows to step 955. If so, the process flows to step 954 where the data on ADC channel 0 is sent to the TXD line (with the appropriate preceding bytes as described in FIG. 9B), after which the process flows to step 955. The operations that take place in steps 955 and 956 are similar to the operations in steps 953 and 954 except that the data on ADC channel 1 is checked and sent to the TXD line if necessary, after which the process flows to step 957. The steps from 957 to 960 are for checking and sending data on ADC channels 2 and 3, after which the process flows to step 961.

In step 961 a check is made to see if one of the buttons BT0-BT7 has been pressed. If not, the process flows to step 963. If so, the byte pattern (Parameter 2 as discussed above) indicating which button has been pressed is sent, together with the appropriate bytes 1-3, to the TXD line, after which the process flows to step 963. In step 963 a check is made to see if one of buttons BT8 and BT9 has been pressed. If not the process flows to step 951. If so, the byte pattern indicating which button has been pressed is sent, after which the process returns to step 951.

Figure 9D:
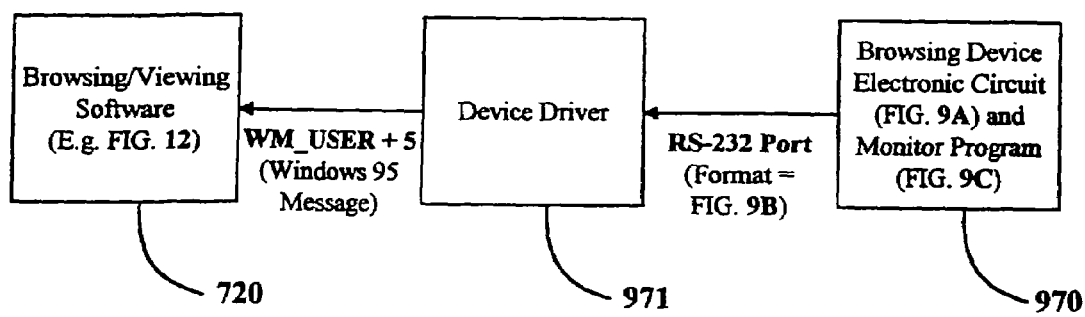
FIG. 9D is a signal flow diagram of signals from the browsing device to the browsing/viewing software.

FIG. 9D is a block diagram of an information flow from the browsing device electronic circuit of FIG. 9A, by way of the monitor program 970 (shown in FIG. 9C) and device driver 971 to the browsing/viewing software 720 (as will be discussed with respect to FIG. 12). The signal from the browsing device 970 is sent through the RS232 port and is received by the device driver software 971 resident on the personal computer, such as IBM Aptiva 2176X71 running the MICROSOFT WINDOWS 95® operating system. The signals through the RS232 port are encoded preferably using the format shown in FIG. 9B. The device driver software, written in the C++ programming language, sends the signals it receives from the RS232 port to the browsing/viewing software 720 using the message mechanisms available under MICROSOFT WINDOWS 95. The MICROSOFT WINDOWS 95 message WM_USER+5 is preferably used to achieve this purpose.

FIG. 10A illustrates a flippable book 1000 embodiment that is displayed on the computer screen 1001. The pages in this book are displayed much like the pages in a physical, paper book. Note that on the left and right sides of the book are displayed the thicknesses 310, thus indicating a relative position of the opened pages of the book with respect to the preceding pages and following pages.

Figure 10B:
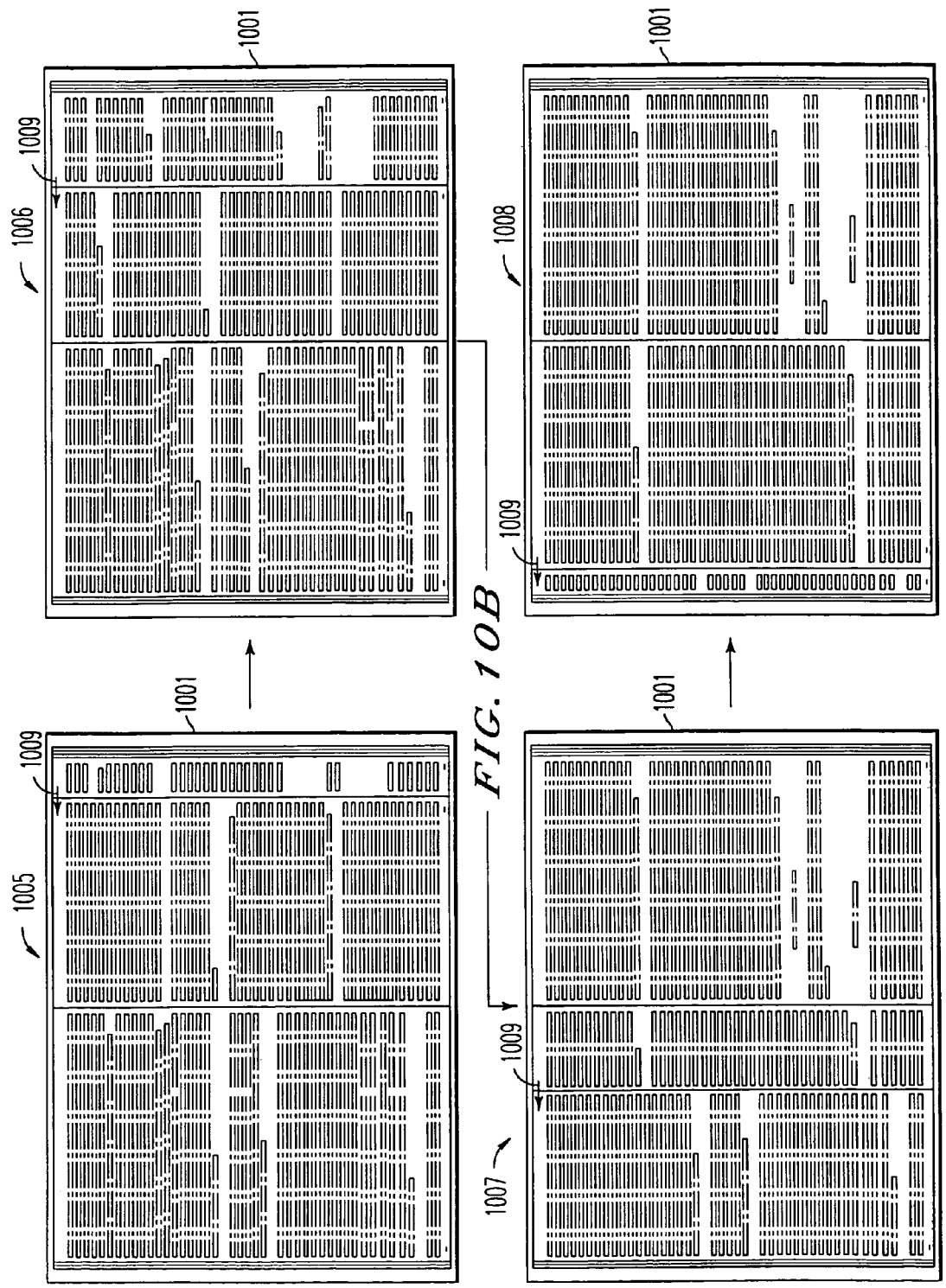
FIG. 10B is a sequence of images showing how one page of the computer book in FIG. 10A flips across.

FIG. 10B illustrates an exemplary series of display screens of the flipping page display. More particularly, FIG. 10B shows four of the intervening positions of a page 1005, 1006, 1007 and 1008 as it flips from the right side of the book to the left side (in the sequence 1005→1006→1007→1008). The arrow 1009 indicates the direction of movement of the edge of the said page. To input the contents of a document resident on the computer into the browsing/viewing software 720 to generate the required display, the method of converting the document data file on the fly is used. To achieve real-time responses, the contents of the document are read from the hard disk and displayed in a flipping fashion within a short time, say, less than 0.5 second, of the computer receiving a command from the browsing device 200 or 260 or other input device such as the keyboard. To satisfy this real-time requirement on a typical personal computer the flipping mechanisms are implemented using the Direct X API (Application Programming Interface) from MICROSOFT that allows very low level functions on the computer to be accessed so as to achieve the speed required. In particular, a Direct X function BLT (block transfer) is used to generate the flipping action fast enough for real-time purposes. As such, the 3D effect of the flipping action is achieved through changing the width of the page involved in the direction of flipping. When a sequence of images is seen by the human eye including the page involved with gradually decreasing and then increasing widths, a perception of a flipping page is obtained.

In the current embodiment, the speed of movement through the document can be changed on a command from the browsing device 200 or 260—namely the force applied on one of the force sensors. In the lower speed range, only one page is shown to flip across the book at any given time. The time it takes to flip from one side to the other side of the book reduces as the speed of flipping or movement through the document increases. Up to a certain point, further increase in speed of movement through the document is achieved by more than one page being flipped across at any given time.

Figure 10C:
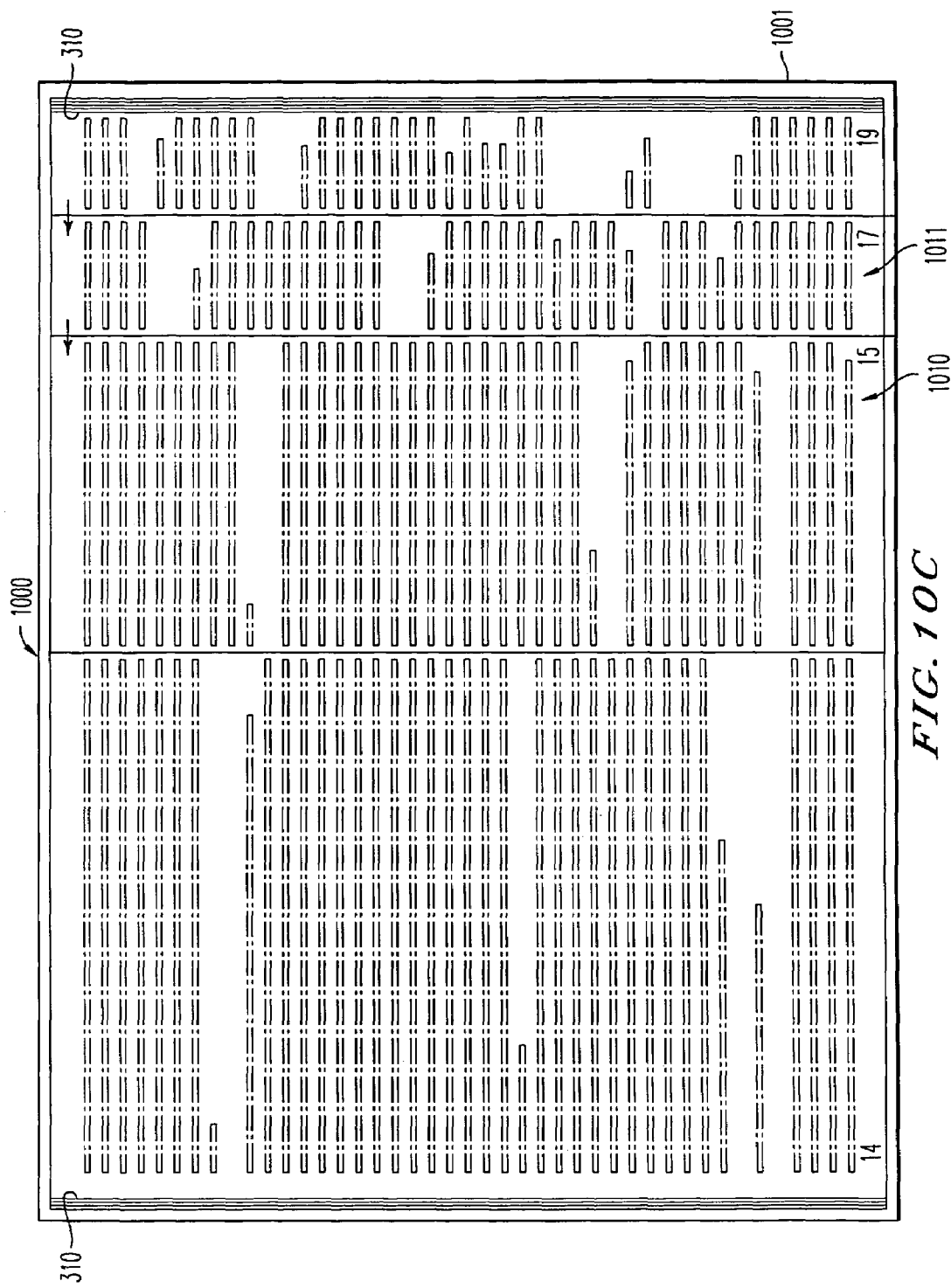
FIG. 10C illustrates the simultaneous flipping of more than one page of the computer book of FIG. 10A when the flipping speed is fast.

FIG. 10C shows two pages 1010 and 1011 being flipped across at the same time. As the speed increases, more and more pages would be flipped across at the same time. This feature of multi-page flipping provides consistency for the flipping paradigm. If only one page is allowed to flip across at any given time, then at a very high speed of flipping, the movement through the document would degenerate into the flashing mode with all its attendant deficiencies.

When one or more pages are in the process of being flipped across the field of view in one direction, say, from right to left, the user can reverse the direction of flipping with immediate effect by activating the browsing device 200 accordingly.

Figure 10D:
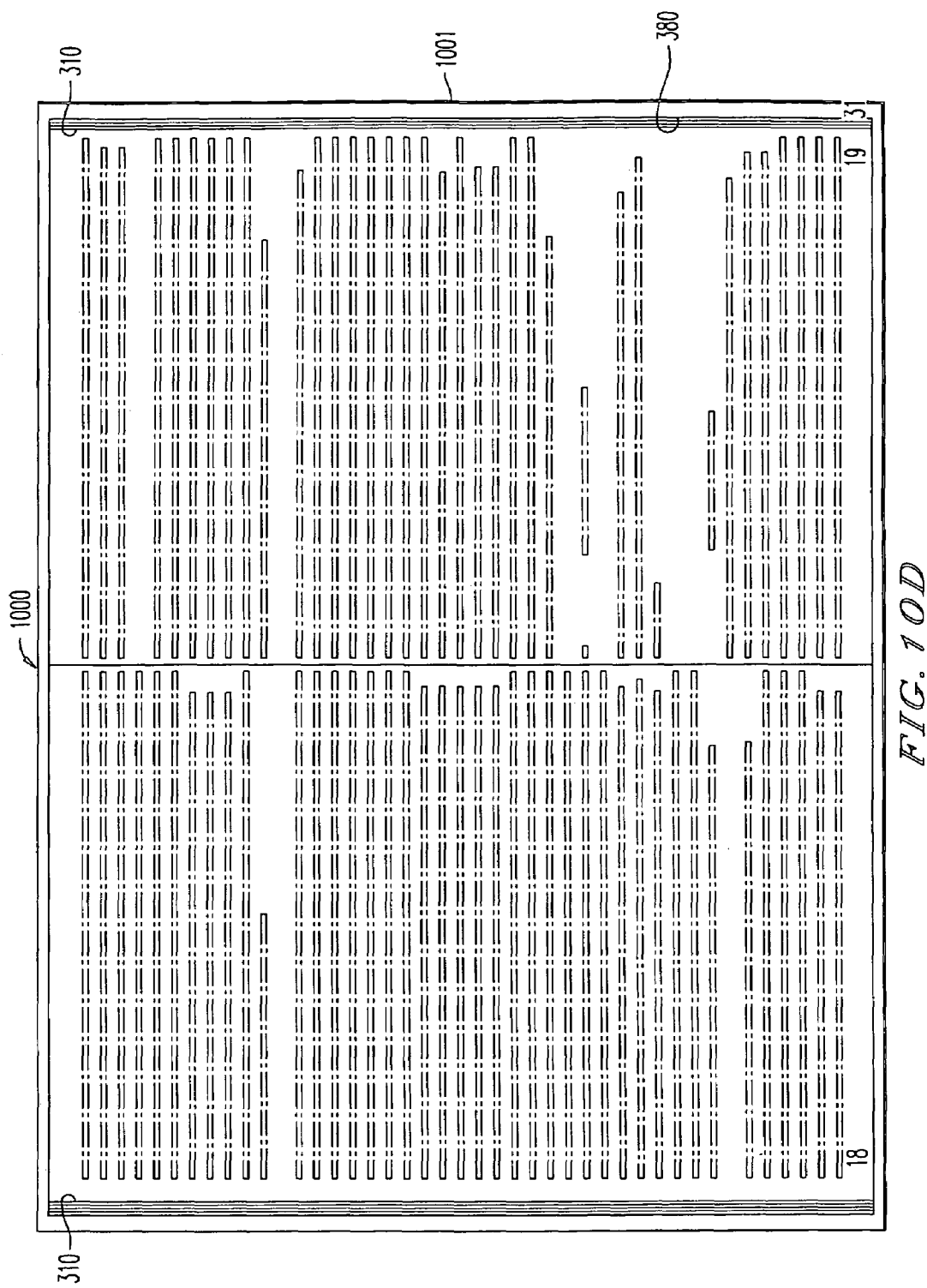
FIG. 10D illustrates the activation of a jump cursor operation on the thickness of the book in FIG. 10A.

FIG. 10D illustrates the operations of the jump cursor 380. On the thickness on the side of the book is displayed a highlighted line parallel to the length of the thickness that indicates the current position of the jump cursor. The user can move this cursor across the thickness by moving his finger on the position sensor 121 or 171 on the browsing device 200 (or 261 or 262 on the browsing device 260) to select the position in the document to jump to before effecting the jump.

Figure 10E:
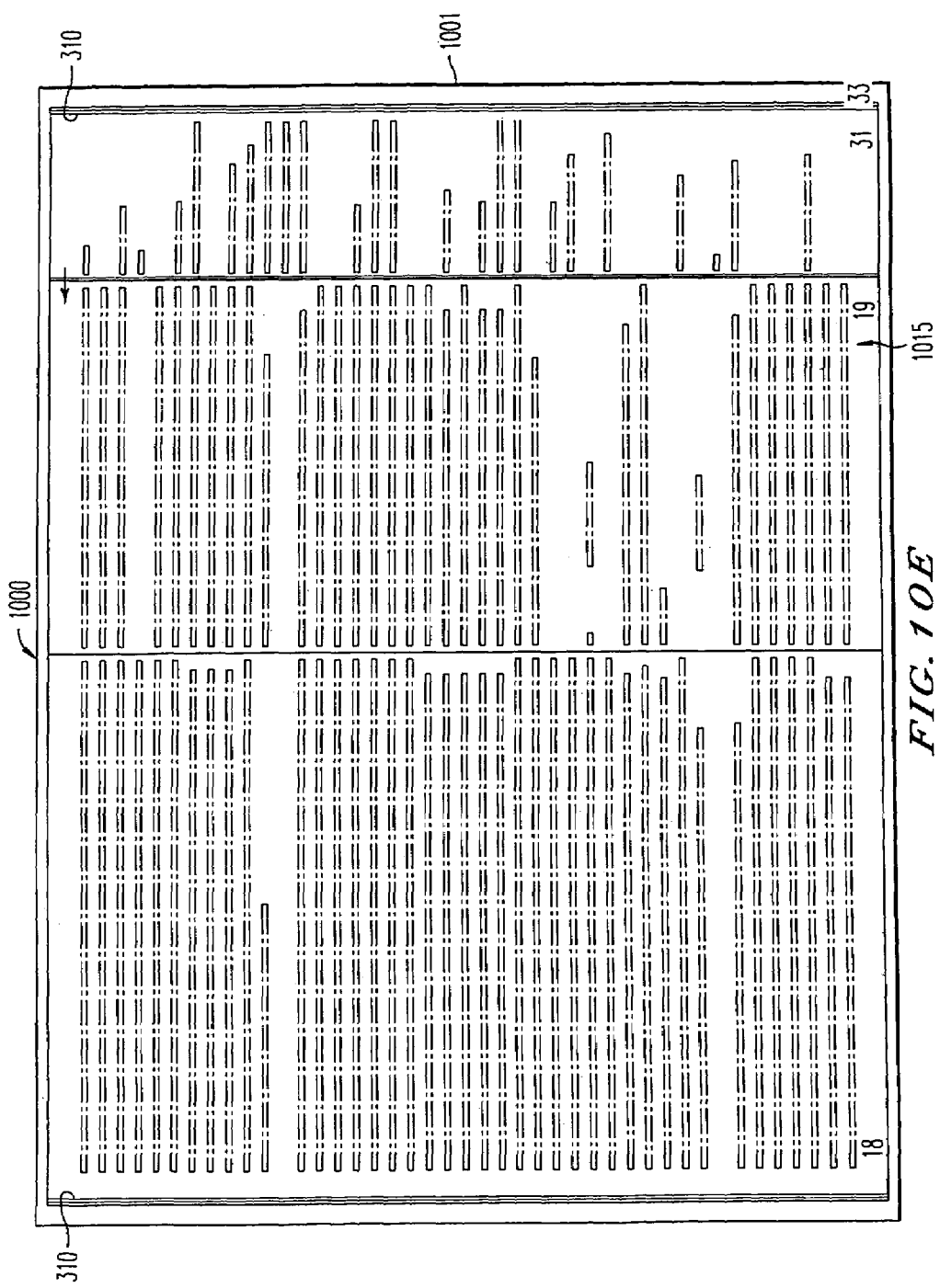
FIG. 10E illustrates a jump operation to a different portion of the book.
Figure 1O:
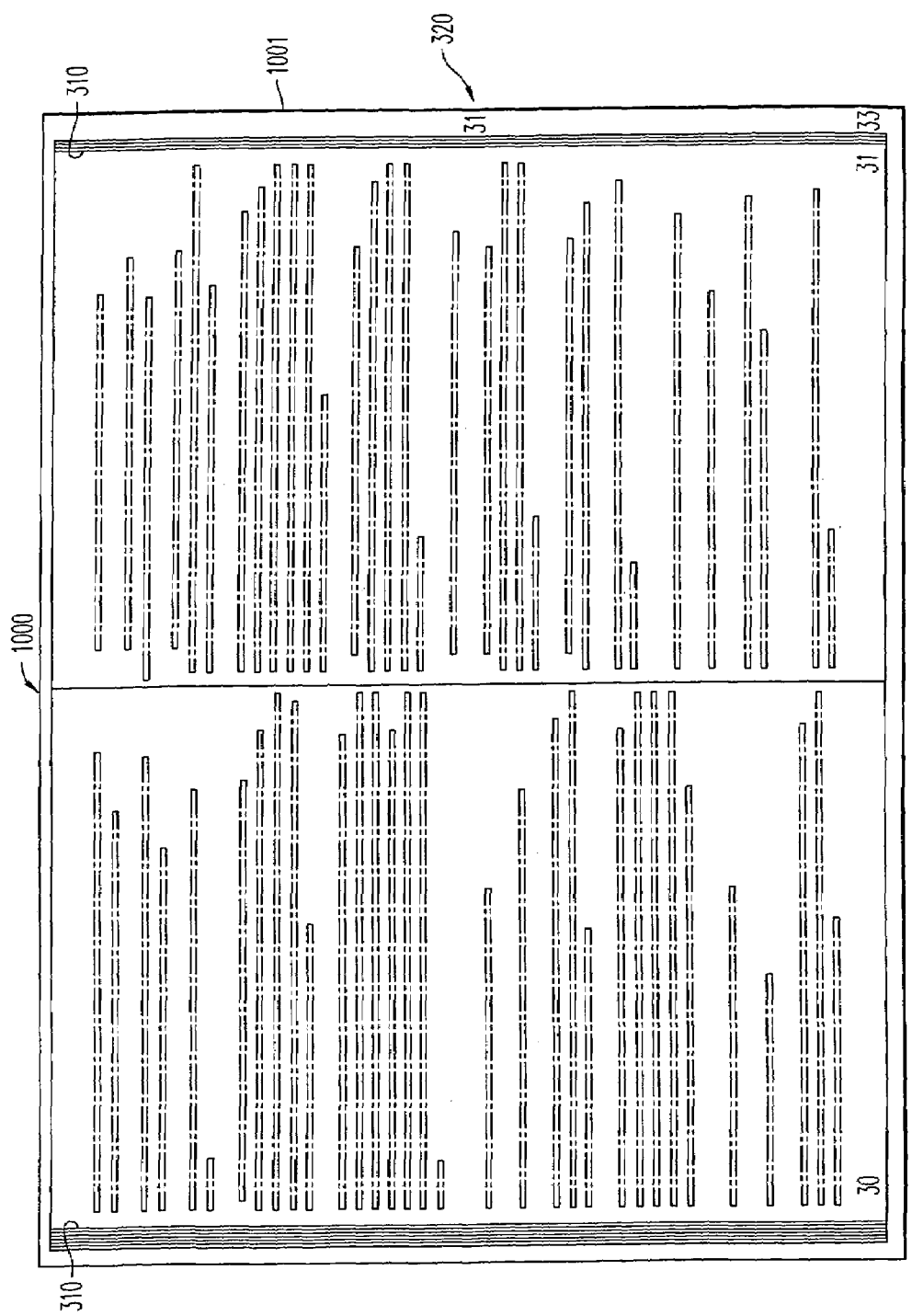

FIG. 10E shows a jump being effected to a different portion of the document—a thickened page 1015 with a thickness proportional to the amount of material skipped over is shown to flip across the book.

FIG. 10F illustrates the creation of a finger-bookmark 320. When one of the finger-bookmarking buttons 131-134 and 181-184 on the browsing device 200 is pressed, one of the currently viewed pages would be bookmarked and a finger-bookmark is displayed sticking out from the edge of the page involved as shown in FIG. 10F. Using the browsing device 200 or 260, up to four finger-bookmarks can be created on each side of the book and they are displayed at locations in the thicknesses 310 that correspond to the locations of the bookmarking buttons on the browsing device 200 or 260. A property of a finger-bookmark is that if the page that it bookmarks flips, it would be removed, freeing the corresponding finger-bookmarking button for future finger-bookmarking.

Figure 10G:
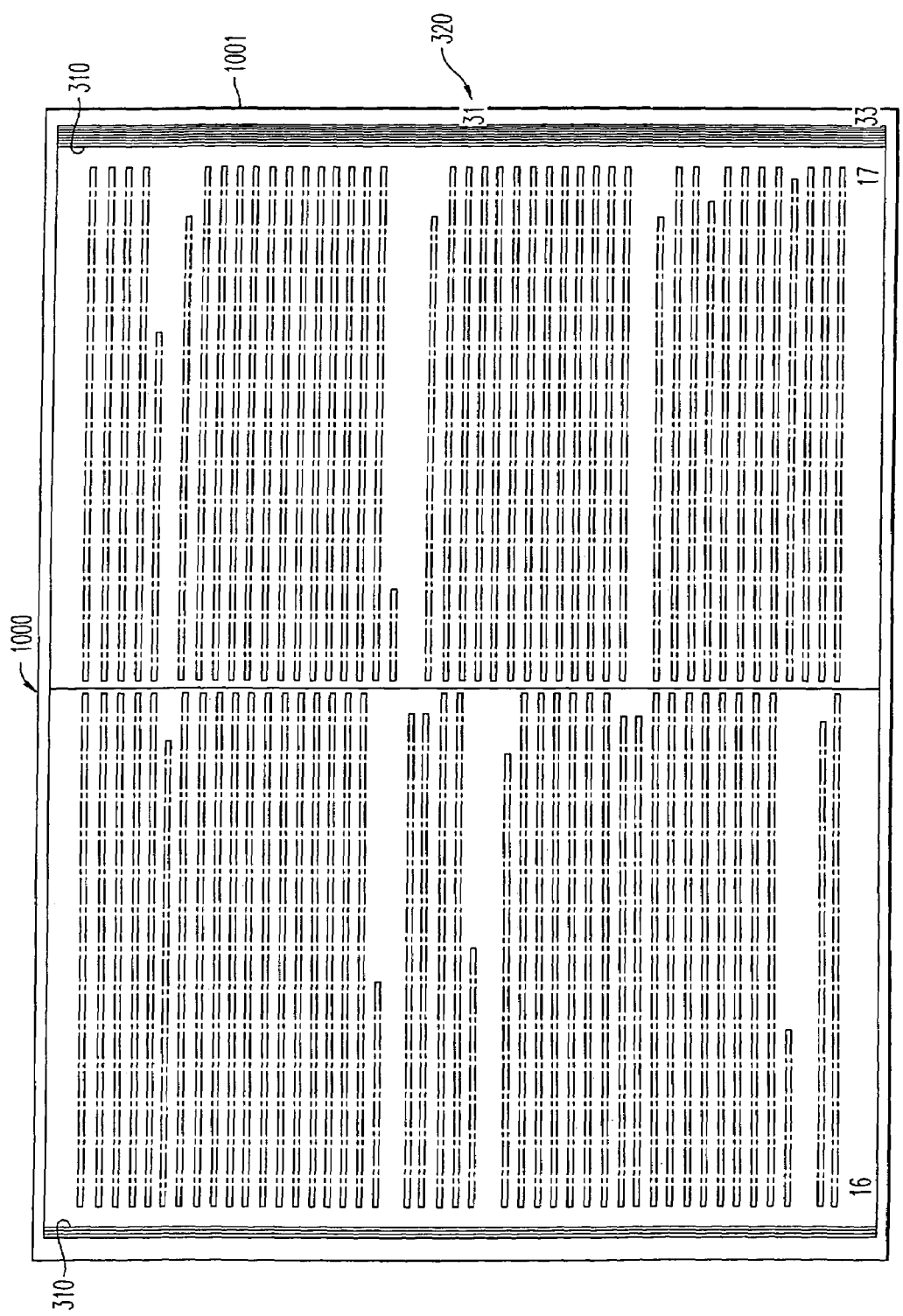
FIG. 10G illustrates the retention of the finger-bookmark created in FIG. 10F.

FIG. 10G shows the retention of the finger-bookmark 320 created in FIG. 10F after the user has flipped to other pages.

Figure 10H:
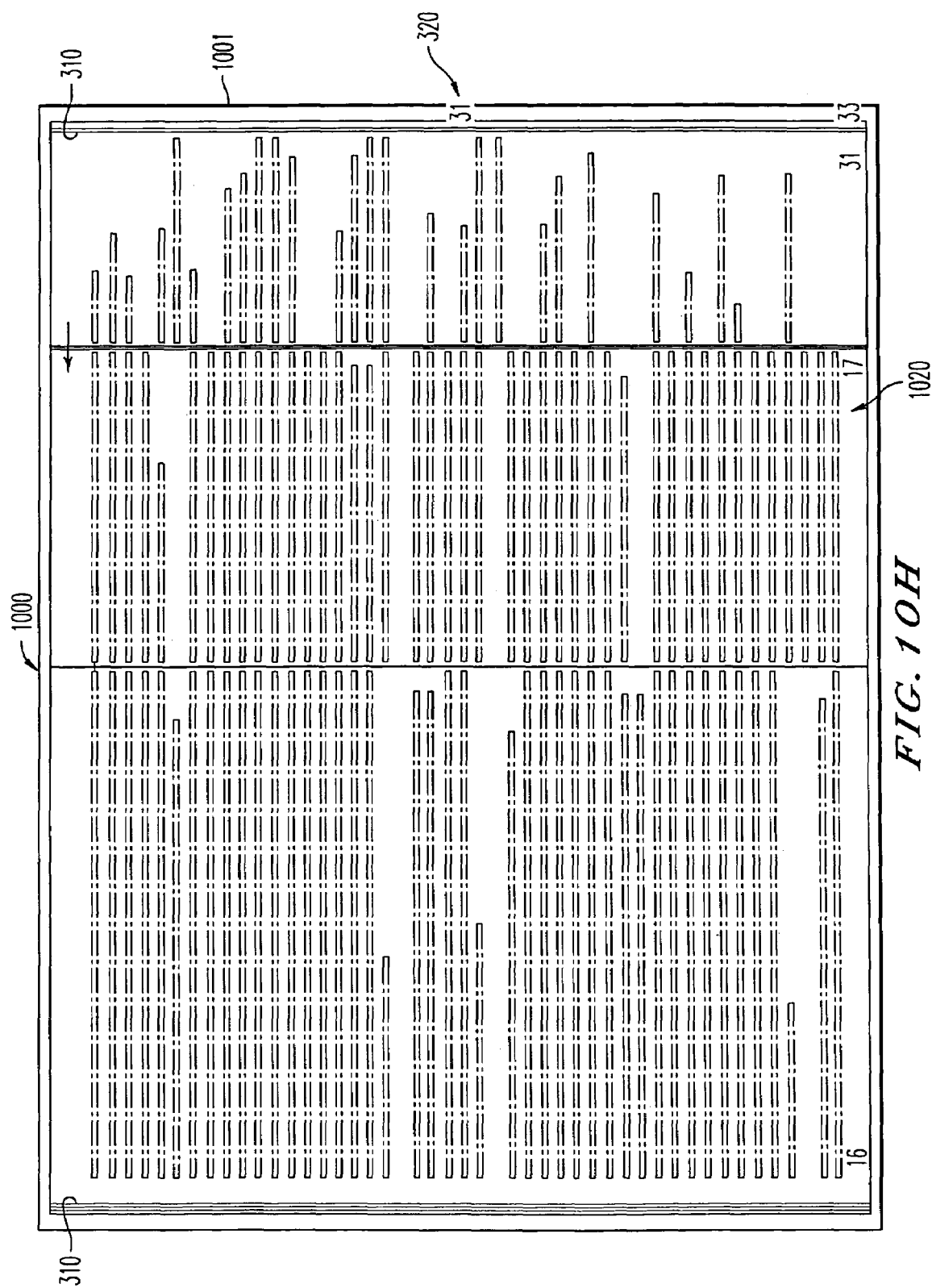
FIG. 10H illustrates a jump operation made to a finger-bookmarked page.

FIG. 10H shows a jump being effected to the page bookmarked in FIG. 10F through the use of the finger-bookmarking button (that is, one of 131-134 and 181-184) on the browsing device 200 that was earlier used to bookmark that page. The display of the jumping action is similar to that effected through the use of the position sensor and jump cursor as described above and illustrated in FIGS. 10E—a thickened page 1020 proportional to the amount of material skipped over is shown to flip across the book.

Figure 10I:
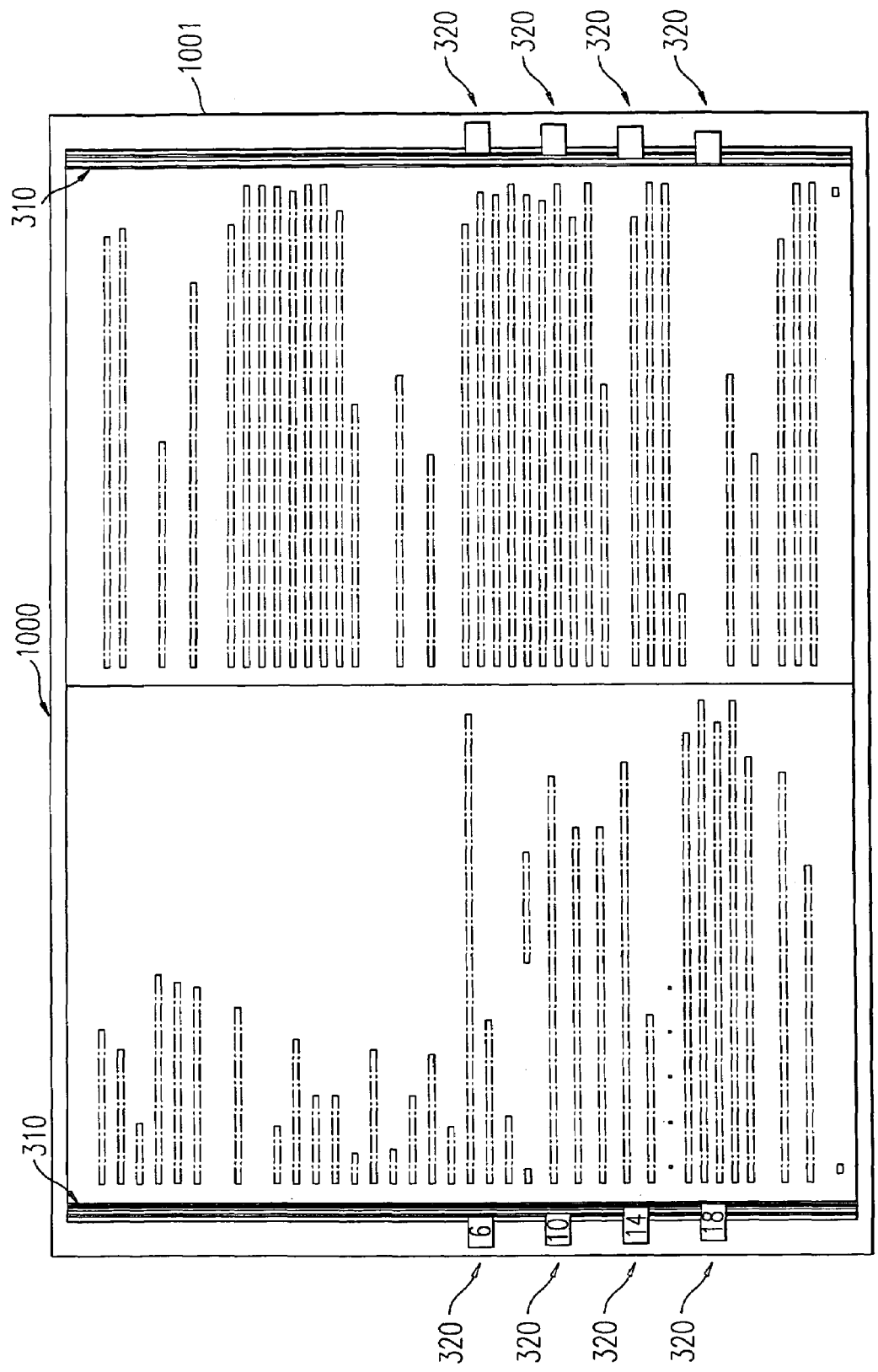
FIG. 10I illustrates all the created finger-bookmarks.

FIG. 10I shows an example in which the maximum number (in the present embodiment, although a greater number of bookmarks is possible in a less restrictive embodiment) of eight finger-bookmarks 320 is created.

Figure 11:
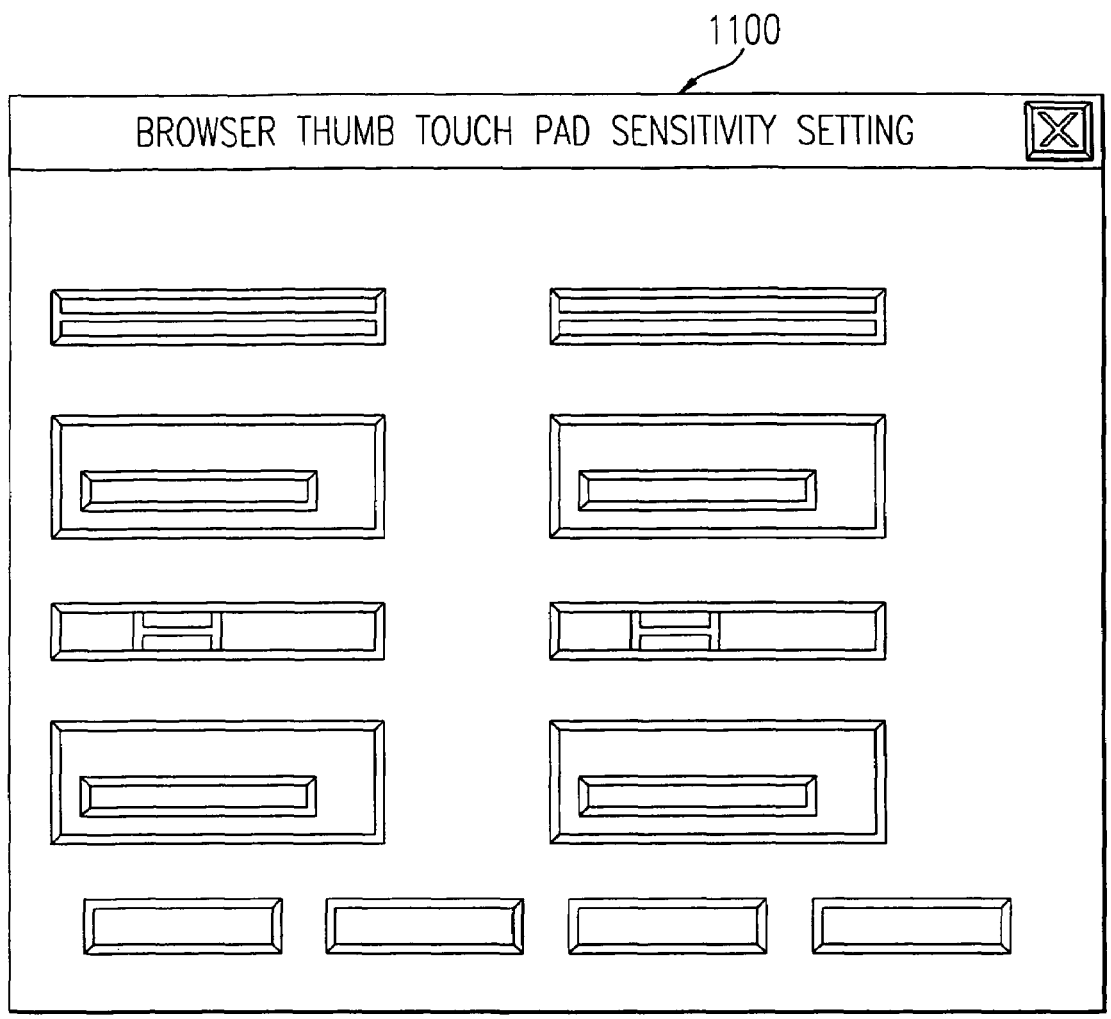
FIG. 11 shows a WINDOWS interface that allows the user to adjust the sensitivities of the force and position sensor on the browsing device.

FIG. 11 illustrates an embodiment of a window-oriented interface 1100 displayed on the computer screen that allows the user to set the sensitivities of the force and position sensors 121 and 171 on the browsing device 200.

One embodiment of the above browsing operations illustrated in FIGS. 10A-FIG. 10H controlled from a browsing device 200 is as follows. There are two force thresholds, F1 (typically about 50% of the maximum force signal generated by the sensor 121 or 171) and F2 (typically about 80% of the maximum force signal generated by the sensor 121 or 171), defined for the force sensing aspect of the sensors 121 and 171 on the browsing device 200. When the user's finger applies a force less than F1, no action is taken. If a force greater than F1 is applied and then removed in a short time, say in less than T1 (typically about 1 second or less), a single page is shown to flip across and then no further change in the book display 1000 is made until other operations are performed. Starting from a force less than F1, if a force greater than F1 but less then F2 is applied and held for longer than T1, the browsing process enters a continuous flipping mode. Pages continue to flip for as long as the force is greater than F1, and the speed of movement through the document (as reflected in the speed of flipping of one page or the number of pages flipped across at any given time) increases as the force on the sensor 121 or 171 of the browsing device 200 increases. In the continuous flipping mode, as soon as the force falls below F1, the flipping actions stop.

Starting from a force less then F1, if a force greater than F2 is applied and held for longer than T1, the browsing process enters the jump exploration mode. In this mode, the user can move the jump cursor using the position sensing capabilities of the sensor 121 or 171 on the browsing device 200 to select the page to which to jump. The user's finger movement in the x-direction (as defined in FIG. 2A) on the force and position sensor 121 or 171 is translated into the movement of the jump cursor in the direction of the thickness of the book. When a desired location to jump to is selected, the user lets the force fall below F1, and the jump to the selected location is effected. If in the jump exploration mode the user decides to terminate the mode and not execute any jump, he can press one of the unused finger-bookmarking buttons 131-134 and 181-184 (i.e., the button has not been used to bookmark any of the pages in the document) on the browsing device 200 to cancel the mode.

For finger-bookmarking, when the user desires to finger-bookmark one of the pages currently in view, he would use one of the finger-bookmarking buttons 131-134 and 181-184 on the browsing device 200. The buttons 131-134 on the right side of the browsing device 200 are for bookmarking the right-hand page and vice versa for the left side. One click of the button involved creates a finger-bookmark 320. The button is now associated with the bookmark 320 thus created. The bookmark is removed—i.e., the bookmark disappears and the button becomes unused—as soon as the bookmarked page is flipped. Another way a finger-bookmark can be removed is when the button associated with it is clicked one time. To return to a finger-bookmarked page, the user has to first enter the jump exploration mode using the method described above and then press the button associated with the finger-bookmarked page.

The present embodiment of the browsing operations, as controlled from the browsing device 200, are preferably implemented in software, say, the C++ computer language, held in a computer readable medium and executable on a personal computer such as an IBM Aptiva 2176X71. FIGS. 12A-12I show the respective flowcharts of this software. Because the flipping processes for forward flipping and backward flipping to move through the document in both directions are symmetrical, only the mechanism for one of the directions—the forward direction—is described.

Figure 12A:
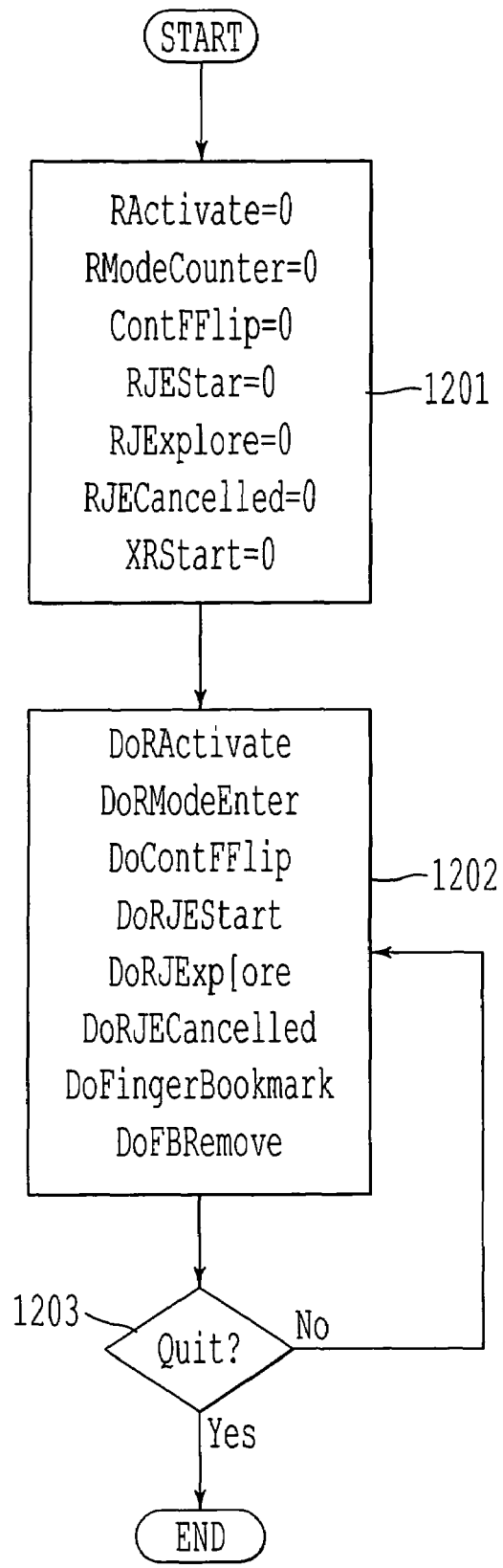

FIG. 12A is the Main software loop that begins in step 1201, where various flags are initialized. The process then flows to step 1202, where 8 sub-routines that will be separately described are executed. The process then flows to step 1203 where a check is made to see if the user desires to terminate the entire program. If so, the program terminates. If not, the process flows back to step 1202 where all the 8 sub-routines are executed again.

FIG. 12B is the flowchart for the DoRActivate (activation of right-side processes) sub-routine, which is a first of the eight subroutines discussed above. In step 1205, the RActivate flag is checked to see if it is 0. If not, the process ends; if so, the process flows to step 1206 where the RJECancelled flag is checked to see if it is 0. If not, the process ends; if so, the process flows to step 1207 where a check is made to see if FR (the force on the right sensor on the browsing device 200) is greater than a preset threshold F1 (typically about 50% of the maximum force signal generated by the sensor 121 or 171). If not, the process ends; if so, the process flows to step 1208 where RActivate is set to 1. The process then flows to step 1209 where RModeCounter, a counter for deciding which mode of the browsing process the user intends to enter, is started.

FIG. 12C is the flowchart for the DoRModeEnter (decide which mode to enter based on signals from the right sensor) sub-routine. In step 1211, a check is made to see if RActivate is equal to 1. If not the process ends; if so the process flows to step 1212 where a check is made to see if RModeCounter is greater than a preset, short, time T1. If not the process flows to step 1218. If so, the process flows to step 1213 where RmodeCounter is set to 0. After that the process flows to step 1214 where a check is made to see if FR is greater than a preset threshold F2 (F2>F1). (F2 is typically about 80% of the maximum force signal generated by the sensor 121 or 171.) If so, the flag RJEStart is set to 1 in step 1217 and after that the process ends. If not, the process flows to step 1215 where a check is made to see if FR is greater than F1. If so the process flows to step 1216 where the flag ContFFlip is set to 1, after which the process ends. If not, the process flows to step 1219 where if one or more than one page is in the process of flipping from the left side to the right side of the book, the direction of flipping of the left-most page moving in that direction is reversed, or else a page is launched from the right side to the left side of the book. (After a page is launched or made to change its direction of flipping, the page continues its flipping action in an independent process while the current process continues.) After that the process flows to step 1220 where RActivate is set to 0, after which the process ends. In step 1218, a check is made to see if FR is less than F1. If not the process ends; if so the process flows to step 1219.

Figure 12D:
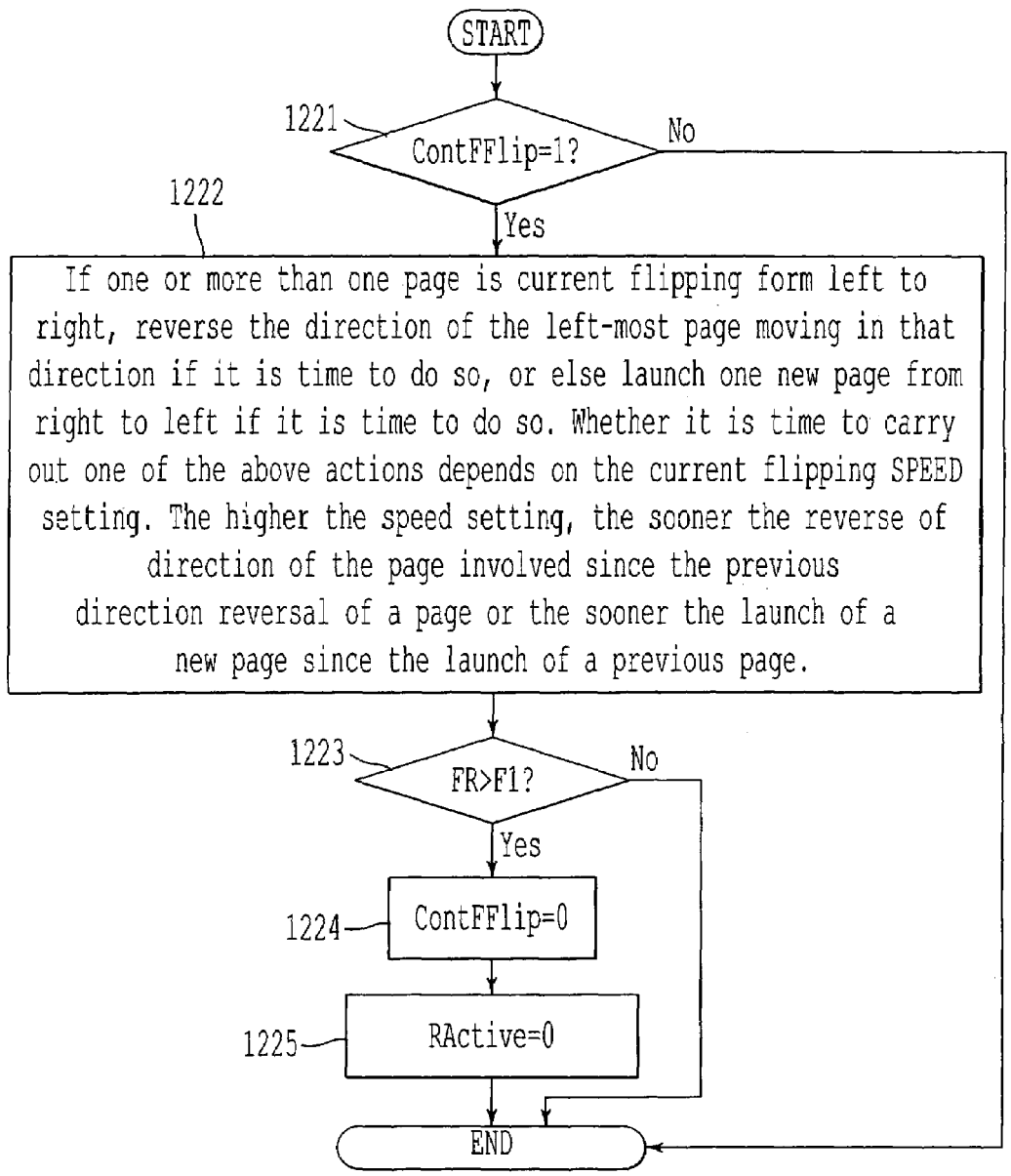

FIG. 12D is a flowchart for the subroutine DoContFFlip (continuous forward flipping mode). In step 1221, a check is made to see if the flag ContFFlip is equal to 1. If not the process ends. If so, the process flows to step 1222 where, based on the current speed setting determined by the force signals from the sensor 121 or 171, if one or more than one page is in the process of flipping from the left side to the right side of the book, the direction of flipping of the left-most page moving in that direction is reversed if it is time to do so, or else a new page is launched if it is time to launch the new page.

This is because the higher the flipping speed setting, the sooner a page would be launched after the launch of the previous page, or the sooner a page would have its direction reversed after the previous direction reversal of a page. After step 1222, the process flows to step 1223 where a check is made to see if FR is less than F1. If not, the process ends; if so, the process flows to step 1224 where ContFFlip is set to 0. Subsequently, the process flows to step 1225 where RActivate is set to 0, and then, the process ends.

FIG. 12E shows the flowchart of the subroutine DoRJEStart. In step 1231, a check is made to see if RJEStart is equal to 1. If not, the process ends. If so, the process flows to step 1232 where XR, the finger's position on the right sensor, is read. The process then flows to step 1233 where a variable XRStart is given the value of XR. The process then flows to step 1234 where RJEStart is set to 0. Subsequently, the process flows to step 1235 where RJExplore is set to 1, and then the process ends.

Figure 12F:
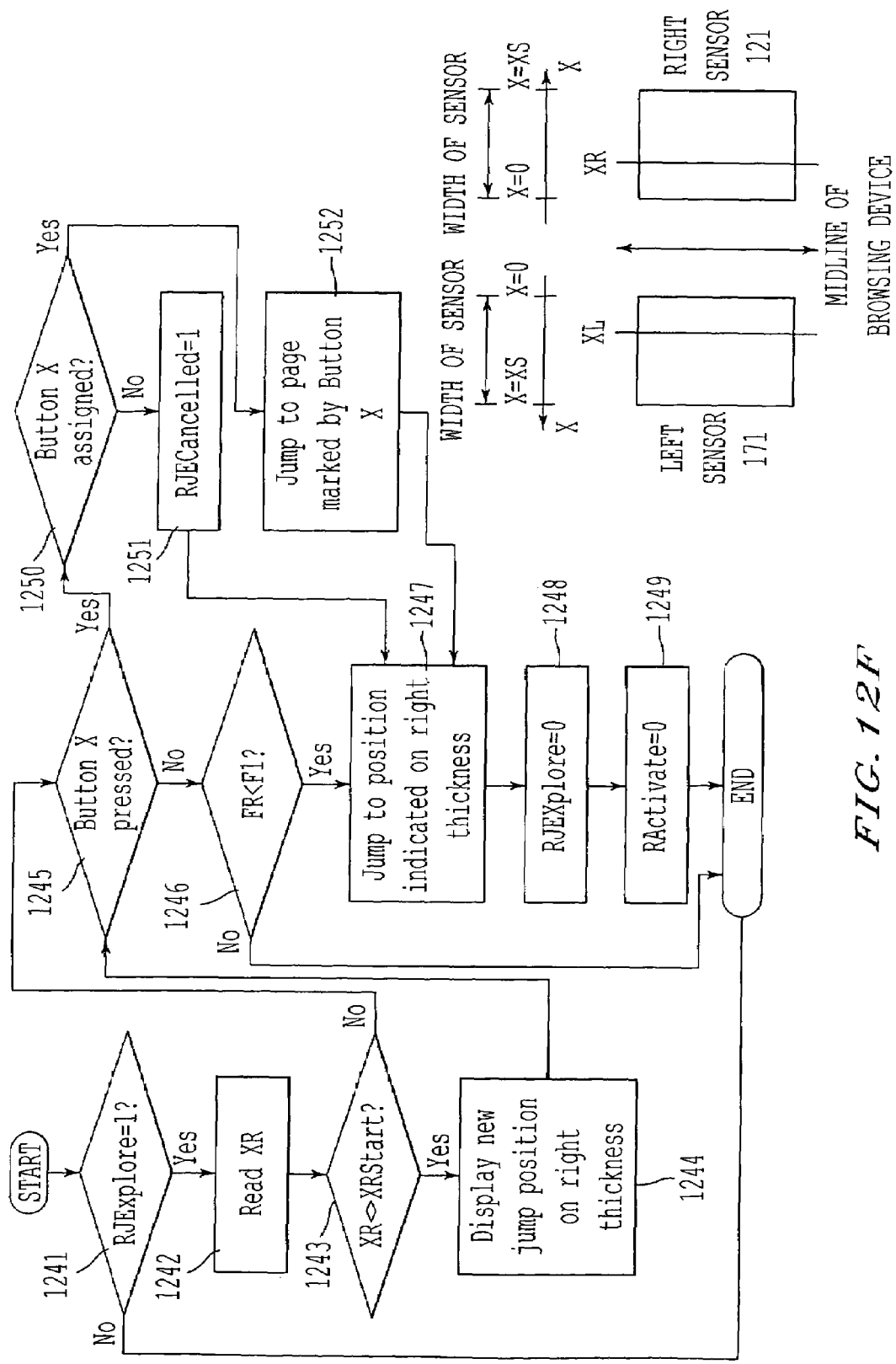

FIG. 12F illustrates the flowchart of the subroutine DoRJExplore. In step 1241, a check is made to see if the flag RJExplore is equal to 1. If not, the process ends. If so, the process flows to step 1242 where XR is set to be the current position value of the finger on the right sensor. The process then flows to step 1243 where a check is made to see if XR is not the same as XRStart. If that condition is not met, the process flows to step 1245. If that is true, the process flows to step 1244 where the jump cursor's position on the thickness on the right side of the book displayed on the computer screen is updated. The process then flows to step 1245. In step 1245, a check is made to see if any finger-bookmarking button has been pressed. If so, the process flows to step 1250. If not the process flows to step 1246 where a check is made to see if FR is less than F1. If not the process ends. If so the process flows to step 1247 where a jump is made to the page indicated by the jump cursor. After that, the process flows to step 1248 where the flag RJExplore is set to 0. Subsequently, the process flows to step 1249 where the value of RActivate is set to 0, and then the process ends.

In step 1250, a check is made to see if the button just pressed has been assigned to bookmark a page. If so, the process flows to step 1252 where a jump is effected to the page bookmarked by Button X and after that, the process flows to step 1248. If not, the process flows to step 1251 where the value of RJECancelled is set to 1, and then to steps 1248 and 1249 before ending.

Figure 12G:
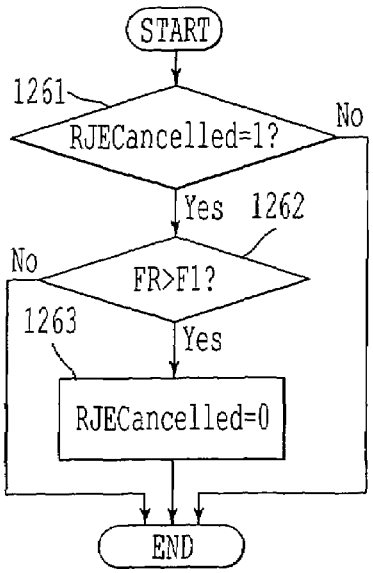

FIG. 12G shows the flowchart of the subroutine DoRJECancelled. In step 1261 a check is made to see if the value of RJECancelled is equal to 1. If not, the process ends; but, if so, the process flows to step 1262 where a check is made to see if FR is less than F1. If not, the process ends; but, if so, the process flows to step 1263 where the value of RJECancelled is set to 0, and then the process ends.

Figure 12I:
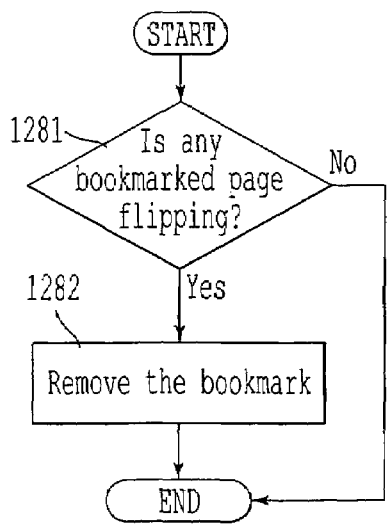
Figure 12H:
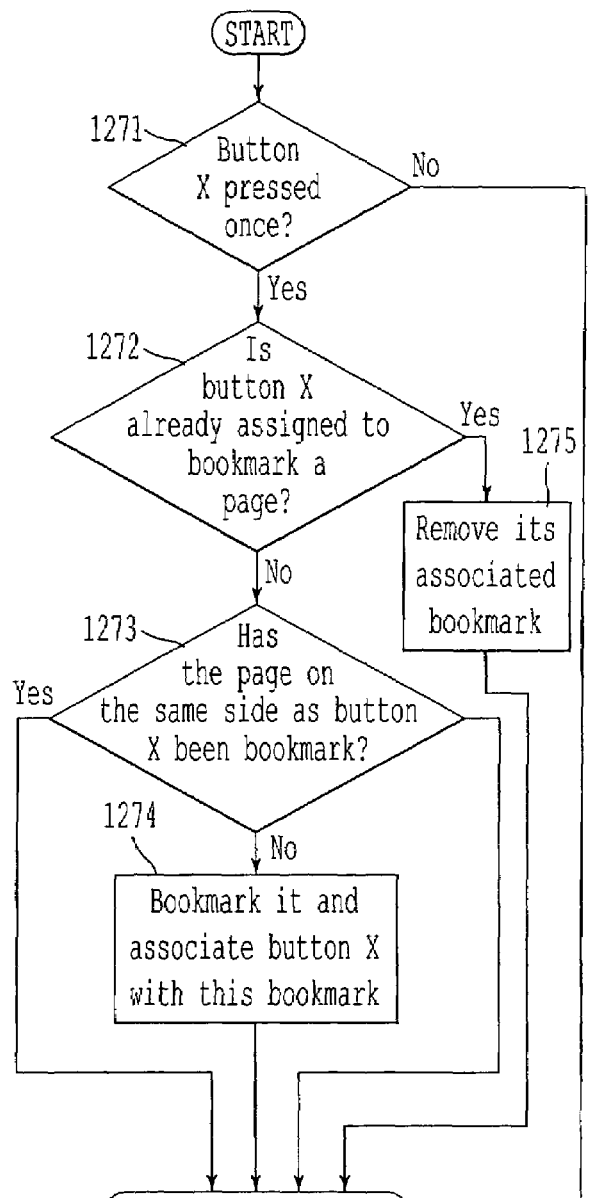

FIG. 12H illustrates the flowchart of the subroutine DoFingerBookmark. In step 1271, a check is made to see if any finger-bookmarking button has been pressed once. If not, the process ends; but, if so, the process flows to step 1272 where a check is made to see if the button pressed has already been assigned to bookmark a page. If so, the process flows to step 1275 where the associated bookmark is removed and then the process ends. If not, the process flows to step 1273 where a check is made to see if the page on the same side as the pressed button has been bookmarked. If so, the process ends; but, if not, the process flows to step 1274 where the page is finger-bookmarked and the just pressed button is associated with this bookmark, and then the process ends.

FIG. 12I shows the flowchart of the subroutine DoFBRemove. In step 1281, a check is made to see if any finger-bookmarked page is being flipped. If not, the process ends; if so, the process flows to step 1282 where the bookmark is removed. After that, the process ends.

Figure 13A:
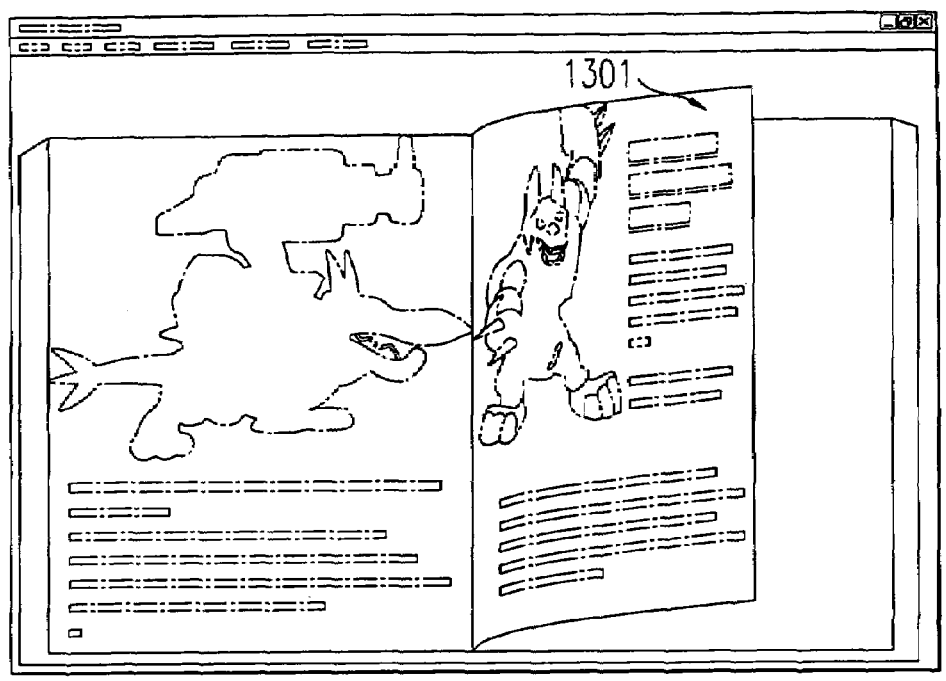
FIGS. 13A-13B show a flipping display embodiment of the present invention.
Figure 13B:
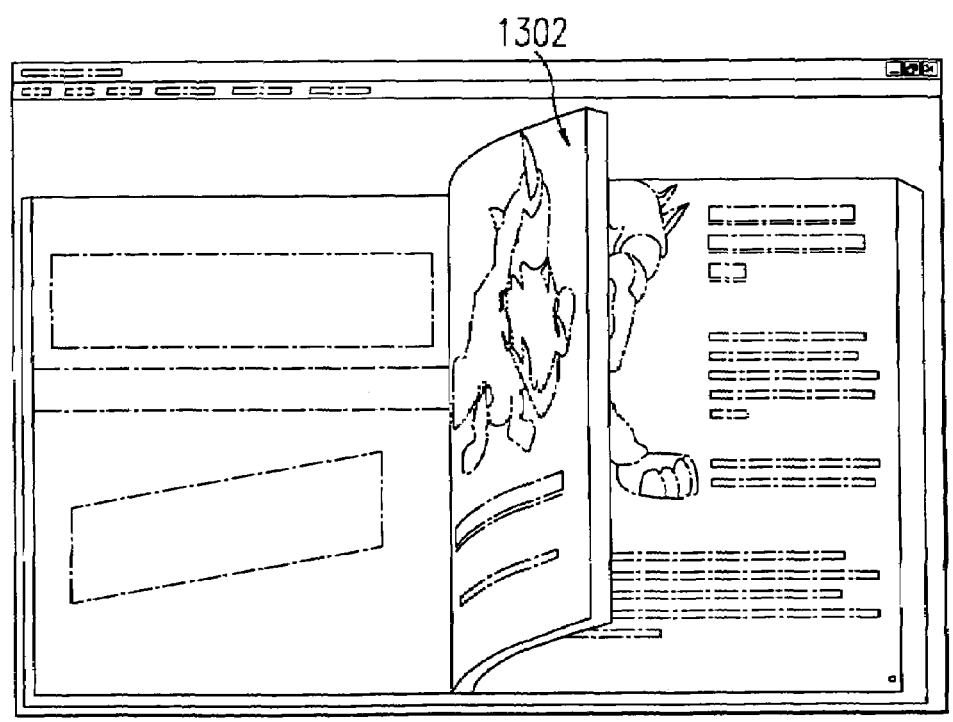

FIGS. 13A and 13B illustrate a different, alternative method of displaying flipping pages on a computer screen. The pages are shown to bend as they flip, enhancing the 3D effect and ease of use for a reader. FIG. 13A shows a page 1301 bending as it is being flipped from right to left. FIG. 13B shows the bending of a group of pages 1302 that are skipped over when a jump is made to a different portion of the book. Even though the 3D effect is better, this method can provide real-time flipping—i.e., the generation of the flipping pages and browsing operations in a short time in response to commands from, say, the browsing device 200—the method places a greater processing load on a processor than the other methods. For example, in 1997 a higher speed computer such as the Silicon Graphics O2 workstation would be better suited than a typical personal computer to perform the requisite video processing.

Figure 14A:
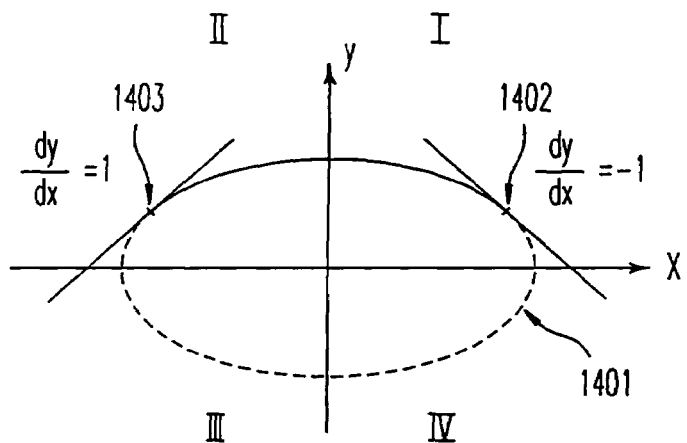
FIGS. 14A-14C illustrate the process by which the flipping display of FIGS. 13A and 13B is generated.
Figure 14B:
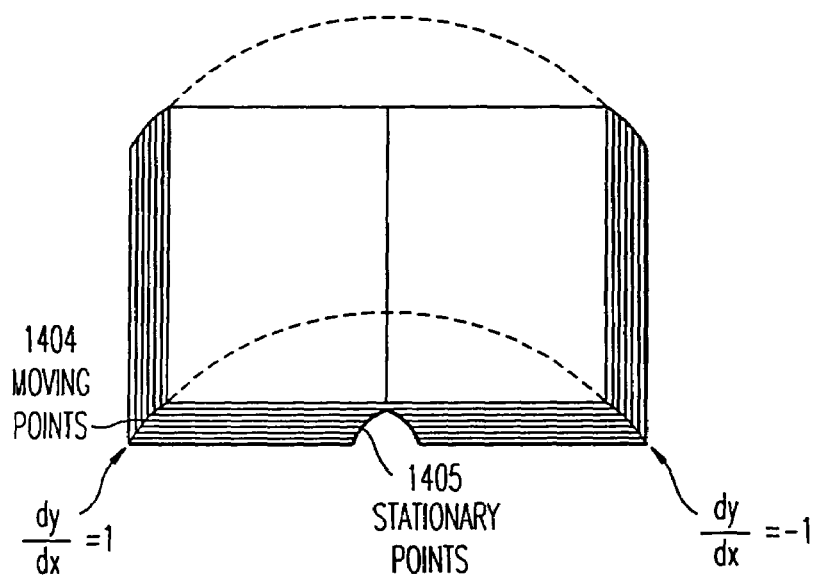
Figure 14C:
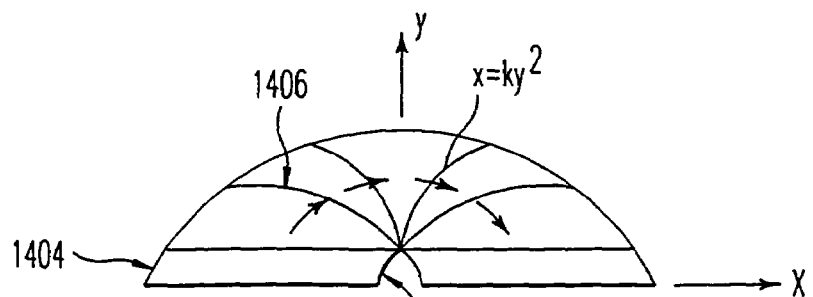

FIGS. 14A-14C describe the video processing performed to display the bending pages. When a page flips, the points on its moving edge opposite its stationary edge (i.e., the edge that is joined to the edges of the other pages) sweep over an arc. Let these points be called the moving points and the points on the stationary edge be called the stationary points. The arc over which the moving points of a flipping page sweep is obtained from an arc on an ellipse 1401 as shown in FIG. 14A. The arc lies in quadrants I and II and between two end points 1402 and 1403, one of which has a gradient of −1 and the other 1.

The thickness of the book determines how much of this arc is used when the book is opened right in the middle as shown in FIG. 14B. Before any flipping action begins, the moving points 1404 lie along a short segment of the arc 1404 obtained from FIG. 14A. The stationary points 1405 lie along an appropriately translated version of the short arc. During the flipping action of a page, its stationary points do not move, as shown in FIG. 14C. Its moving points sweep across the arc as their X-axis values change, say, linearly. As these points move, arcs have to be generated to join the moving points to their corresponding stationary points so that the page would bend as it flips. These arcs 1406 are generated based on the equation $x = ky^{}2$ as shown in FIG. 14C**.

Figure 4A:
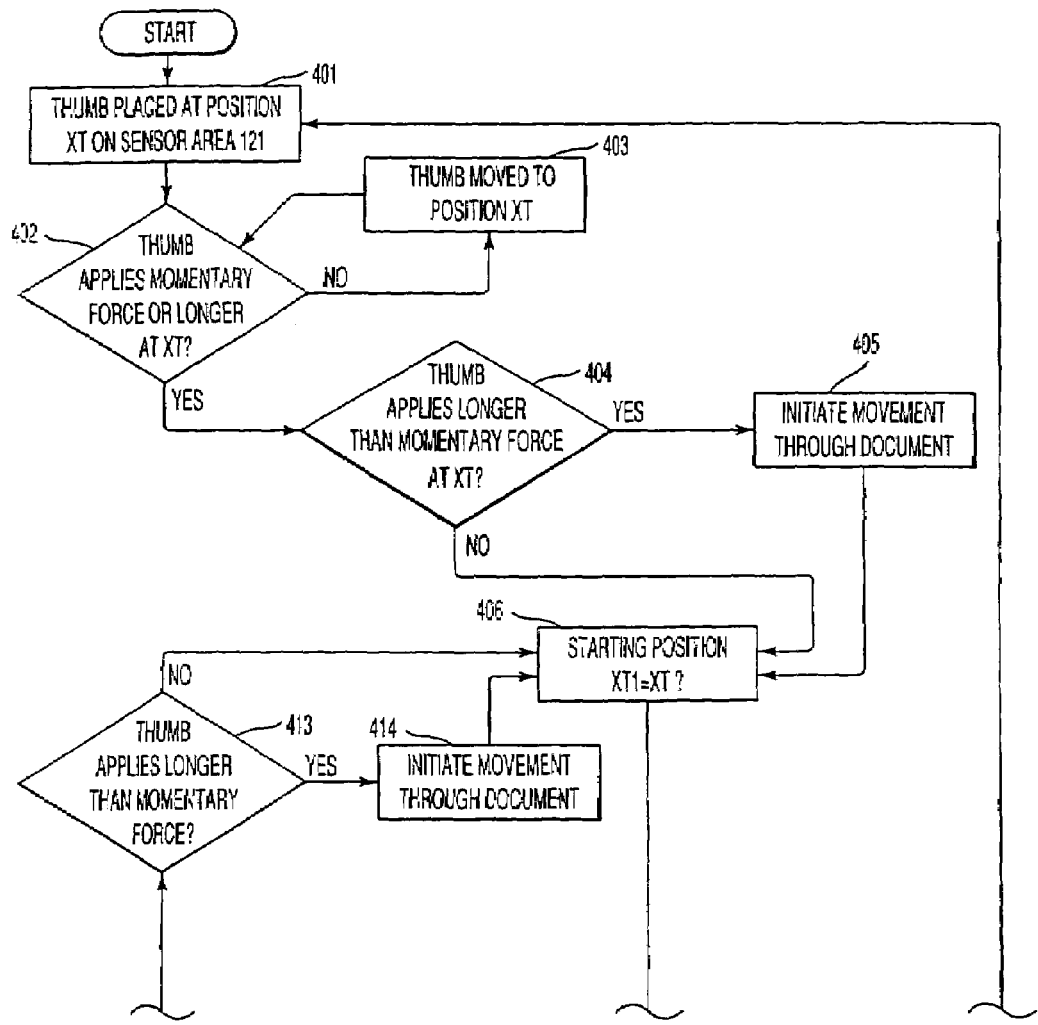
Figure 15A:
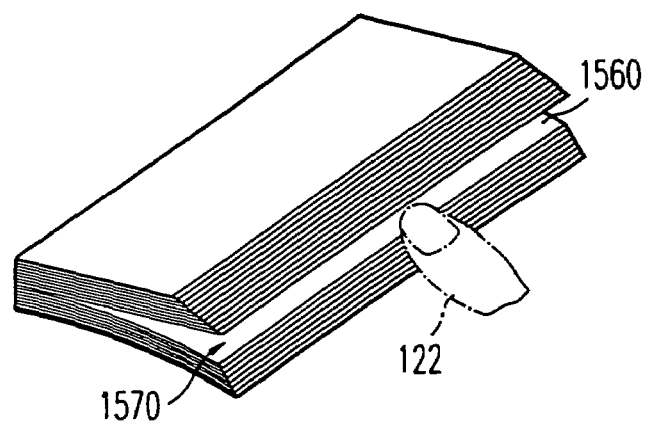
FIGS. 15A-C are schematic perspective views of another embodiment of the browsing device that uses many thin, hard, and flexible pieces of material bound together in the manner of the binding of the pages of a book.
Figure 15B:
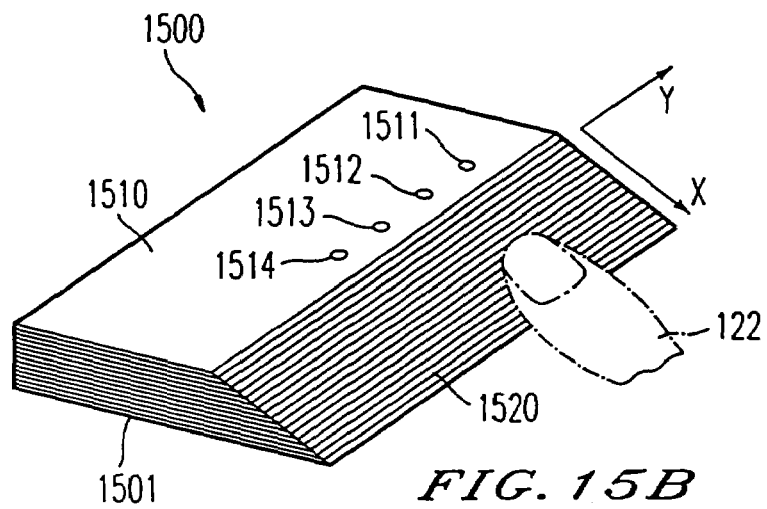
Figure 15C:
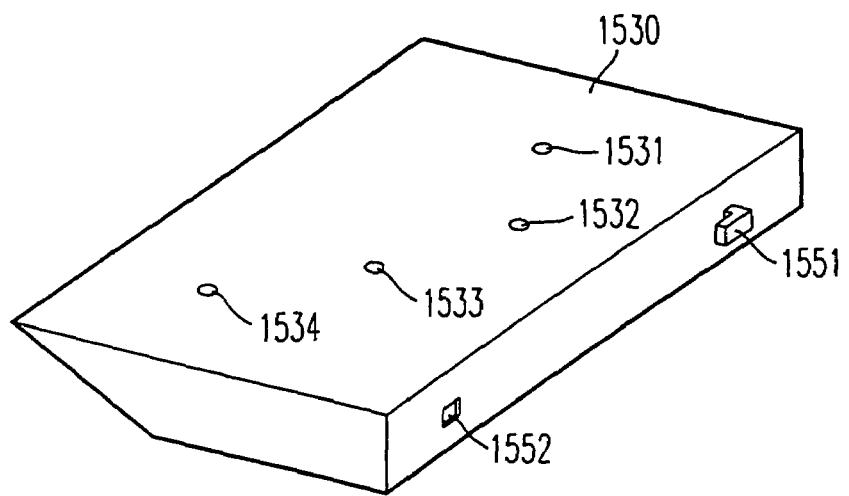

FIGS. 15A, 15B and 15C depict another embodiment 1500 of the browsing device 100 of FIGS. 1B and 1C. This device 1500 includes many thin, hard and flexible pieces of material 1501 bound together in the manner of the binding of the pages in a book, except that the "flipping" side is made into a slanted surface 1520 in much the same way as in the device 100 depicted in FIG. 1B. When the thumb 122 applies a force onto the slanted surface 1520, the "pages" 1501 will bend like the pages in a normal book and the bending force is sensed to effect the same operations as those performed by the thumb's force on the slanted surface 121 of the browsing device 100. To jump to a certain page, the thumb 122 slides along the slanted surface 1520 in the x-direction (similar to that defined for the browsing device 100) until it reaches the desired position, say XT, and then it bends the remaining pages 1501, much like one would bend the pages of a book in the process of holding onto the left and right edges of the book to browse through the pages, which results in a slight separation 1560 of the pages 1501 for which x>XT from those pages for which x<XT and a gap 1560 in the pages 1501 is created where the thumb 122 is placed. Thin film sensors 1570 are placed on the surfaces of these mini-pages 1501 to sense the separation 1560 and hence the location to jump to in the document involved. The mapping of the position of the thumb 122 to the page jumped to in the document is identical to that used in the device 100 depicted in FIGS. 1B and 1C as described above in the flowchart in FIG. 4 (shown as FIGS. 4A and 4B). Four buttons 1511-1514 are provided on the top surface 1510 and four buttons 1531-1534 are provided on the bottom surface 1530 of the device 1500 that function like the four buttons 111-114 on the top surface 110 and the four buttons 131-134 on the bottom surface 130 respectively of the browsing device 100. Mechanisms 1551 and 1552 are also provided to join two devices 1500 (a left-hand and a right-hand version) together. All other operations are identical to those described for the device 100 depicted in FIGS. 1B and 1C.

Figure 16A:
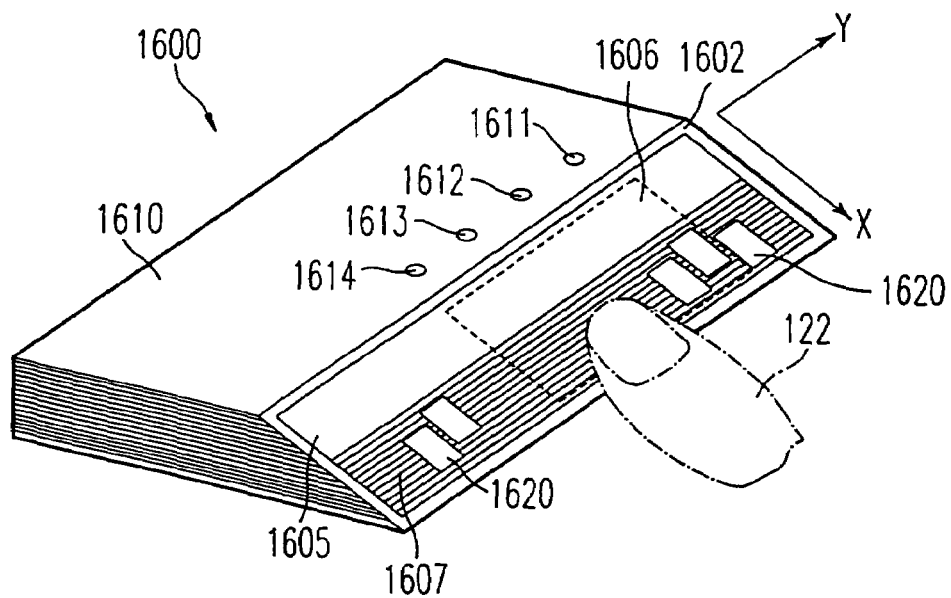
FIGS. 16A-16B are top/bottom schematic perspective views of another embodiment of the browsing device that uses a display screen fitted to a slanted surface to display a material thicknesses before or after currently viewed material.
Figure 16B:
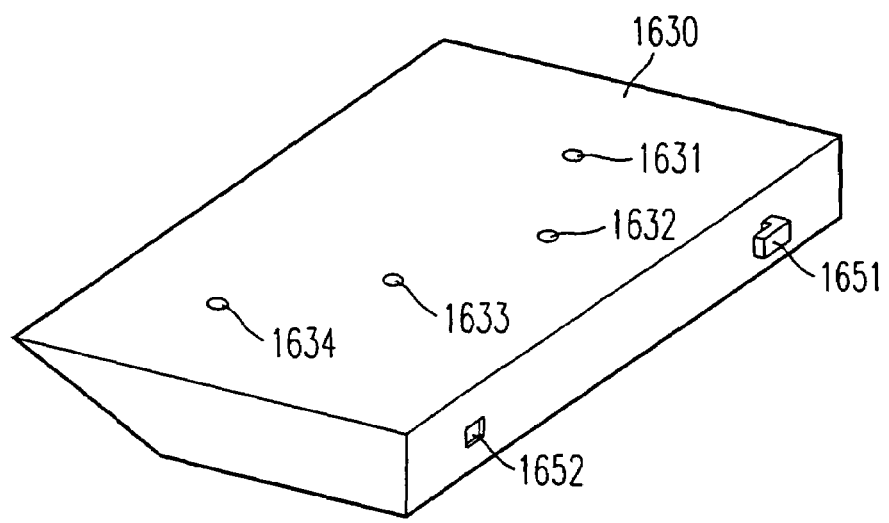

FIGS. 16A and 16B depict yet another embodiment 1600 of the browsing device 100 of FIG. 1B. In this embodiment 1600, a liquid crystal display (LCD), plasma or other type of display screen 1605, much like what is normally used as a laptop computer monitor or calculator, is fitted onto the slanted surface 1602 of the browsing device 1600 as shown in the FIG. 16. It is used to display the amount of material present before and after the currently viewed material. To do this, a thickness 1607 is displayed on the screen 1605 that is proportional to the amount involved, that changes with the changes of the amount involved. On this thickness 1607, bookmarks 1620 can be displayed that indicate the locations of the pages/parts of the document involved. The same methods as described before for the computer book 300 depicted in FIG. 3 are used here on the screen 1605 for the following: (a) display the change of thickness; (b) display the bookmarks, and (c) display, the thickness 1607, of the location of the page/point in the document that would be jumped to were jumping to be effected at any given moment based on the thumb's x-position on the sensor area 1606 at that moment. Transparent force and position sensors 1606 overlay the screen 1605 and function much like what has been described before for the sensor area 121 in the browsing device 100 except that now the thumb 122 can move to the "absolute" location of the page to be jumped to effect the jumping. In this scheme, even though the thickness 1607 of material as well as the bookmarks 1620 are displayed on the screen 1605 of the browsing device 1600, they can also be displayed on the computer monitor screen like in the case described for the computer book 300 in FIG. 3 at the same time.

The absolute distance method for computing the point/page in the document to jump to when jumping is activated will be described. Let x=0 be the x-position on the screen 1605 that is nearest the edge adjoining the top surface 1610 and the slanted surface 1602. Recall that the intersection of the thumb 122 with the slanted surface 1602 has some spatial extent and the thumb 122 is considered to be at position x1 if it covers the point x1 and some contiguous points x such that x>x1. Consider now that the thickness of the book displayed on the screen 1605 is XS–XH, where XS is the width of the screen 1605. Let PR be the amount of remaining material in the document as defined before. The process of jumping can only be activated when the thumb 122 is at XT>XH, and when that happens, the amount of material skipped, PJ, is equal to PR*(XT–XH)/XS.

In the embodiment of the browsing device 1600, four buttons 1611-1614 are provided on the top surface 1610 and four buttons 1631-1634 are provided on the bottom surface 1630 of the device 1600 that function like the fours buttons 111-114 on the top surface 110 and the four buttons 131-134 on the bottom surface 130 respectively of the browsing device 100. Mechanisms 1651 and 1652 are also provided to join two devices 1600 (a left-hand and a right-hand version) together. All other operations are identical to those described for the device 100 depicted in FIG. 1B.

The above browsing system 700 (FIG. 7) is adapted to be used in conjunction with any software method that allows the reorganization of the material in the document involved to facilitate browsing/viewing. For example, under software control, in conjunction with the use of a mouse cum cursor method, say, two or more pages in the document to be compared or parts of the document to be compared can all be brought together and displayed in the currently viewed page(s). This may be achieved by, say, using the mouse cum cursor to first select parts of the current viewed pages by clicking the mouse button and dragging the mouse like what is normally done or to select one of the currently viewed pages by double clicking on that page where the cursor is now positioned. And then, after moving to another part of the document, the cursor can now be positioned over a point on one of the currently viewed pages and the selected material can be brought into view by one click of the mouse button. The selected material, if it is one page full, will simply cover the page on which the cursor was placed before the one click of the mouse button to bring it into view. If the selected material is not one page full, it will be positioned, say, to the right and bottom of the cursor, and cover part of the page on which the cursor was placed before the one click of the mouse button to bring it into view. Another click of the mouse button will remove this temporarily placed material to allow one to see what was on the page originally. This temporarily placed material will also automatically disappear from the page on which it was placed after that page disappears from view after the user activates movement to other parts of the document.

The above browsing system 700 can also be used in conjunction with any software method that allows the highlighting of selected portions of the material or annotations of the pages in the document involved to facilitate browsing/viewing/reading.

The above browsing system 700 is suitable for use not just for browsing through or viewing documents that do not require any processing of their contents while they are being viewed, but also in conjunction with a word-processing system. Instead of creating a document and processing it on a computer screen like what is normally done, and then scroll up and down to view and browse through it using the usual mouse cum scroll bar method, the method of viewing and browsing through the document as described in the above browsing system 700 can be used. The process of entering/deleting material in the document can also be made to be consonant with the method of movement through the document (i.e., one of the methods 500, 510, 520, 530 and 540 described in FIGS. 5A-5E). If the word processing is used in conjunction with, say, the flipping method 500 of moving through the document, as one finishes entering material for the right-hand page, the page will flip over to reveal a new, empty page for the entering of material. As one deletes material until nothing is left on the currently viewed pages, continued deletion will effect a flipping back to the previous page. Similar mechanisms can be used in conjunction with the other three non-scrolling methods of moving through the document—namely the sliding method 510, the flashing method 520, and the vertical flipping method 540.

The above browsing system 700 is adapted for use in conjunction with any software in which there is information/icons of control "buttons" to be displayed, either for viewing or manipulating, that cannot be fitted within one computer screen. In this case, scrolling in conjunction with the use of a mouse is often done, or sub-menus and sub-operations can be selected by pressing icons of "buttons" on the screen. In the case of selection of sub-menus and sub-operations, the sub-menus or displays containing buttons for sub-operations are flashed on the screen once they are selected. When there is a large amount of this kind of information/operations present in the software, it will benefit from the use of the browsing system—the system can provide a good idea of what kinds of information/operations are available, where they can be found and how they are related to each other, as well as fast access to them. To be used in conjunction with the current browsing system 700, these menus/sub-menus and buttons for operations/sub-operations can all be organized into a "book" and access to them can be effected by the browsing system 700 described above. In 1997, the most popular and convenient form of human-computer interface is the "Windows" interface that grew out of the "desktop metaphor" in which manipulating items on a computer screen is likened to manipulating items on a desktop. This kind of interface, though representing a vast improvement over previous kinds of interface and user-friendly, still suffers from one of the problems of manipulating items on a desktop—a person's desktop tends to get very messy and things are hard to find when there are too many of them present. In the Windows interface, when there are a lot of sub-directories/files within a directory that cannot be fitted within one window or one screen, they are to be located by scrolling through the use of a mouse, with all the attendant problems as described above for the browsing of information using this method. Looking for items (say, a program or data file) whose names or associations with particular directories/sub-directories are not known in advance by going up, down, and across many levels of the directory structure is also a tedious and confusing process because it suffers from a lack of a holistic view of the entire directory structure. In the Windows interface, a typical computer program communicates with the user through "working windows" —the computer program accepts input from and directs its output to a prescribed, often rectangular, area on the computer screen. In the process of completing a typical task, often many programs have to be activated which gives rise to many windows being opened on the computer screen. When many windows are opened, they tend to obscure each other and those that are currently not in view are hard to find because their locations (in the "third dimension" —the "direction perpendicular to the screen") are not fixed, much like a scattered collection of papers on a desktop. Users often have to keep closing and opening the same windows repeatedly or moving them aside by directing the mouse cursor to various locations on the computer screen in the process of completing a particular task on the computer.

Figure 17A:
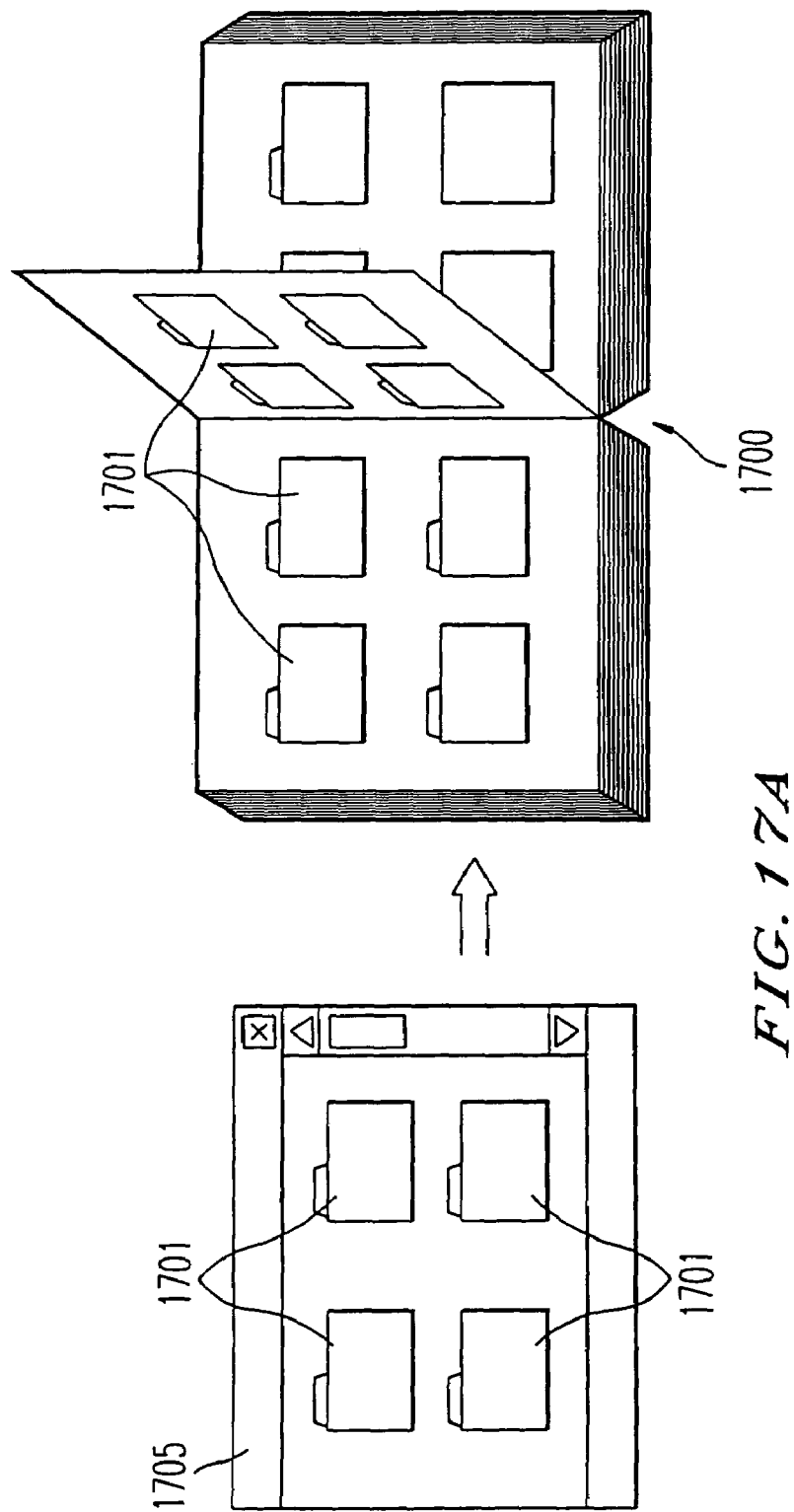
FIG. 17A is a comparative schematic diagram of directories/sub-directories in a "window" compared with pages of a computer book that uses the flipping method of FIG. 5A in order to move through the book.
Figure 17B:
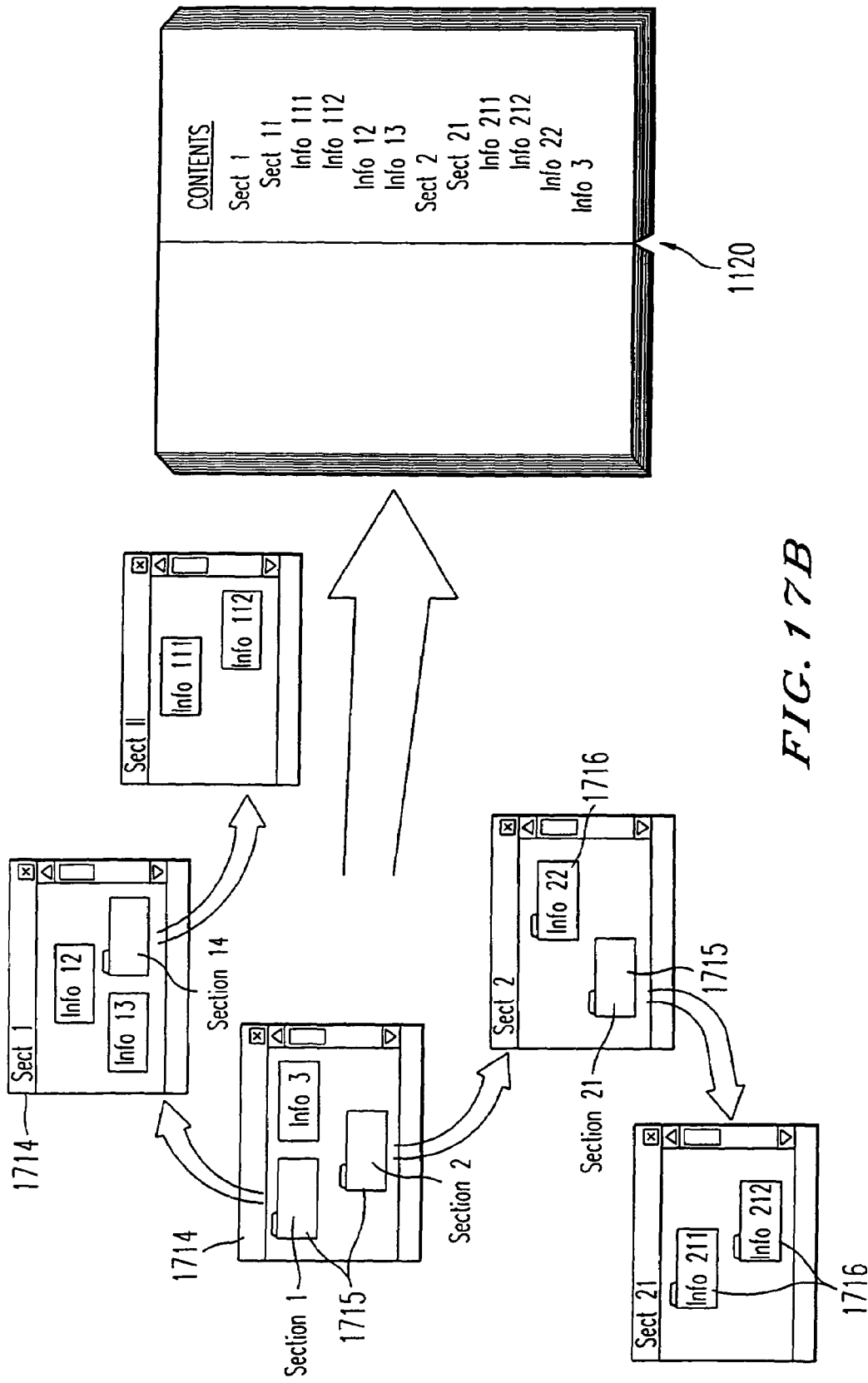
FIG. 17B is a comparative schematic diagram of directories/sub-directories and the files in a WINDOWS system compared with chapters and sections in a computer book that uses the flipping method of FIG. 5A to move through the book.
Figure 17C:
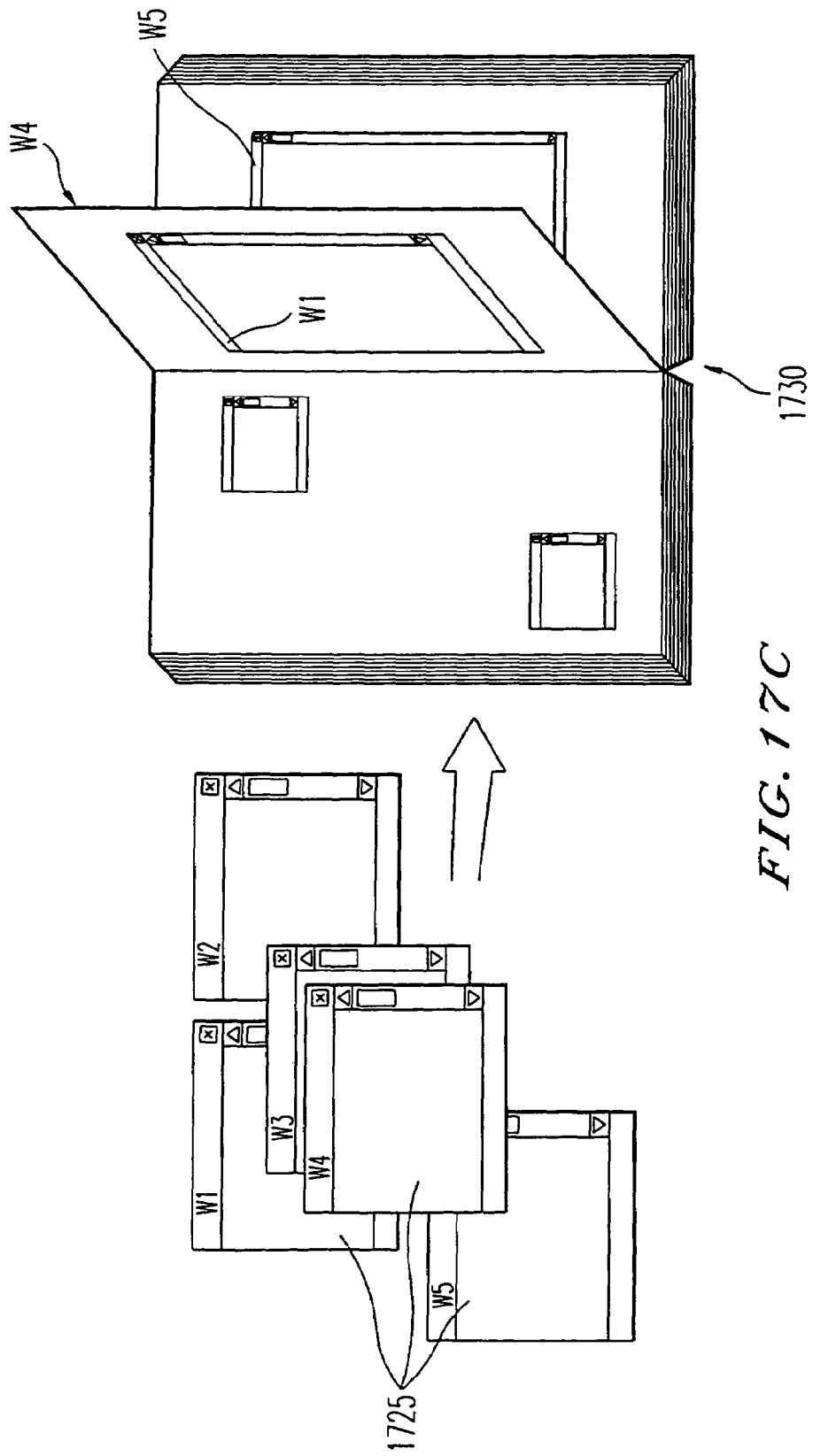
FIG. 17C is a comparative schematic diagram of working windows in a WINDOWS system compared with pages of a computer book that uses the flipping method of FIG. 5A to move through the book.

The present invention improves the human-computer interface by organizing these directories/sub-directories or temporary working windows into "books" to be manipulated by the browsing system 700 described above. All information contained in memory on the computer can be organized into one big book or more than one book at any given moment, hence the descriptive phrase "library metaphor". There are at least three possible improvements over the conventional "windows" interface. First, sub-directory and file icons that cannot be fitted onto one window/screen can be browsed through and better accessed if they are organized/implemented in a form to be used in conjunction with the browsing device/system 700 described above. FIG. 17A depicts one embodiment of this in conjunction with the flipping method 500 of moving through the document: items 1701—directories/sub-directories or files—in a window 1705 are placed in the pages of the book 1700 which is an instance of the computer book 500 depicted in FIG. 5A. Second, sub-directories 1715 (FIG. 17B) and files 1716 that are normally found in windows 1714 in the current window-based systems can be organized into chapters, sections, etc. in a computer book 1720 (an instance of the computer book 500 depicted in FIG. 5A) instead and used in conjunction with the browsing system 700, an embodiment of which is depicted in FIG. 17B. Third, items that are being worked on, either collections of files and sub-directories or the current working areas in a software (such as a word-processor) which current systems present in "windows", can be organized into pages in a "scrap book" to be used in conjunction with the browsing system 700 with its attendant advantages. FIG. 17C depicts one embodiment of this in conjunction with the flipping method 500 of moving through the document. Either each window 1725 maps onto one page or many windows 1725 can map onto one page in a computer book 1730 (an instance of the computer book 500 depicted in FIG. 5A).

In one embodiment, all opened windows, whether they are for the showing of directory contents or working windows of programs, can be joined together into a book as shown in FIGS. 18A-18M. Generally, as one opens windows in the process of operating the computer, these automatically become pages in a book, or more than one book, where the pages are "window-pages" and the books are "working books". If the preferred flipping method is used to organize the pages in this book, it further enhances the ability to search for items (whether it be a file in a directory or a certain item in a program's working window)—unlike the case of the current WINDOWS system, because each page now acquires an absolute location, they are easy to locate. In addition, if the browsing device is used in conjunction with this kind of computer interface, it confers two major advantages. First, the search for and access to items can benefit in the same way as in the browsing of a document. Second, one mode of the operation of the flip-browsing controller, in which the controller is placed on the table and operated by one hand as described earlier (for example, in conjunction with FIG. 2H), can be taken advantage of to lighten the load of the hand that operates the mouse and provide a complementary function to that of the mouse.

Often, one uses the mouse for all the operations including the opening and closing of windows and the search for icons to locate closed or occluded windows, etc. that do not involve the keyboard. Now, one can use one hand to operate the mouse and the other to operate the browsing device. The mouse is reserved for the higher precision, analytic kind of operations such as the positioning of the cursor over a small item on the computer screen while the browsing device is used for a lower precision, holistic kind of operation such as the flipping of the window-pages to access different windows. Together, these increase the bandwidth of the user's interaction with the computer and can also spread the load of hand/finger operations onto both hands, thus lowering the possibility of repetitive strain injury.

Figure 18A:
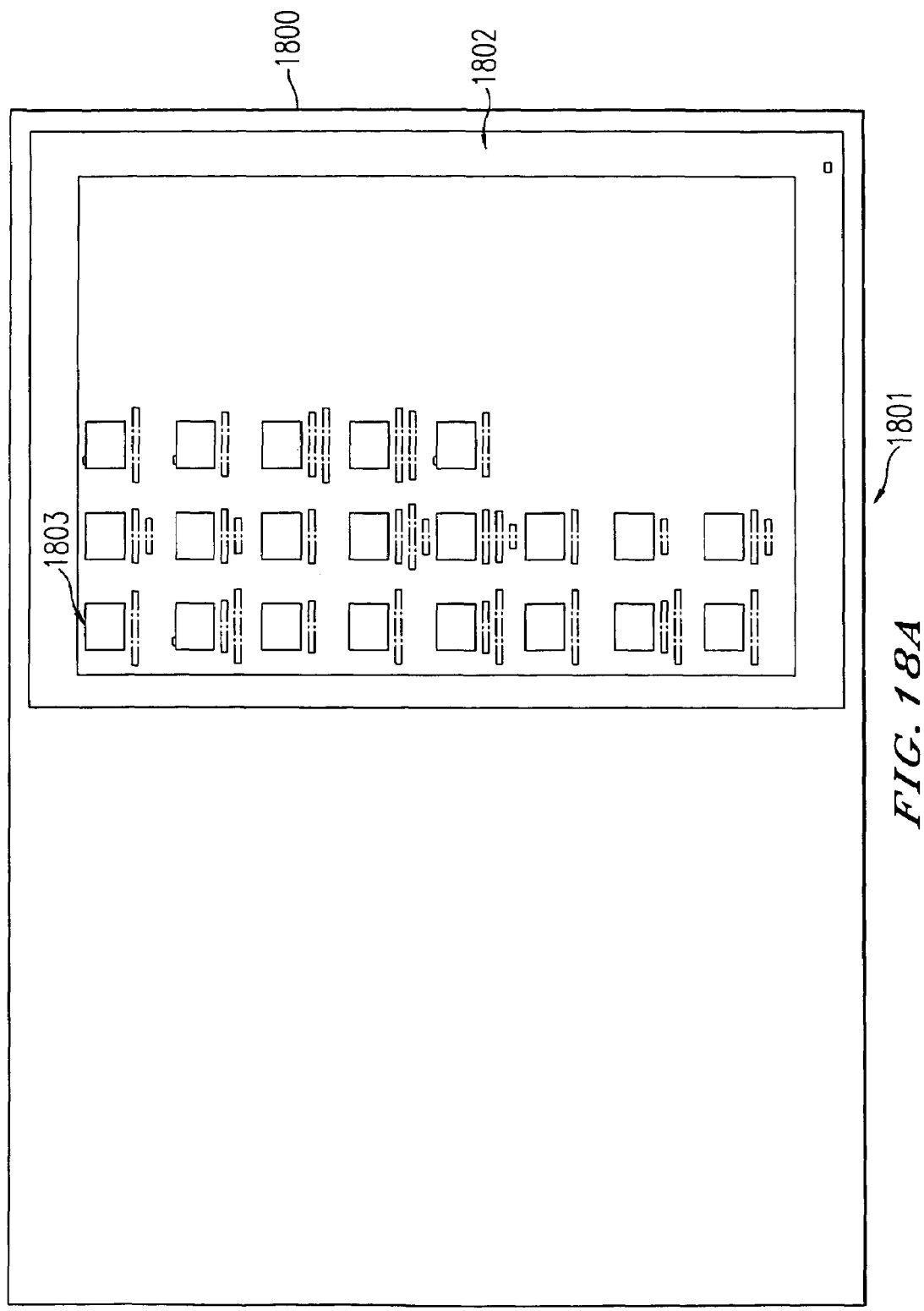
Figure 18B:
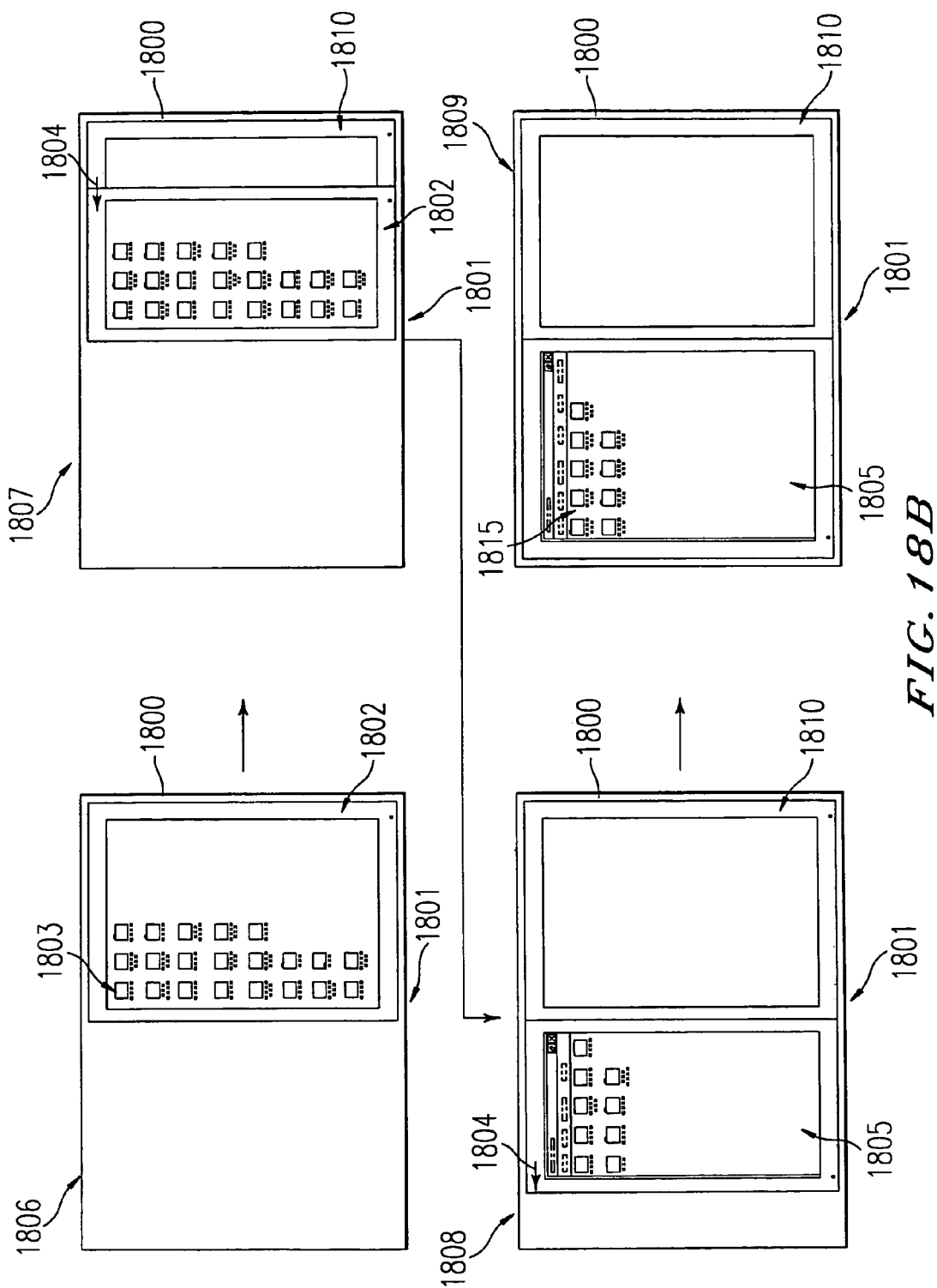
Figure 18C:
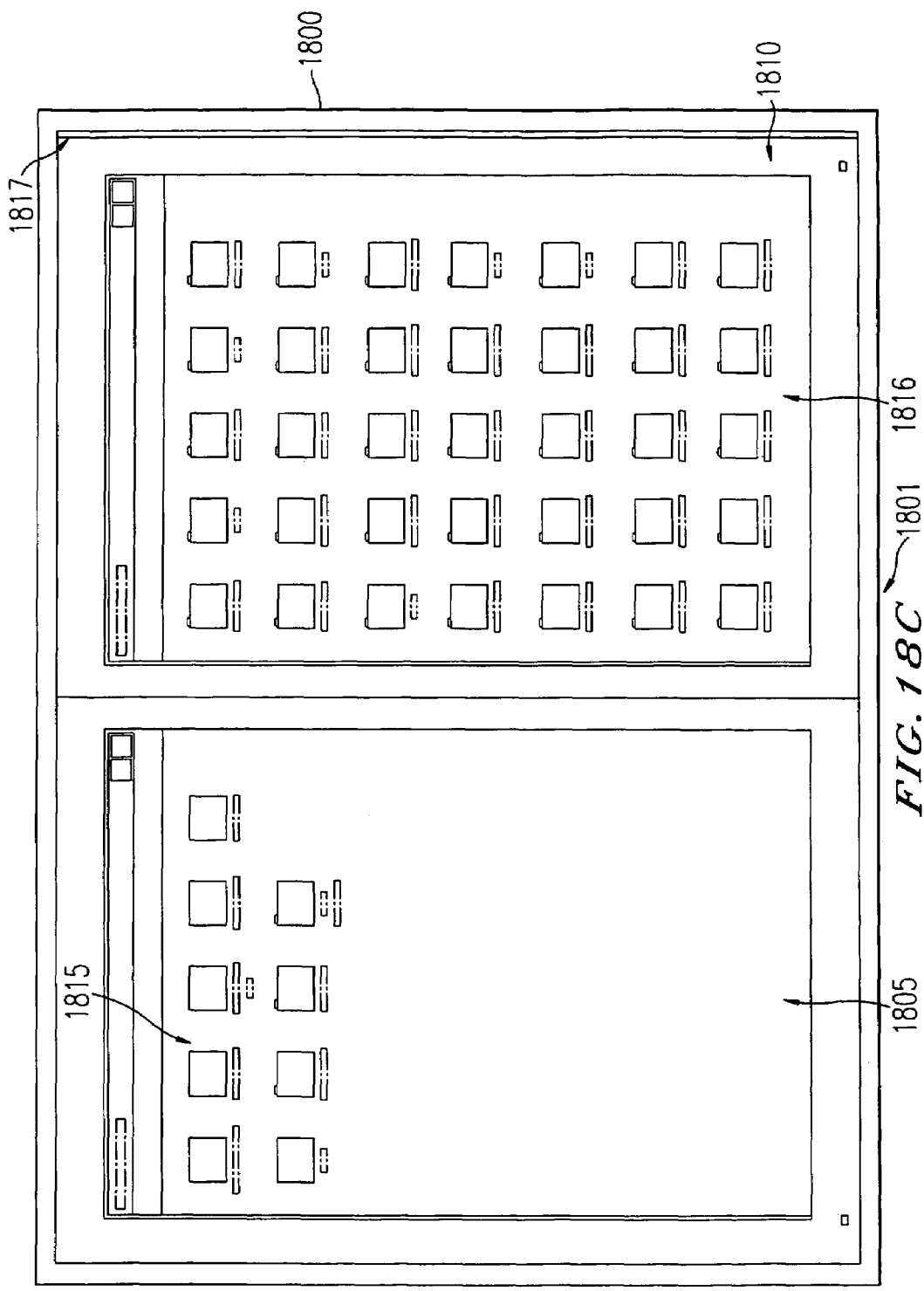
Figure 18D:
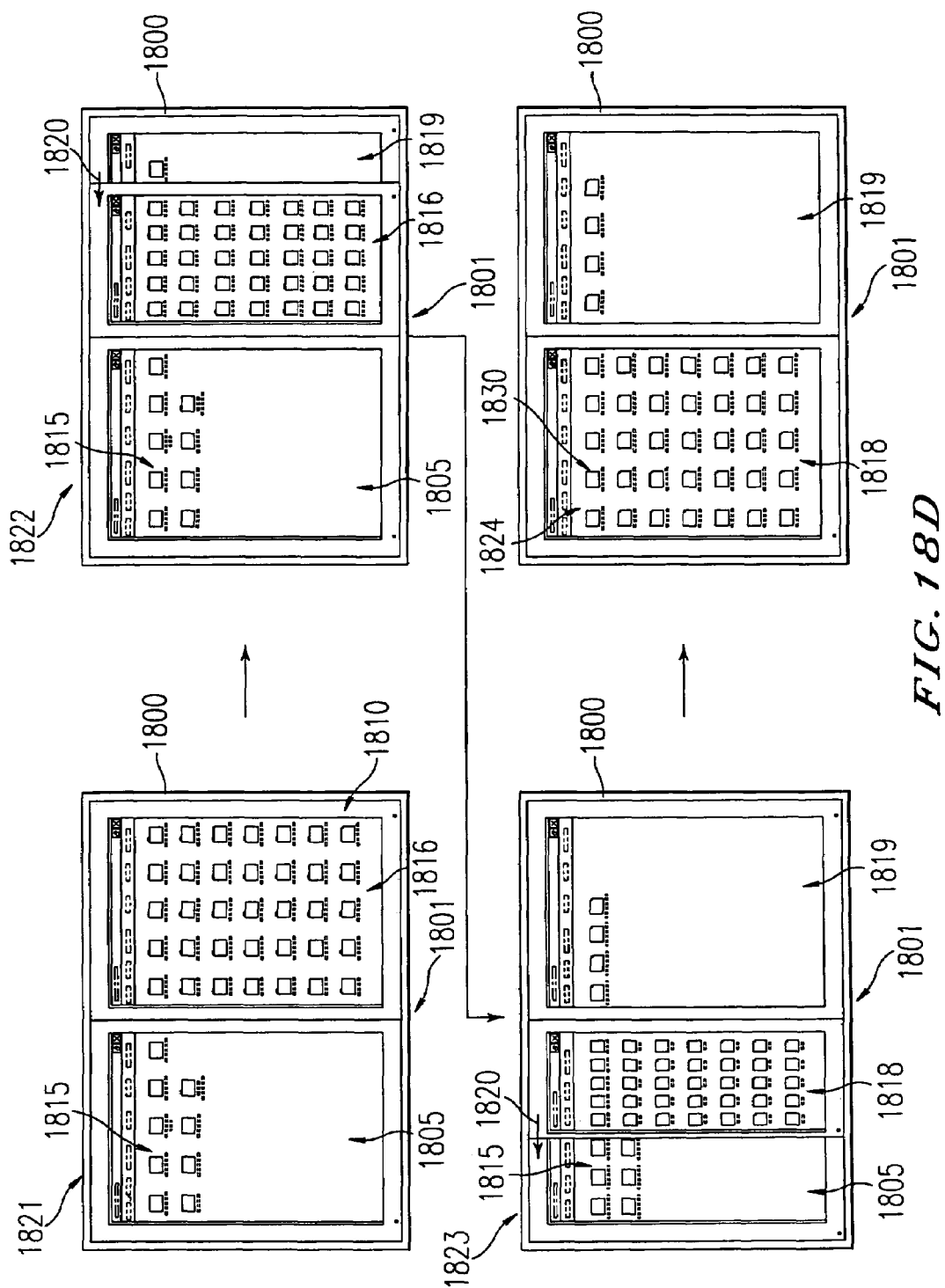

We now describe one embodiment of this "books" interface in which the series of windows opened during the process of operating the computer become the "window-pages" in a "working book". FIGS. 18A-18M show an example of the sequence of operations as one opens windows on the computer. Initially, suppose the user is at the usual WINDOWS 95® desktop as shown in FIG. 18A, which is now shown on the computer screen 1800 as the first page 1802 of a working book 1801 yet to be made from subsequent window-pages. This first page 1802 could be thought of as residing on a sheet of "paper" that has two sides and currently the other side of this first page 1802 is empty. Now, suppose the user, uses, say, a typical computer mouse and, pointing the mouse cursor at the appropriate position, "double-clicks" on the "My Computer" directory icon 1803 to open it. The contents of "My Computer" 1803 are now added to the working book 1801 in one or more subsequent pages. Right after that the desktop window-page 1802 will be shown to flip to, say, the left side to reveal the contents of "My Computer" 1805 at the back of this window-page 1802, as shown in the sequence of images 1806, 1807, 1808, 1809 in FIG. 18B. The entire contents of the directory "My Computer" 1803 can be fitted into one page 1805. The arrow 1804 indicates the direction of movement of the flipping page 1802. During this flipping action, a blank page 1810 is also created on the right side of the working book 1801. Next, suppose the user now opens the directory "System C" 1815 whose icon resides on the current left page 1805 and whose contents cannot be fitted into one page. The contents of "System C" 1815 would fill a number of pages, starting from the initially empty right page 1810 currently on the display as shown in FIG. 18C. In particular, in addition to the first page of contents 1816, two more pages, now manifested as a thickness 1817 on the right side of the working book 1801, are created to contain the entire contents of System C and they are all "joined" to the back of the page currently on the right 1810. The user can reveal the contents of "System C" by activating a flipping process as shown in FIG. 18D. The sequence of images 1821, 1822, 1823, 1824 shows the flipping process. The arrow 1820 indicates the direction of movement of the flipping page 1816. Two more pages of contents 1818 and 1819 of the directory "System C" 1815 are revealed. The last page 1819 of the directory "System C" 1815 is currently the last page of the working book 1801.

Suppose now the user chooses to open a directory named "Windows" 1830 under the directory "System C" 1815 whose icon 1830 resides on the second page 1818 of the directory "System C" 1815 as shown in FIGS. 18D and 18E. The pages containing the contents of the directory "Windows" 1830 are now added to the back of the right page 1819 currently on the display. These pages are manifested as a thickness 1831 on the right side of the working book 1801. Even though the pages containing the directory just opened—"Windows" 1830 —have been added to the working book 1801, the first page of this directory 1830 is not visible right away because it is "hidden behind" the current page 1819 on the right. Hence, right after the pages of the directory "Windows" 1830 are added and the thickness 1831 associated with them is displayed, the current right page 1819 begins to flip to the left to reveal the first page 1840 and the second page 1841 of the directory "Windows" 1830 as shown in the sequence of images 1835, 1836, 1837, 1838 in FIG. 18F. "Windows" 1830 is a larger directory than "System C" 1815 and its contents are contained in 13 pages of the current working book 1801.

Figure 18G:
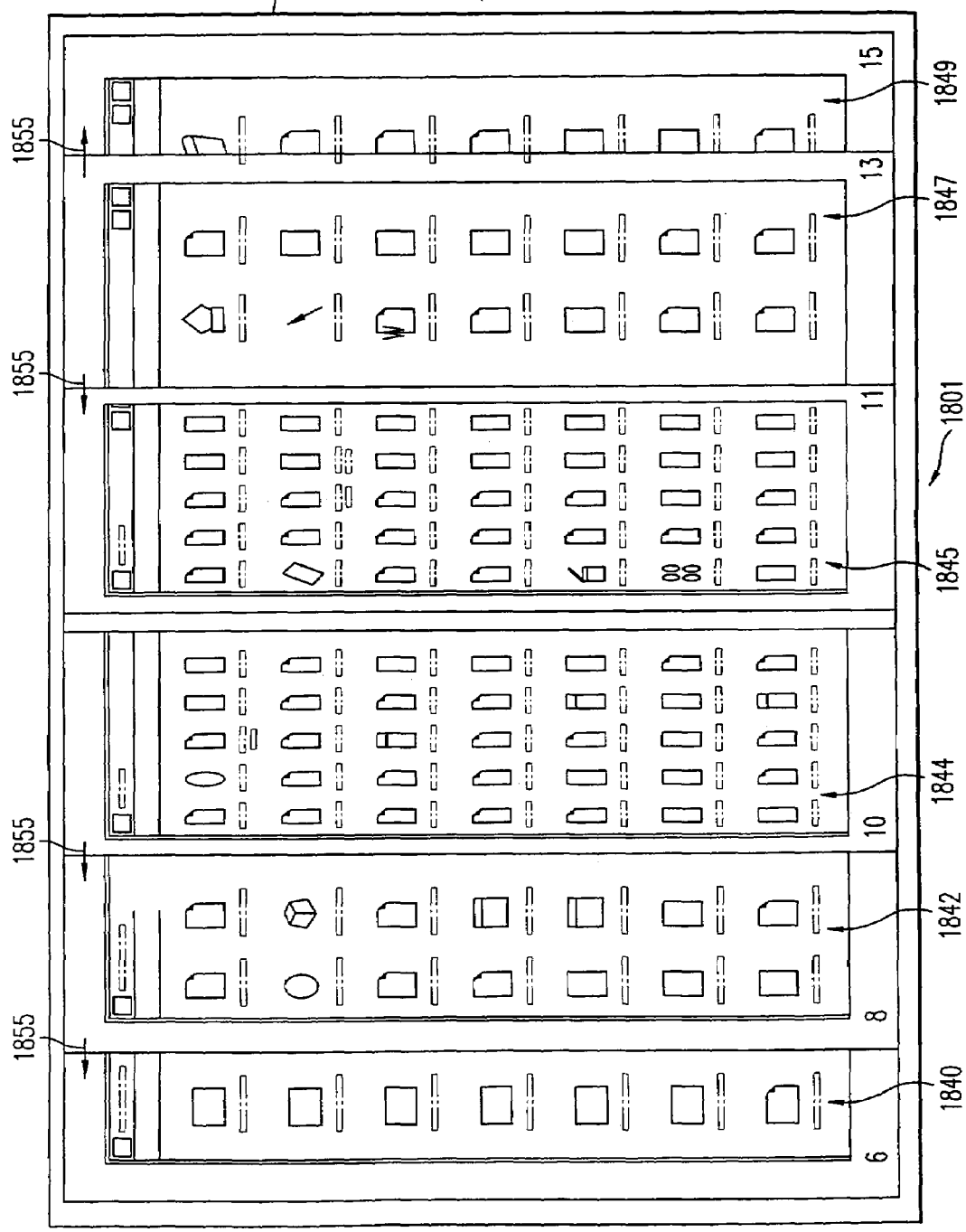
Figure 18H:
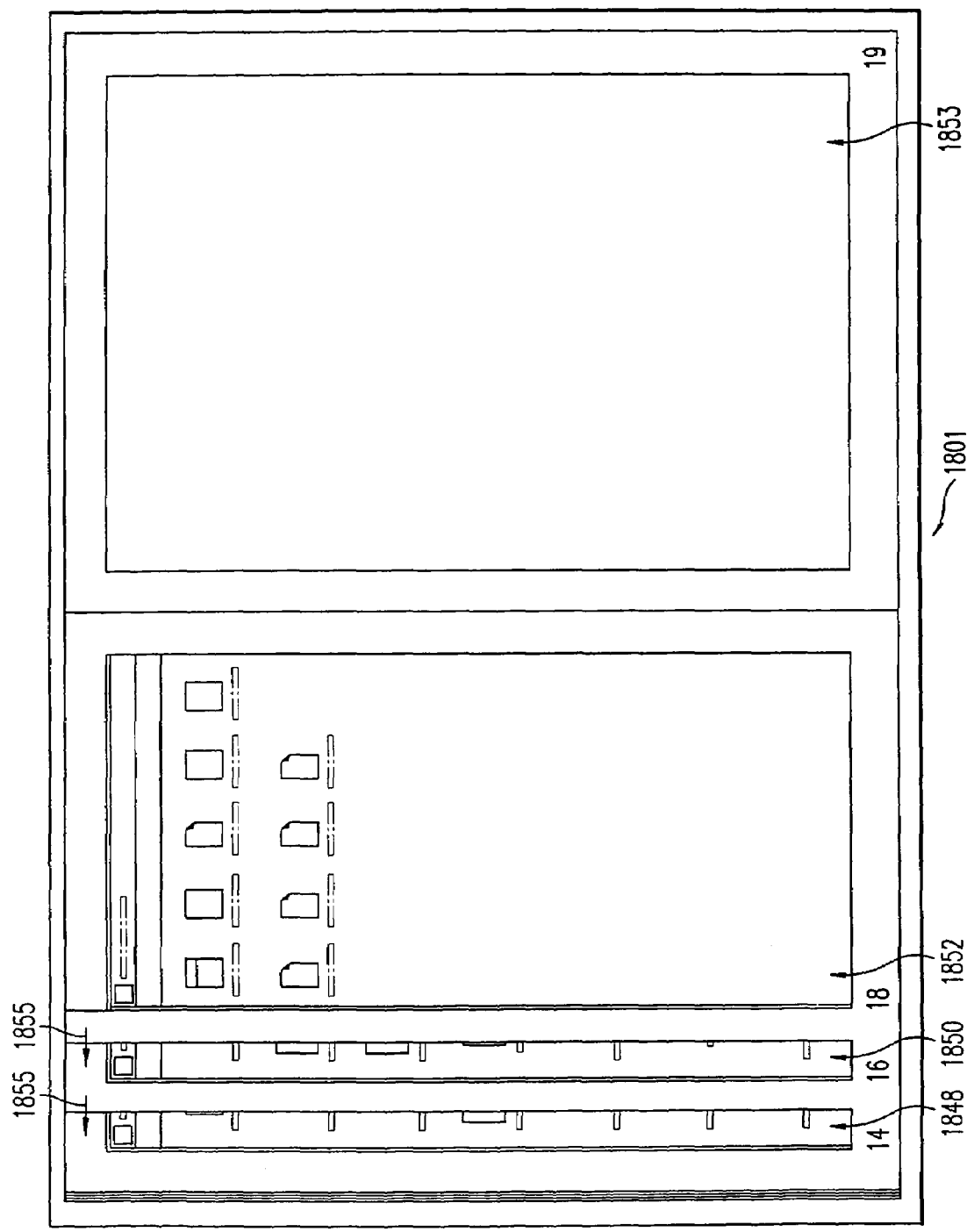

FIG. 18G illustrates the effect of browsing about the pages 1840, 1842, 1844, 1845, 1847, and 1849 containing the contents of the directory "Windows" 1830 by flipping through them with, say, the aid of the browsing device 200. These pages can be flipped forward or backward individually or together or in various forward and backward flipping combinations according to the user's wish using the system with mechanisms described in FIGS. 9A-9D, 10A-10I, and 12A-12H. In FIG. 18G, four pages 1842, 1844, 1845 and 1847 are being flipped at the same time, and the arrows 1855 show that three of the pages 1842, 1844 and 1845 are being flipped to the left while one of the pages 1847 is being flipped to the right. (Earlier all four pages 1842, 1844, 1845 and 1847 could have been launched from right to left, and then the user decides, while they were still moving from right to left, to reverse the direction of the right-most moving page 1847, perhaps because he suspects that there are things on Page 12 (the back of Page 11—1845) or Page 13—1847—that could be of interest. This results in this snap-shot flipping action in FIG. 18G.) FIG. 18H shows the last few pages 1848, 1850 and 1852 of the directory "Windows" 1830. The page 1853 after the last page 1852 of the directory "Windows" 1830 is currently empty.

Suppose now the user chooses to go to one of the pages 1847 of the directory "Windows" 1830 that contains a file named "fcc962088G" 1865 which is a data file for a document as shown in the top left picture 1871 of FIG. 18I. Suppose the user now chooses to open "fcc962088G" 1865. On the activation of that operation, the system adds the pages of "fcc962088G" 1865 to the end of the working book 1801 and jumps to the first page 1853 that contains the contents of the file "fcc962088G" 1865, as shown in the sequence of images 1871, 1872, 1873, 1874. There is an increase in the thickness 1866 on the right side of the working book 1801 as soon as the contents of the file "fcc962088G" 1865 are added to the end of the working book 1801. Many intervening pages between the page on the right side 1847 just before the jump and the last page 1852 of the directory "Windows" 1830 are skipped over in this jumping process and the display shows a thickened page 1847 flipping from right to left of the working book 1801. The arrow 1867 shows the direction of movement of the thickened page 1847. Because the last page 1852 of the directory "Windows" 1830 resides on the left side of the working book 1801, the first page 1853 of the just opened file "fcc962088G" 1865 is added to the initially empty page 1853 on the right side. This example of the opening of a document file is an example of the activation of a program as opposed to earlier examples that were examples of the opening of directories.

The user can now flip to the other pages of the document "fcc962088G" 1865 to read or carry out other operations as shown in the sequence of images 1877, 1878, and 1879 in FIG. 18J. The forward flipping (from right to left, as indicated by the arrow 1876) of the page 1853 reveals two other pages 1854 and 1855 of the document "fcc962088G" 1865.

Figure 18K:
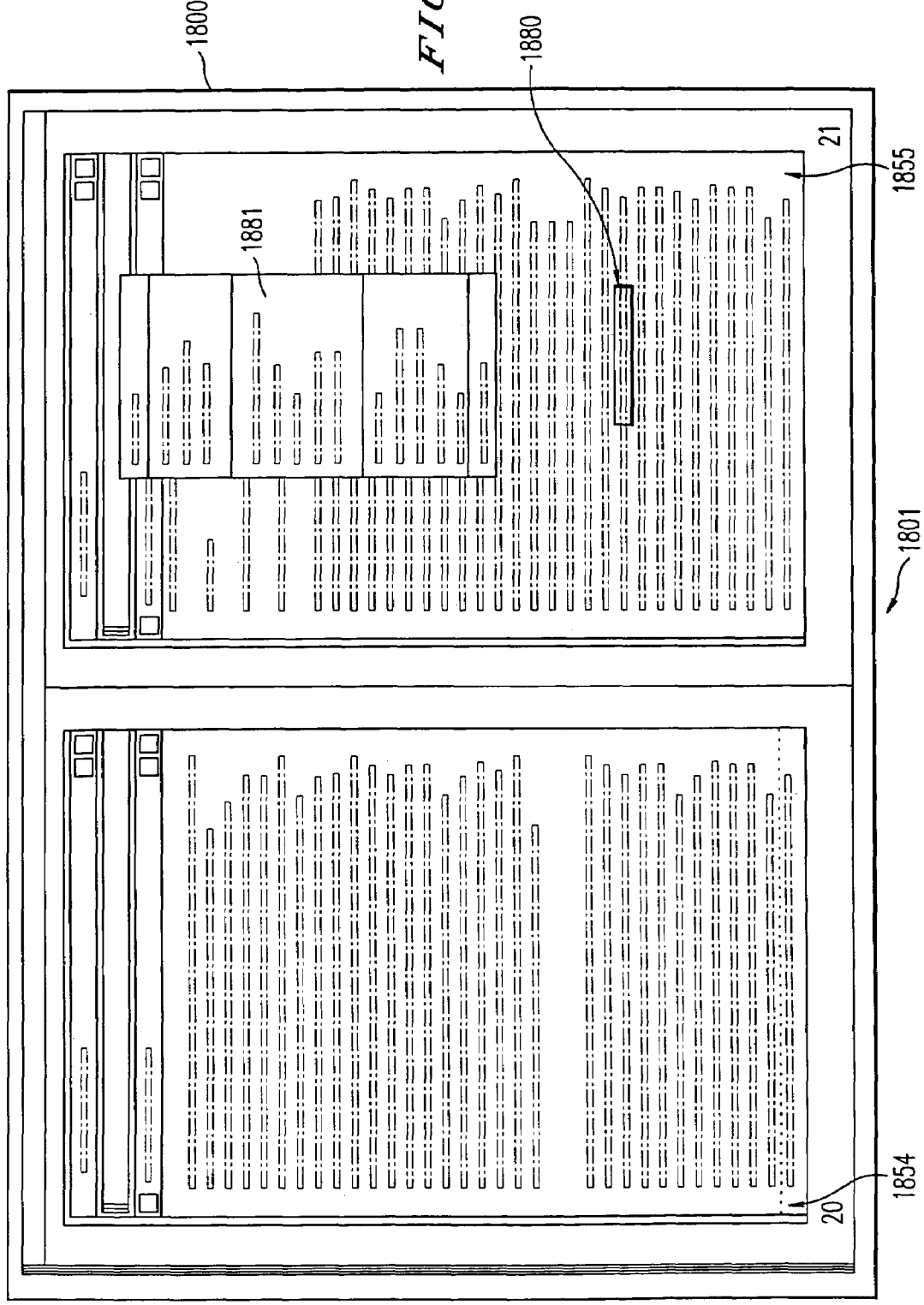

In FIG. 18K, the user carries out a typical operation performed on an electronic document—the change of the font of some of the words 1880 on one of the pages 1855 of the document "fcc962088G" 1865. A typical pulled down menu 1881 is used to carry out this operation.

Figure 18L:
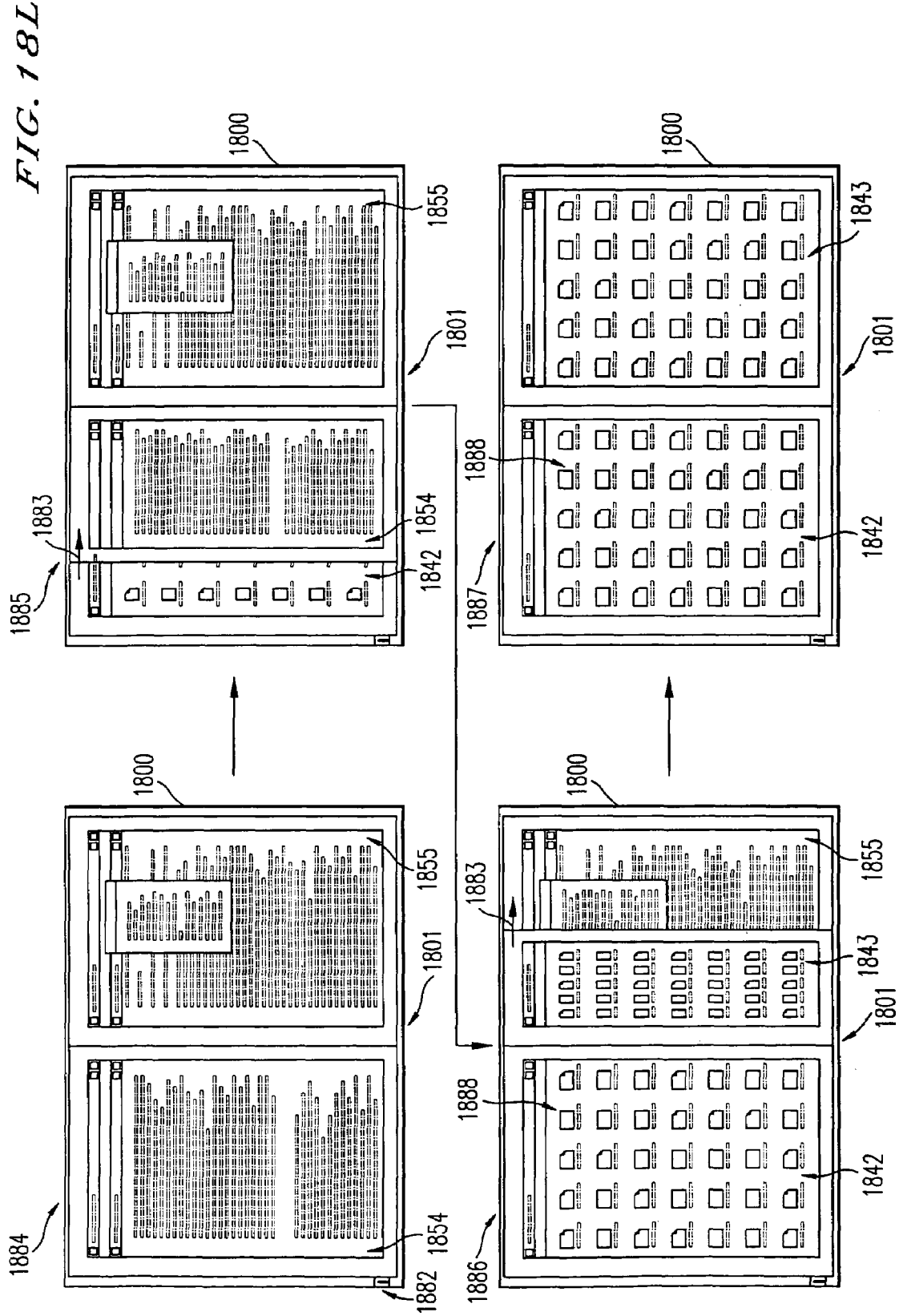

Suppose now the user decides to return to one of the pages 1842 of the directory "Windows" 1830 to activate another program. FIG. 18L shows that the activates the jump cursor 1882 (in the top left picture 1884) and activates a backward (from left to right) jumping process to return to one of the pages 1842 of the directory "Windows" 1830 to locate the icon of a program "Calc.exe" 1888. The sequence of images 1884, 1885, 1886 and 1887 shows the jumping process. The arrow 1883 indicates the direction of movement of the skipped over pages 1844-1853 (hidden). (If the desired icon cannot be located at the end of this jumping process, the user might then flip the pages back and forth to locate it.)

Figure 18M:
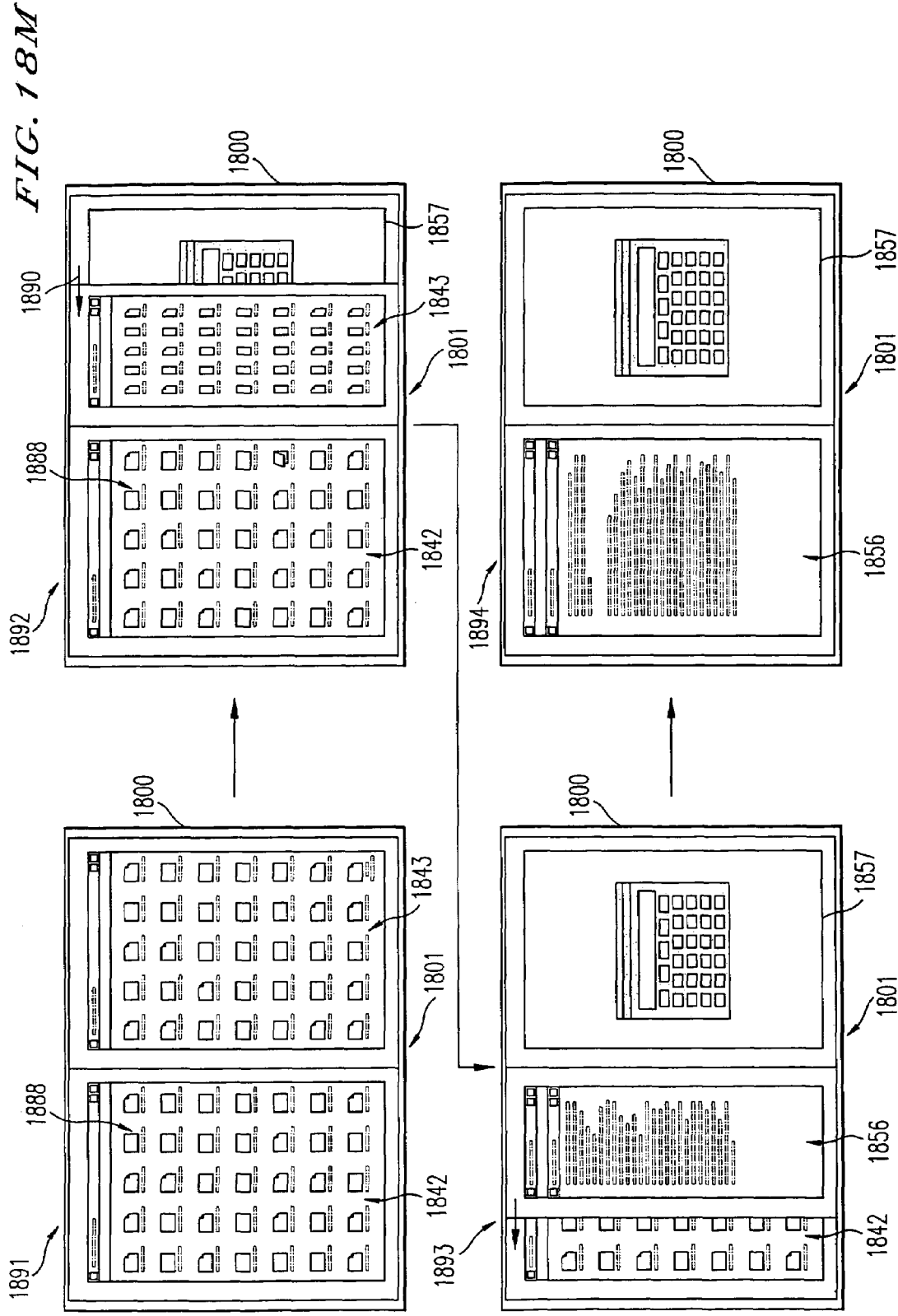

FIG. 18M shows the actions that result when the user activates the program "Calc.exe" 1888. The window-page for this program 1888 is added after the current last page 1856 of the working book and a jump is automatically made to reveal the window-page 1857, as shown in the sequence of images 1891, 1892, 1893 and 1894. The arrow 1890 indicates the direction of movement of the skipped over pages 1844-1855 (hidden).

At this point, a sizeable working book 1801 (FIG. 18M) has been created. At any moment, when the user needs to search for some items, whether it be a file or a control button on a program's window, the user can benefit from the organization of these items in the working book thus created and the method of locating them through flipping and the use of the browsing device 200. What is effectively created is a kind of "simultaneous multiple-screen" display: because of the book-like organization including the flipping method of moving through the book, the user knows roughly where these "screens" of information are located and, in conjunction with the browsing device, has rapid access to them. It is like having a much larger computer display screen to display various information simultaneously because these "screens" are accessible almost simultaneously. This effectively increases by a large amount the size of the computer screen whose limited size is a vexing problem for many computer users. The conventional window-oriented system, despite the fact that it also allows users to create multiple windows of information, does not provide the structure, organization and user-input method required to achieve this "simultaneous multiple-screen effect."

The method described using the example of FIG. 18 is only one mode of operation of the Books interface. In another mode, instead of displaying two pages side-by-side on the screen and using both sides of each "sheet of paper" to display information like in the case of a typical book, an alternative is to display information on only one side of each "sheet of paper" and have the entire flippable page occupy the computer screen, as shown in FIGS. 19A-C.

Figure 19A:
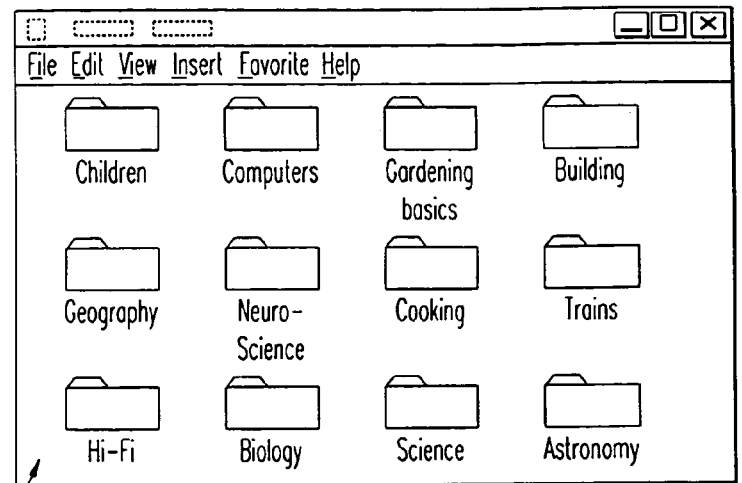
FIGS. 19A-19C illustrate the one-sided flipping display for the Books interface.
Figure 19B:
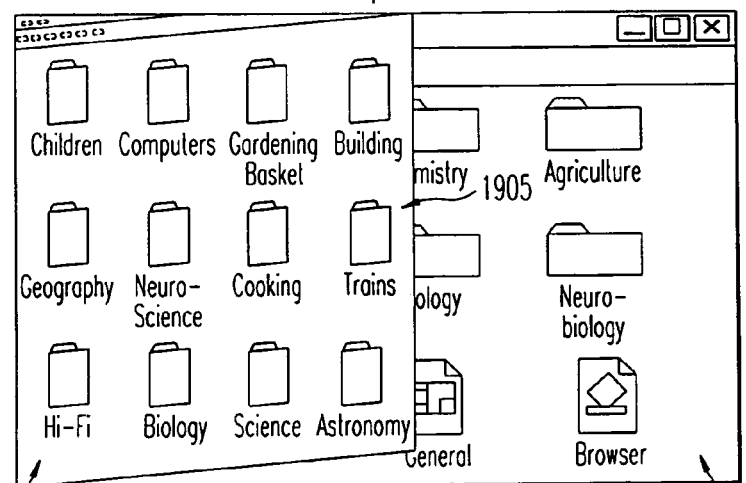
Figure 19C:
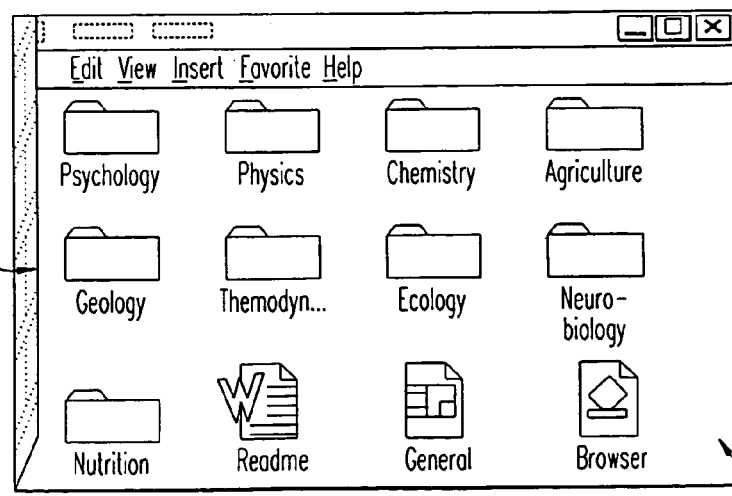

In FIGS. 19A-C, a page 1901 is shown to flip to the left (direction of movement indicated by the arrow 1905) to reveal another page 1902. All the flipped pages collect in a thickness 1903 on the left side. We term this a one-sided book. This is a useful method especially for the working window-pages of a program since it would be advantageous to make full use of the screen for the purpose of interfacing with a program.

Sometimes, when the user is not interested in having the contents of a directory, say, spread over many pages, perhaps because the user wants to have quick access to the pages that come after the directory, the user can choose to activate a "single-page" mode which will only generate one page to display the contents of the directory involved. Then, the traditional scrolling mechanism is used to access the parts of the contents not visible initially on that page.

There are also other modes available for the addition of pages into the current working book. Instead of adding the pages to the end of the current working book, as shown in the example in FIGS. 18A-18M, the user can choose to have the pages added:

1. To the beginning of the entire working book;
2. Right after or before the pages currently in view;
3. Right after or before the pages associated with the pages currently in view, such as after the last page or before the first page of the many-page directory to which the pages currently in view belong;
4. To an arbitrary location in the current working book or another working book displayed elsewhere on the computer screen indicated by, say, the mouse cursor or the jump cursor 380 of FIG. 10 on the thickness of the working book involved; or
5. As the first page of a new working book (when, say, the mouse cursor is pointing at a blank part of the computer screen just before the generation of the new page(s)).

The user may also choose the dimensions—the height and width—of the newly opened pages. These pages can be set to automatically have the dimensions of the current working book, or they can appear in the dimensions in which they most recently appeared. The dimensions of each page are also changeable. Hence the resulting working book would resemble more a clipped-together collection of arbitrarily sized paper than a typical book in which the dimensions of all its pages are the same. This is to facilitate especially the operations of working window-pages of programs which normally require a wide range of window-page sizes to contain the information required for the programs to interact with the user.

Figure 20:
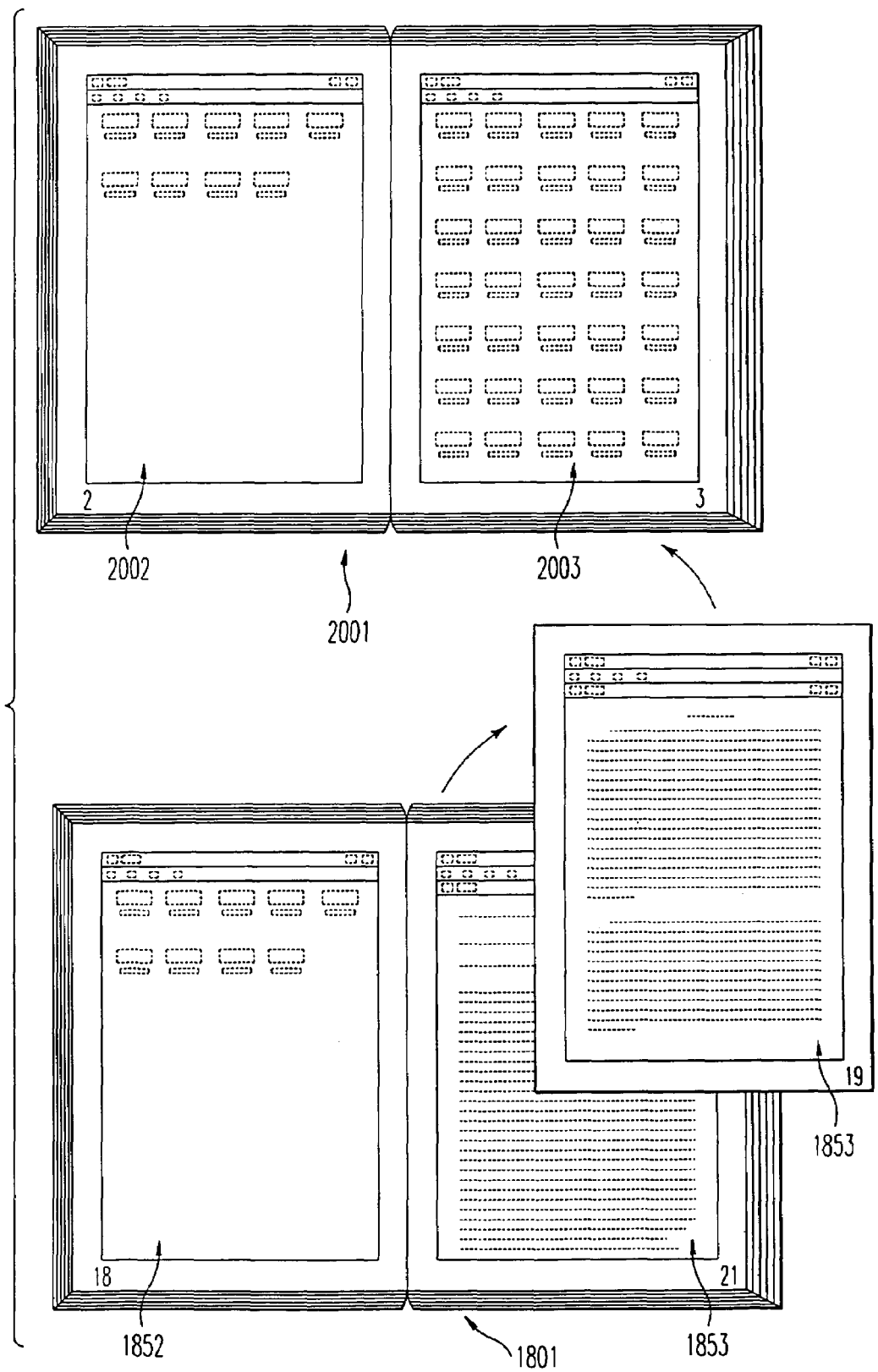
FIG. 20 illustrates a sequence of display screens representing a tear-off operation for window-pages of the Books interface.

Like in the conventional WINDOWS-based system, each window-page can be resized, maximized, minimized or closed. In addition to these operations, a "tear-off" operation is available for the user to, say, tear off a selected page and place it in a selected location in another working book that is also on display at the same time, as shown in FIG. 20. In FIG. 20, a page 1853 of a working book 1801 is shown being torn off to be added between the two opened pages 2002 and 2003 of another working book 2001. The typical computer mouse can be used to carry out this operation—that is, to "drag" the torn-off page 1853 from the source working book 1801 to the destination working book 2001. Instead of tearing off one page at a time, the user can also choose to tear off a selected number of contiguous or non-contiguous pages from the working book, or all the associated pages, say, from the same directory. A "join" operation is available to join selected "torn-off" pages at any selected location in any selected existing working book or these selected torn-off pages can be used to form the first pages of a new working book.

Figure 21:
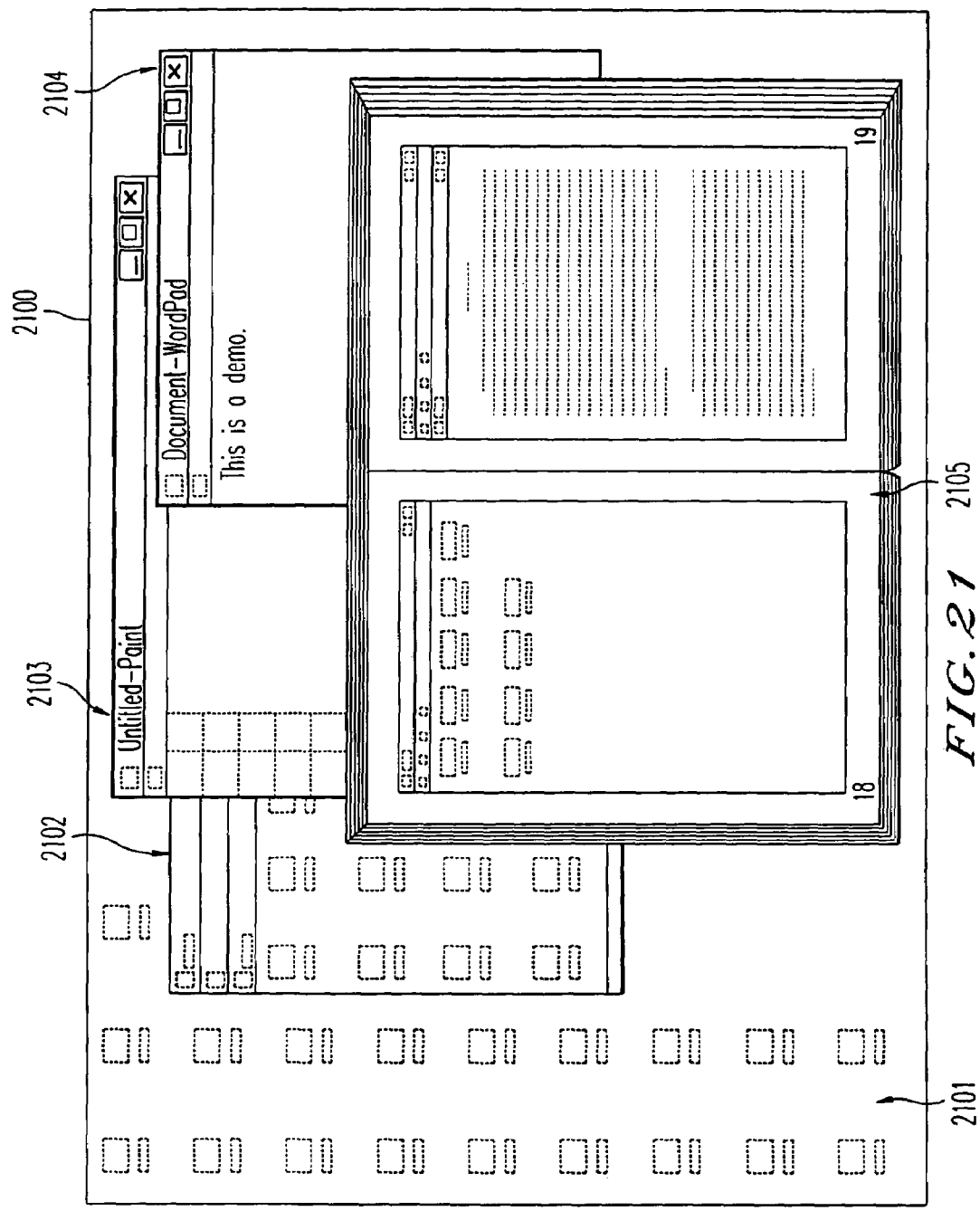
FIG. 21 illustrates the combined use of the Books and WINDOWS interface.

The Books interface can be used in conjunction with the WINDOWS interface to take advantage of both the library and desktop metaphor as depicted in FIG. 21. In FIG. 21, a usual Windows-oriented operating system, such as MICROSOFT WINDOWS 95®, is shown displayed in the background on the computer screen 2100 with the usual desktop icons 2101. One directory window 2102 and two application windows 2103 and 2104 are opened. Also created is a working book 2105. Hence only when the user so desires, the opened windows would become the window-pages of a working book, or else they would behave like the windows in a typical Windows system such as MICROSOFT WINDOWS 95®.

In addition, one can also create a "directory book", with flippable pages, that contains the entire directory contents on the computer to facilitate browsing and searching for items whose locations within the directory tree structure are unknown. The directory structure of the typical Windows system remains on the system to allow fast search when items' locations in the directory tree structure are known, thus complementing the browsing method.

The Books interface described above in FIGS. 18A-18M, 19, 20, and 21 can be implemented on a personal computer system using the C++ programming language (or other programming language) to implement various browsing and other necessary operations. Preferably, similar mechanisms used in the implementation of a flipping display as described in FIGS. 10A-10I, such as the use of the Direct X API (Application Programming Interface) and in particular the BLT (Block Transfer) function are used to generate flipping window-pages capable of responding in real-time to various browsing commands.

Figure 22A:
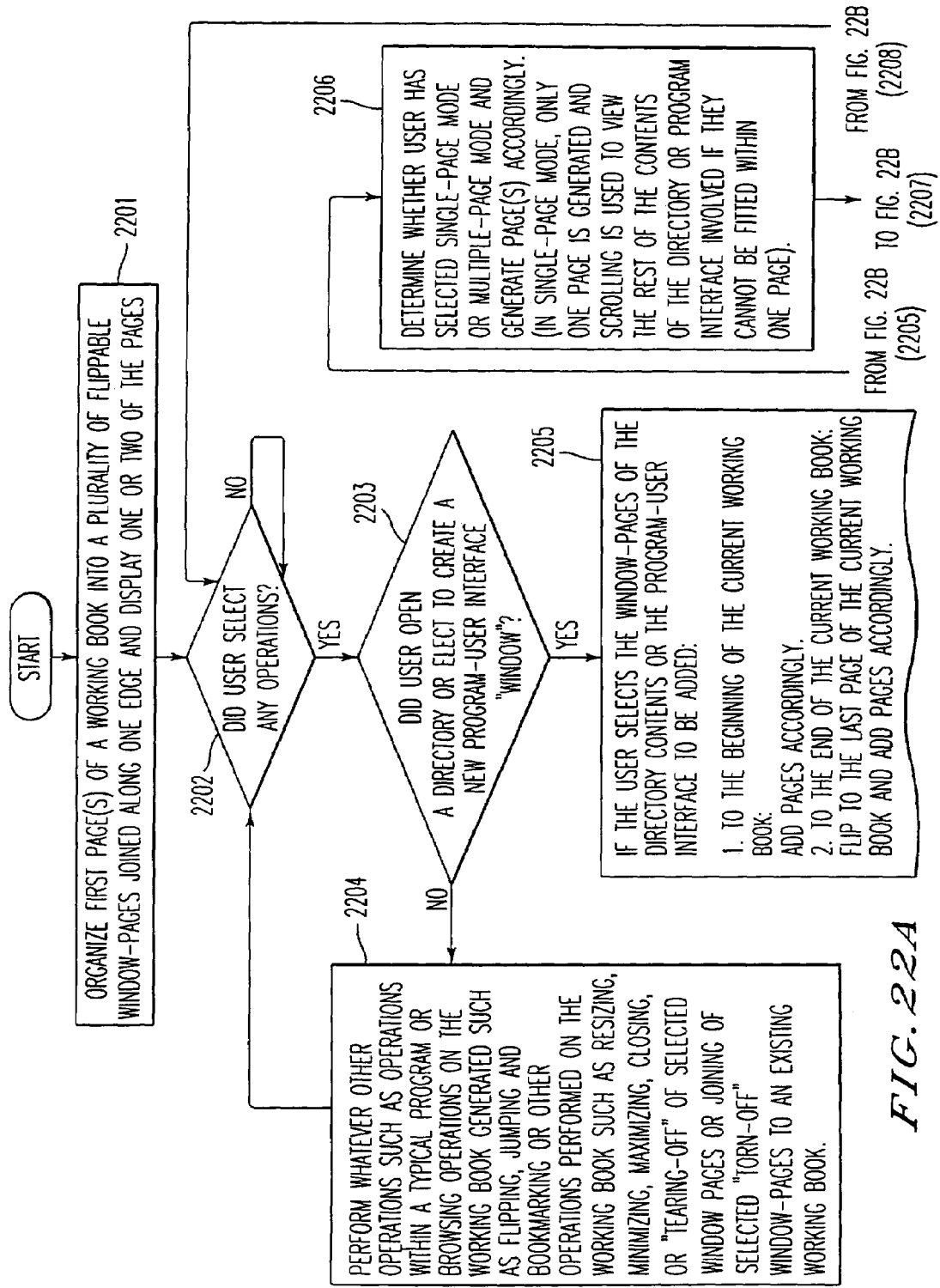

FIG. 22 shows the flowchart of one embodiment of the Books interface mechanisms. The process begins when the user elects to generate a working book and then in step 2201, the first pages of the working book are generated. These pages are organized into a plurality of flippable window-pages joined along one edge. One, or alternatively two, of these pages is displayed on the computer screen. The process then flows to step 2202 where a check is made to see whether the user has selected any operations. If not, the process returns to step 2202 and checks again. If so, the process flows to step 2203 where a check is made to see if the operation the user selected was the opening of a directory or the creation of a new program-user interface "window". If not, the process flows to step 2204. If so, the process flows to step 2205 where the new window-pages of the directory opened or the program-user interface are added to the current working book or another existing working book or are used to form a new working book depending on the user's specification as to where the new pages are to be added. If it is necessary, images of flipping intervening window-pages are generated to get to the location at which the new window-pages are to be added. These window-pages are added as a plurality of flippable pages joined along one edge and joined to any existing window-pages. The process then flows to step 2206 where one page or multiple pages are added depending on whether the user has selected the single-page or multi-page mode. The process then flows to step 2207 in which the dimensions of the page to be added are generated according to user's selection of whether they be the same as the current working book or the most recently used dimensions for those pages. The process then flows to step 2208 where one or two of the newly added window-pages are displayed on the computer screen in the working book to which they are added. The process then flows to step 2202. In step 2204, operations other than those related to the addition of window-pages to a working book are performed according to the operations selected by the user.

Figure 23:
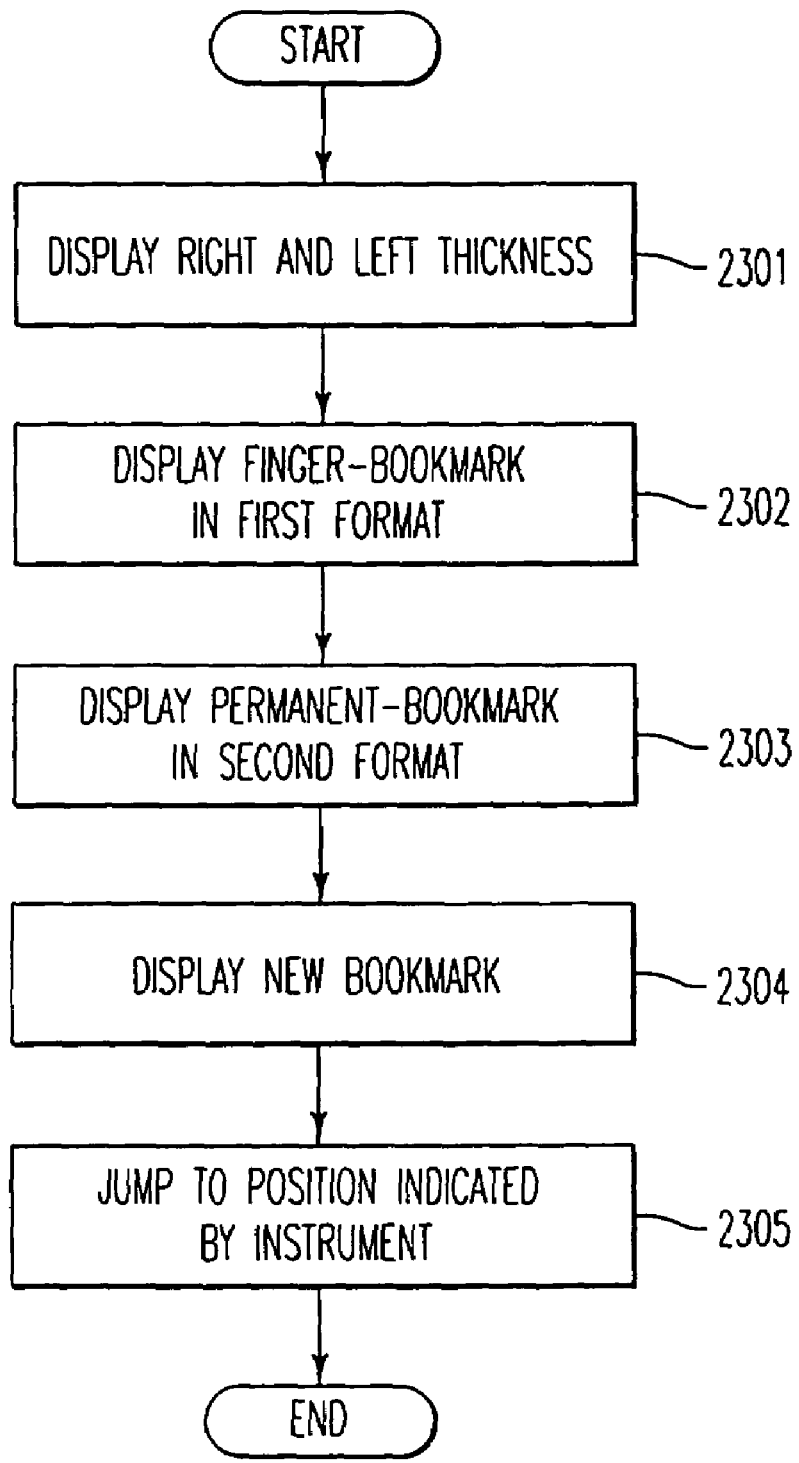
FIG. 23 is a flowchart of a method for displaying a set of information on a display screen as controlled by a browsing device.

FIG. 23 describes a method for displaying a computer-based set of information on a display screen controlled by the inventive browsing device. Step 2301 displays a thickness image of a set of information corresponding to the size of a data file which holds the set of information. The thickness image includes a left side portion and a right side portion which are displayed on the display screen. The left side portion of the thickness image is displayed on the left side of the screen and is proportional to an amount of the information that precedes a given point in the set of information that is currently being displayed on the display screen. The right-hand portion of the thickness image is displayed on the right-hand side of the display and is proportional to an amount of the information that comes after the point as currently displayed on the display screen. For example, if the currently displayed point is near the end of the document, the left-hand side of the display will have a thickness image that appears thicker than that on the right-hand side.

After step 2301, the process flows to step 2302 where all existing finger-bookmarks are displayed in a first image format. Then, in step 2303, all existing permanent-bookmarks, are displayed in a second format. Both the finger-bookmarks and the permanent-bookmarks are displayed in the location in the thickness display corresponding to the locations of the material they bookmark. Then the process flows to step 2304 where the user elects to bookmark the currently viewed material and a new bookmark (finger-bookmark or permanent bookmark) is added to the display. After 2304, the process flows to step 2305 where a position within the set of information is jumped to in response to a jump position indicated by the instrument (e.g., the user's finger). Once the position is jumped to, the process ends.

Figure 24:
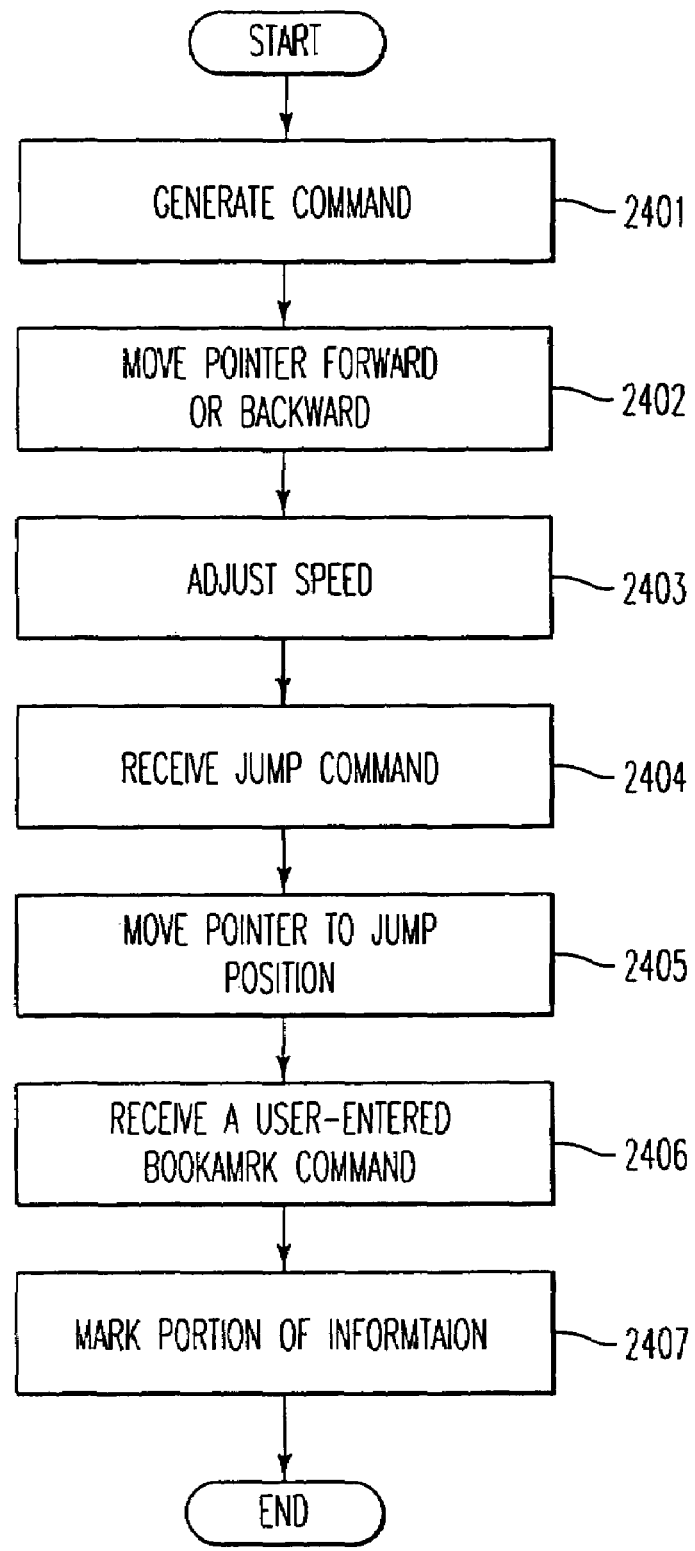
FIG. 24 is a flowchart of a method for browsing a set of information on a display screen.

FIG. 24 describes a method for browsing a computer-based set of information. The process starts in step 2401 where a move command is generated to move a pointer through a set of information hosted on the computer either in a forward direction or a backward direction. The process then flows to step 2402 where the pointer is moved in response to the command that was generated in step 2401. The process then flows to step 2403 where the speed of movement of the pointer through the information is adjusted. The process then flows to step 2404 where a jump command is received. The process then flows to step 2405 where a pointer is moved to a jump position in response to the received jump command. The process then moves to step 2406 where a bookmark command is received to mark a desired portion of text or graphics information from the set of information. A user enters the bookmark command based on the desired portion of textual graphics. The process then moves to step 2407 where the desired portion is marked in the set of information corresponding to the received bookmark command, after which the process ends.

Figure 25:
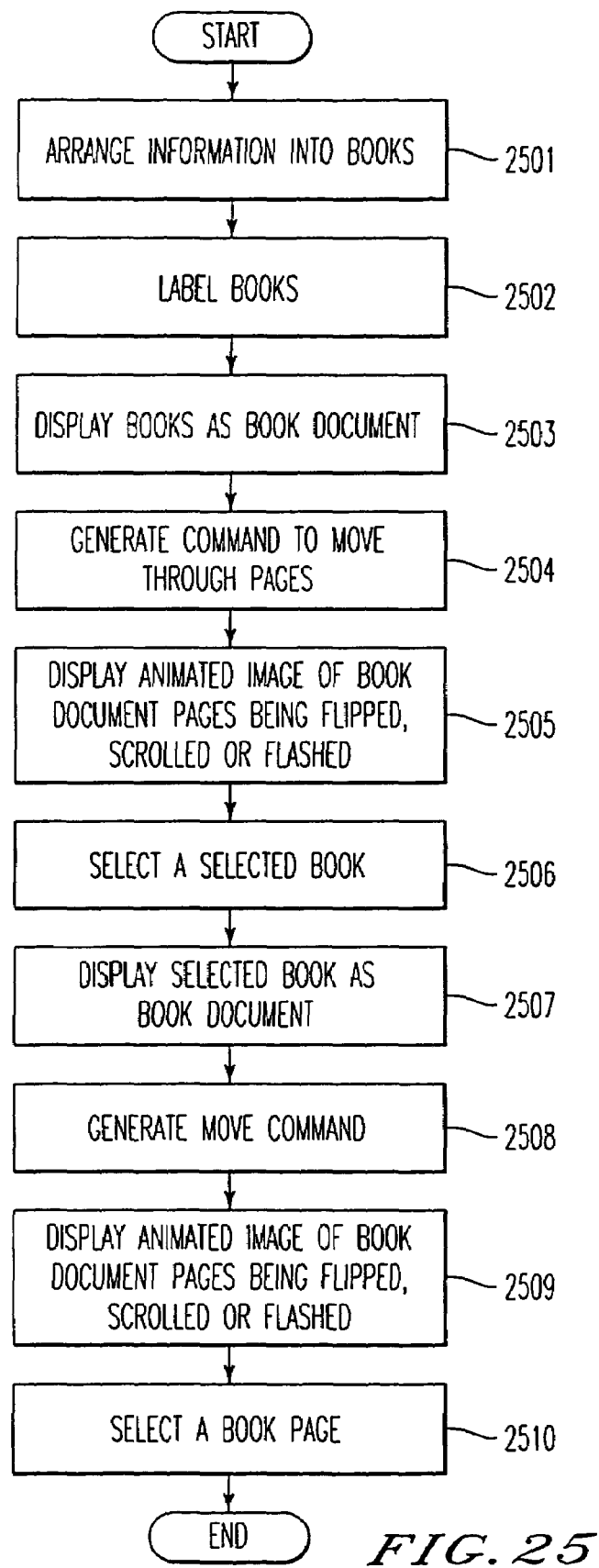
FIG. 25 is a flowchart of a user-interface method according to the library metaphor aspect of the present invention.

FIG. 25 is flowchart for a computer-interface process. The process starts in step 2501 where a set of information hosted on the computer is arranged in a set of books. Each of the books includes a subset of the information from the set of information hosted on the computer. Once arranged, the process flows to step 2502 where each of the books is labeled with a respective portion of the subset of information corresponding with each book. The process then flows to step 2503 where, based on user input, a user can select a selected book by first viewing books which are displayed as a single book document image. The book document image is made up of individual pages that correspond to the respective portions of the books. The process then flows to step 2504 where a command is generated, as actuated by the user, to move through the pages so that a user can view the individual pages and select a desired book. The process then flows to step 2505 where the pages of the book are displayed in an animated image where the pages of the book document are either flipped (preferable), scrolled, slid or flashed on the screen. The process then flows to step 2506 where, while viewing the animated image, the user via user input can select one of the pages. By selecting one of the pages, the user has selected the desired book. The process then flows to step 2507 where the selected book is displayed as the image of a book document. However, pages of the selected book document include respective portions of the subset of information corresponding to the selected book. The process then flows to step 2508 where a move command is generated for moving a pointer through a subset of the pages of the selected book. The process then flows to step 2509 where an animated image is displayed of the pages in the selected book being shown as either flipped (preferable), scrolled, slid or flashed on the screen. The process then flows to step 2510 where a selected book page of the selected book is selected by the user via a user input indication. Once the user has selected the desired book page, the process ends.

Figure 26:
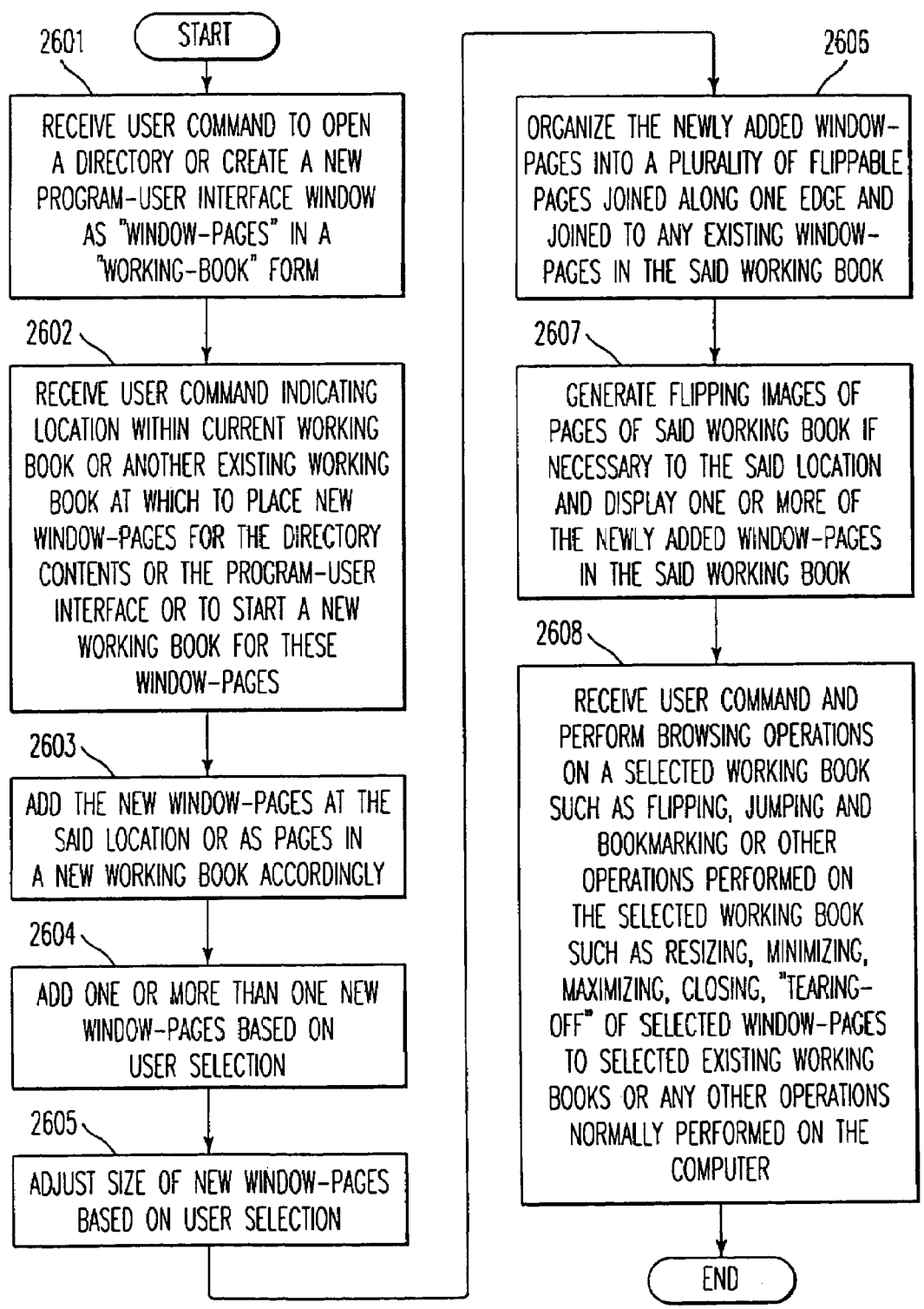
FIG. 26 is a flowchart of a Books interface method according to the library metaphor aspect of the present invention.

FIG. 26 is the flowchart for a book-oriented computer interface process. The process starts in step 2601 where a command is received from the user to create window-pages to contain the contents of a directory or a program-user interface. The process then flows to step 2602 where a command is received from the user to indicate whether these new window-pages are to form the first pages of a new working book or to become pages at a selected location within the current working book or another existing working book. The process then flows to step 2603 where the new window-pages are added to the said location or as pages in a new working book. The process then flows to step 2604 where a command is received from the user whether to add one or more window pages. If only one page is added to contain the contents of the directory or the program-user interface involved, then scrolling may be necessary to reveal portions of the contents that cannot be fitted within the one page initially. The process then flows to step 2605 where the size of the new window-pages to be added is determined based on user selection. The process then flows to step 2606 where the newly added pages are organized into a plurality of flippable pages joined along one edge and joined to any existing pages in the said working book. The process then flows to step 2607 where, if necessary, the flipping of some of the pages of the said working book are generated and displayed on the computer screen to get to the said location for the adding of the newly added working pages and one or more of the newly added working-pages are then displayed on the computer screen in the said working book. The process then flows to step 2608 where user commands are received to perform various operations such as browsing operations on a selected working book such as flipping, jumping and bookmarking or other operations involving a selected working book such as resizing, minimizing, maximizing, closing, or "tearing-off" of selected window-pages or joining of selected "torn-off" window-pages to selected existing working books or any operations normally performed on a computer. After that, the process ends.

The mechanisms, methods and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

While particular embodiments of the present invention have been illustrated and described, it will be appreciated that numerous changes and modifications will occur to those skilled in the art, and it is intended that the appended claims cover all those changes and modifications which fall within the spirit and scope of the present invention.

Obviously numerous modifications and variations of the present invention are possible in light of the above teachings. It is therefore to be understood that within the scope of the appended claims, the invention may be practiced otherwise than specifically described herein.

What is claimed as new and is desired to be secured by Letters Patent of the United States is:

1. A method for displaying a computer-based set of information on a display screen, comprising the steps of:
    displaying, on the display screen, said set of information as a book image, respective portions of said set of information being displayed as an open page of said book image that overlaps another page that was previously moved from a first side of said book image to a second side of said book image, and open pages of said book image remain at a fixed location with respect to said display screen as different pages of said book image are displayed; and
    displaying, on the display screen, a thickness image of said book image corresponding to an amount of said information on a left side and a right side of said display screen, a left portion of said thickness image displayed on said left side of said screen being proportional to a first amount of the information preceding a point in said set of information currently being displayed and a right portion of said thickness image displayed on said right side of said display screen being proportional to a second amount of information following the point in said set of information currently being displayed.

2. The method of claim 1, further comprising:
    displaying a permanent bookmark.
3. The method of claim 2, wherein:
    said permanent bookmark does not disappear when a permanently bookmarked page is revisited.
4. The method of claim 1, further comprising:
    displaying a finger-bookmark.
5. The method of claim 4, wherein:
    said finger-bookmark disappears when a bookmarked page is revisited.
6. The method of claim 1, further comprising:
    jumping to a predetermined jump position in said set of information.
7. The method of claim 6, further comprising the step of:
    displaying a flipping of a thickness image of pages skipped over in said jumping step.
8. The method of claim 1, wherein said step of displaying a thickness image comprises:
    displaying a left-side thickness of said book image while keeping a right vertical edge thereof remaining stationary with respect to the display screen,
    displaying a right-side thickness of said book image while keeping a left vertical edge thereof remaining stationary with respect to the display screen; and further comprising steps of
    changing the left-side thickness in response to moving through the set of information and generating a command to cause a left vertical edge of a displayed page to change position, and
    changing the right-side thickness in response to moving through the set of information and generating another command to cause a right vertical edge of the displayed page to change position.
9. The method of claim 1, further comprising the steps of:
    displaying a jump cursor on the thickness image, said jump cursor being user-activated and identifying a location in the set of information in which to effect a jump operation, and
    said jump cursor showing a location in the set of information to which the jump operation will be made.
10. The method of claim 1, further comprising the step of:
    displaying more than two flipping pages simultaneously, said flipping pages showing information from corresponding parts of said set of information.
11. The method of claim 1, further comprising the step of:
    displaying increasingly more flipping pages simultaneously as a document browsing speed is increased.
12. The method of claim 1, further comprising the step of:
    freezing a number of flipping pages in an act of flipping across the display screen in response to receiving a freeze command issued by a user.
13. The method of claim 1, further comprising the step of:
    adjusting a document browsing speed in correspondence to a user command.
14. The method of claim 1, further comprising:
    receiving commands from an input device indicating movement through the electronic book; and
    displaying, on the display screen, flipping pages of the electronic book based on the commands.
15. The method of claim 1, further comprising:
    processing said set of information with a processor to format said set of information as said book image.
16. A method for displaying a computer-based set of information on a display screen, comprising the steps of:
    displaying, on the display screen, said set of information as a book image, respective portions of said set of information being displayed as an open page of said book image that overlaps another page that was previously moved from a first side of said book image to a second side of said book image, and displaying, on the display screen, two or more than two flipping pages simultaneously.

17. The method of claim 16, further comprising the step of:
displaying information from corresponding parts of said set of information on said flipping pages.

18. The method of claim 16, further comprising the step of:
displaying increasingly more flipping pages simultaneously as a document browsing speed is increased.

19. The method of claim 16, further comprising the step of:
freezing a number of flipping pages in an act off flipping across the display screen in response to a freeze command.

20. The method of claim 16, further comprising the step of:
collapsing a number of flipping pages into a collection of pages.

21. The method of claim 16, further comprising the step of:
adjusting a document browsing speed in response to a command.

22. The method of claim 16, further comprising:
displaying a bookmark.

23. The method of claim 16, further comprising:
displaying a permanent bookmark.

24. The method of claim 23, wherein:
said permanent bookmark does not disappear when a permanently bookmarked page is revisited.

25. The method of claim 16, further comprising:
displaying a finger bookmark.

26. The method of claim 25, wherein:
said finger-bookmarked disappears when a bookmarked page is revisited.

27. The method of claim 16, further comprising:
jumping to a predetermined jump position in said set of information.

28. The method of claim 27, further comprising the step of:
displaying a flipping of a thickness image of pages skipped over in said jumping step.

29. A computer-readable program product whose contents cause a computer to perform the method recited in any one of claims 1-28.

30. The method of claim 16, further comprising:
receiving commands from an input device indicating movement through the electronic book; and
displaying, on the display screen, flipping pages of the electronic book based on the commands.

31. The method of claim 16, further comprising:
processing said set of information with a processor to format said set of information as said book image.

* * * * *